United States Patent
Pan et al.

(10) Patent No.: US 9,613,442 B2
(45) Date of Patent: *Apr. 4, 2017

(54) IMAGE RECONSTRUCTION FROM LIMITED OR INCOMPLETE DATA

(71) Applicant: The University of Chicago, Chicago, IL (US)

(72) Inventors: Xiaochuan M. Pan, Chicago, IL (US); Emil Sidky, Chicago, IL (US); Chien-min Kao, Wilmette, IL (US)

(73) Assignee: The University of Chicago, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,844

(22) Filed: Nov. 5, 2015

(65) Prior Publication Data
US 2016/0247302 A1 Aug. 25, 2016

Related U.S. Application Data

(63) Continuation of application No. 14/584,250, filed on Dec. 29, 2014, now Pat. No. 9,189,871, which is a
(Continued)

(51) Int. Cl.
*G06K 9/00* (2006.01)
*G06T 11/00* (2006.01)

(52) U.S. Cl.
CPC .......... *G06T 11/006* (2013.01); *G06T 11/005* (2013.01); *G06T 2211/424* (2013.01); *G06T 2211/432* (2013.01); *G06T 2211/436* (2013.01)

(58) Field of Classification Search
CPC ................ G06T 11/005; G06T 11/006; G06T 2211/424; G06T 2211/432; G06T 2211/436
(Continued)

(56) References Cited

U.S. PATENT DOCUMENTS 4,888,693 A 12/1989 Tam
5,909,476 A 6/1999 Cheng et al.
(Continued)

OTHER PUBLICATIONS

Candes, E., et al, "Signal Recovery from Random Projections", Computational Imaging III, 2005 SPIE and IS&T, 5674, 12 pgs.
(Continued)

*Primary Examiner* — Daniel Mariam
(74) *Attorney, Agent, or Firm* — Brinks Gilson & Lione

(57) ABSTRACT

A system and method are provided for reconstructing images from limited or incomplete data, such as few view data or limited angle data or truncated data generated from divergent beams. The method and apparatus may iteratively constrain the variation of an estimated image in order to reconstruct the image. To reconstruct an image, a first estimated image may be generated. Estimated data may be generated from the first estimated image, and compared with the actual data. The comparison of the estimated data with the actual data may include determining a difference between the estimated and actual data. The comparison may then be used to generate a new estimated image. For example, the first estimated image may be combined with an image generated from the difference data to generate a new estimated image. To generate the image for the next iteration, the variation of the new estimated image may be constrained.

21 Claims, 31 Drawing Sheets

Related U.S. Application Data continuation of application No. 14/095,562, filed on Dec. 3, 2013, now Pat. No. 8,923,587, which is a continuation of application No. 12/223,946, filed as application No. PCT/US2007/003956 on Feb. 12, 2007, now Pat. No. 8,605,975.

(60) Provisional application No. 60/773,181, filed on Feb. 13, 2006.

(58) Field of Classification Search
USPC .......... 382/128, 130–132, 195, 233; 378/4–8
See application file for complete search history.

(56) References Cited

U.S. PATENT DOCUMENTS

| | | | |
|---|---|---|---|
| 6,665,369 B2* | 12/2003 | Ukita | G06T 11/006 378/4 |
| 6,770,893 B2* | 8/2004 | Nelson | G01N 21/4795 250/458.1 |
| 8,605,975 B2 | 12/2013 | Pan et al. | |
| 8,923,587 B2 | 12/2014 | Pan et al. | |
| 9,189,871 B2 | 11/2015 | Pan et al. | |
| 2007/0110290 A1 | 5/2007 | Chang et al. | |

OTHER PUBLICATIONS

Candes, E.J., et al, "Robust Uncertainty Principles: Exact Signal Reconstruction from Highly Incomplete Frequency Information", XP-002491493, IEEE Transaction on Information Theory, 2006, 52, 18 pgs.

Candes, E., et al, "Stable Signal Recovery from Incomplete and Inaccurate Measurements", XP-002499280, Department of Mathematics, University of California, Los Angeles, CA, 2005, 16 pgs.

Gorodnitsky, I.F., "Sparse Signal Reconstruction from Limited Data Using FOCUSS: A Re-weighted Minimum Norm Algorithm", IEEE Transactions on Signal Processing, 1997, 45, 600-616.

Li, Y., et al, "A Computational Algorithm for Minimizing Total Variation in Image Restoration", IEEE Transactions on Image Processing, 1996, 5, 987-995.

Peng, et al, "Image Recovery in Computer Tomography from Partial Fan-Beam Data by Convex Projections", IEEE Transactions on Medical Imaging, 1992, 11, 470-478.

Office Action including Extended European Search Report issued in corresponding EP Appln. No. 07750773.9 dated May 11, 2012, 7 pgs.

Notification of Transmittal of the International Search Report dated Jul. 21, 2008 for PCT Appln. No. PCT/US07/03956.

The Written Opinion of the International Searching Authority, or the Declaration dated Jul. 21, 2008 for PCT Appln. No. PCT/US2007/03956.

International Preliminary Report on Patentability in corresponding PCT Appln. No. PCT/US2007/003956 dated Oct. 16, 2008.

Office Action issued in corresponding U.S. Appl. No. 12/223,946 dated Dec. 14, 2012, 11 pgs.

Office Action issued in corresponding U.S. Appl. No. 14/095,562 dated Mar. 19, 2014, 8 pgs.

Office Action issued in corresponding U.S. Appl. No. 14/584,250 dated Mar. 11, 2015, 9 pgs.

* cited by examiner

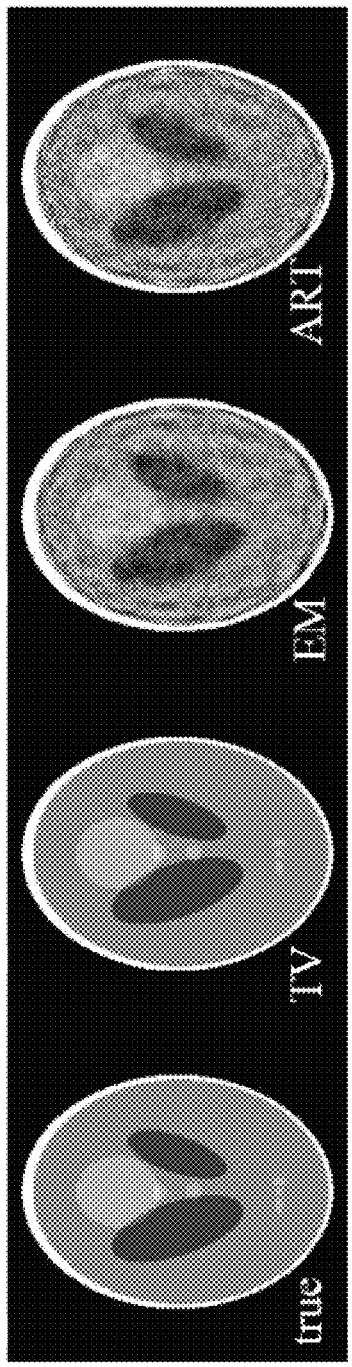
Fig. 6a
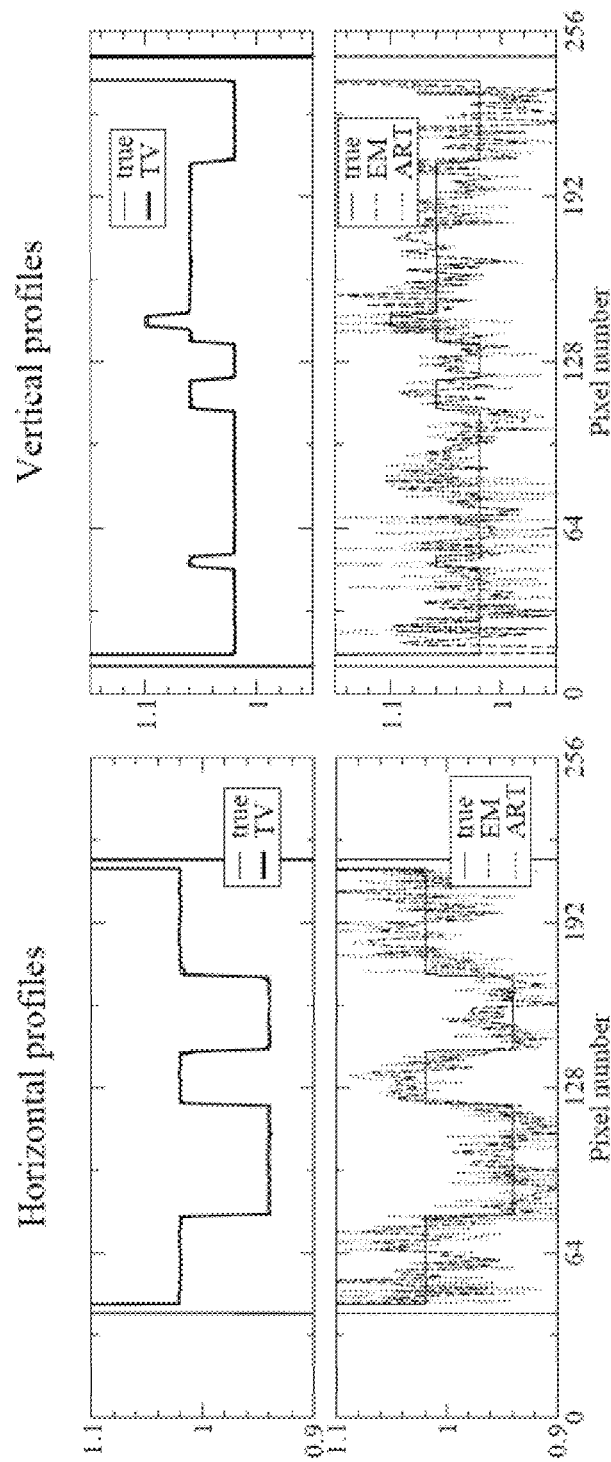
Fig. 6b
Fig. 6c

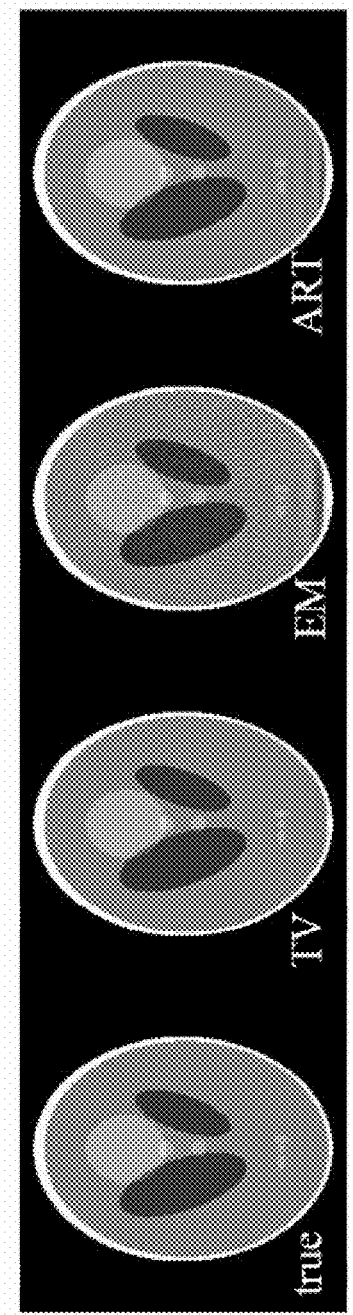
Fig. 8a
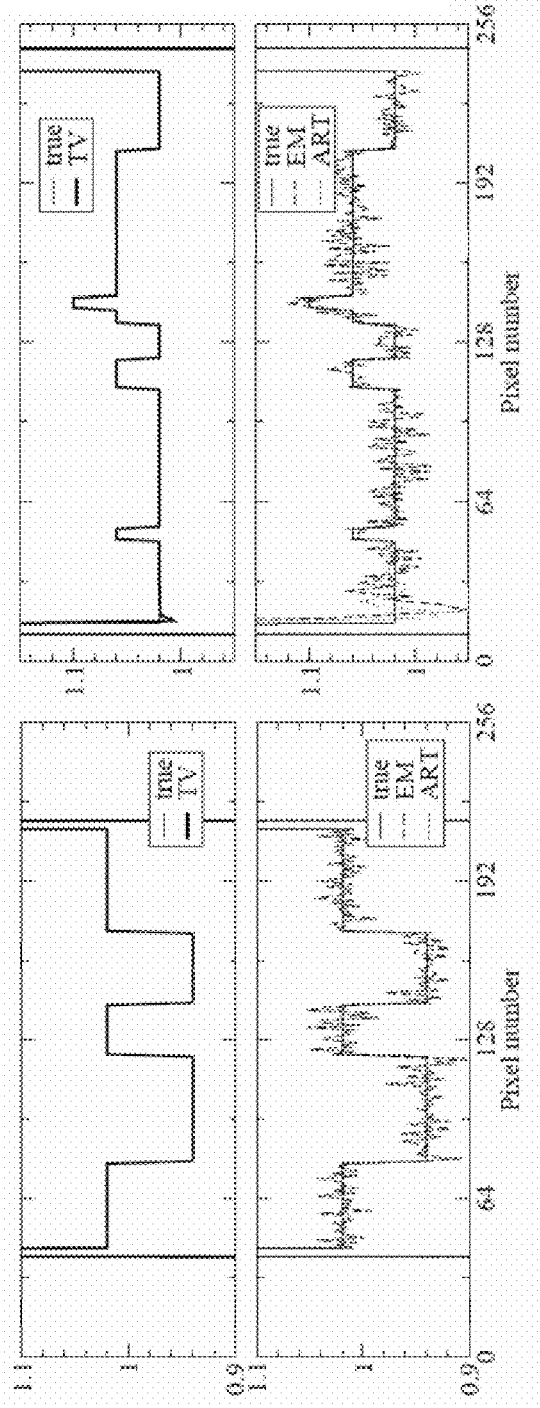
Fig. 8b
Fig. 8c

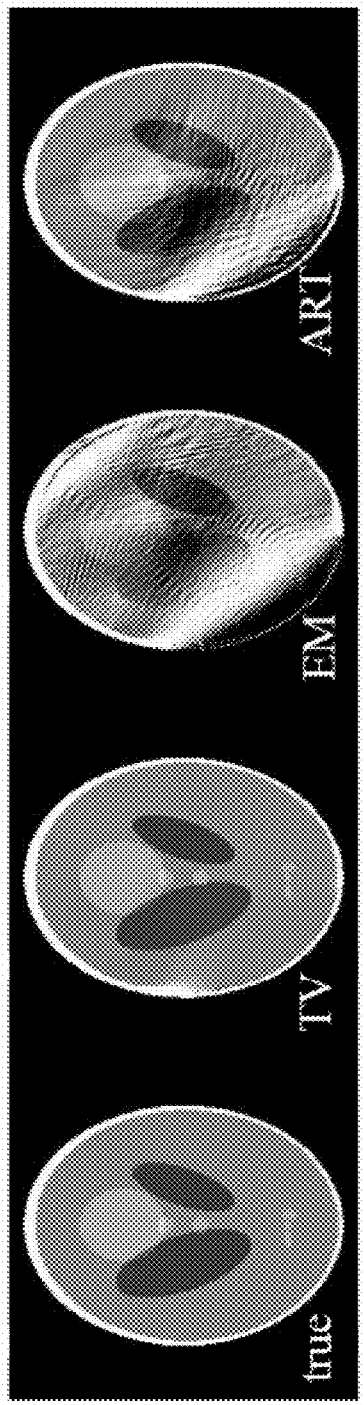
Fig. 9a
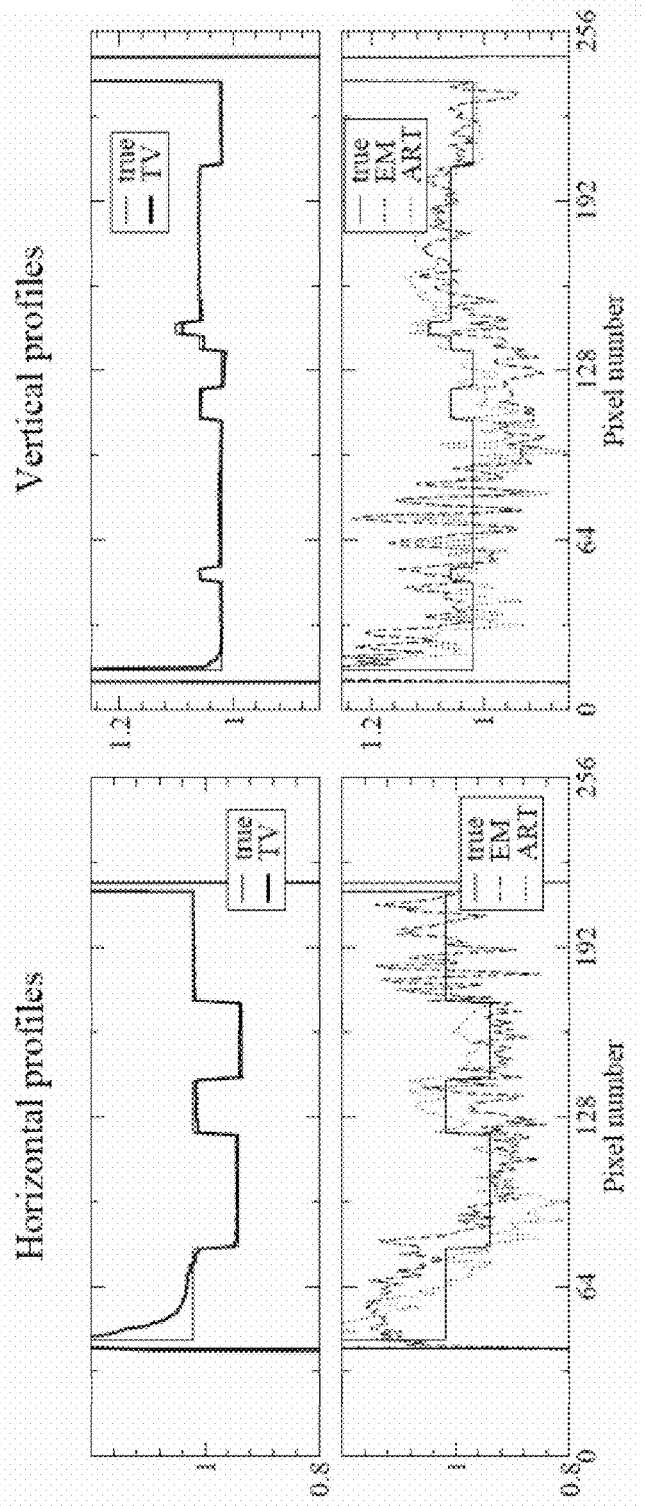
Fig. 9b
Fig. 9c

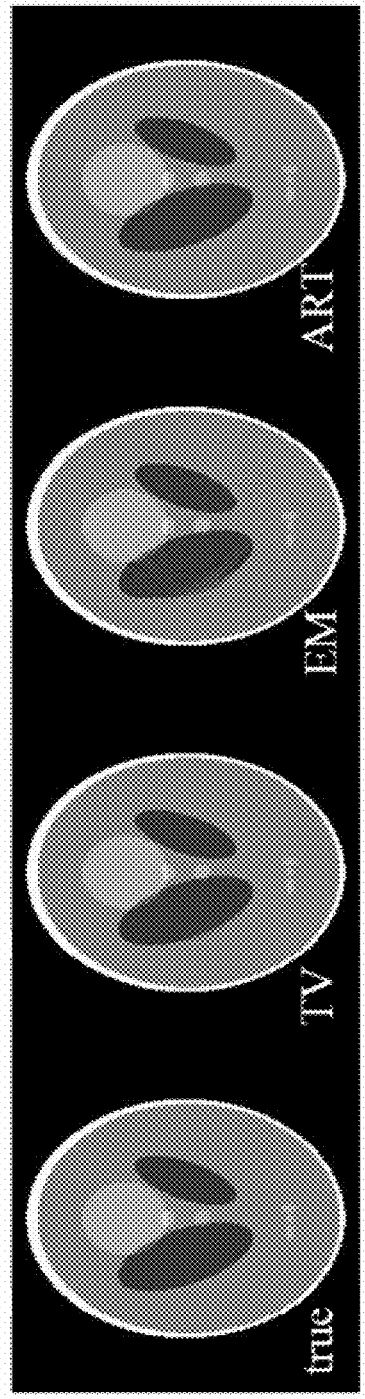
Fig. 11a
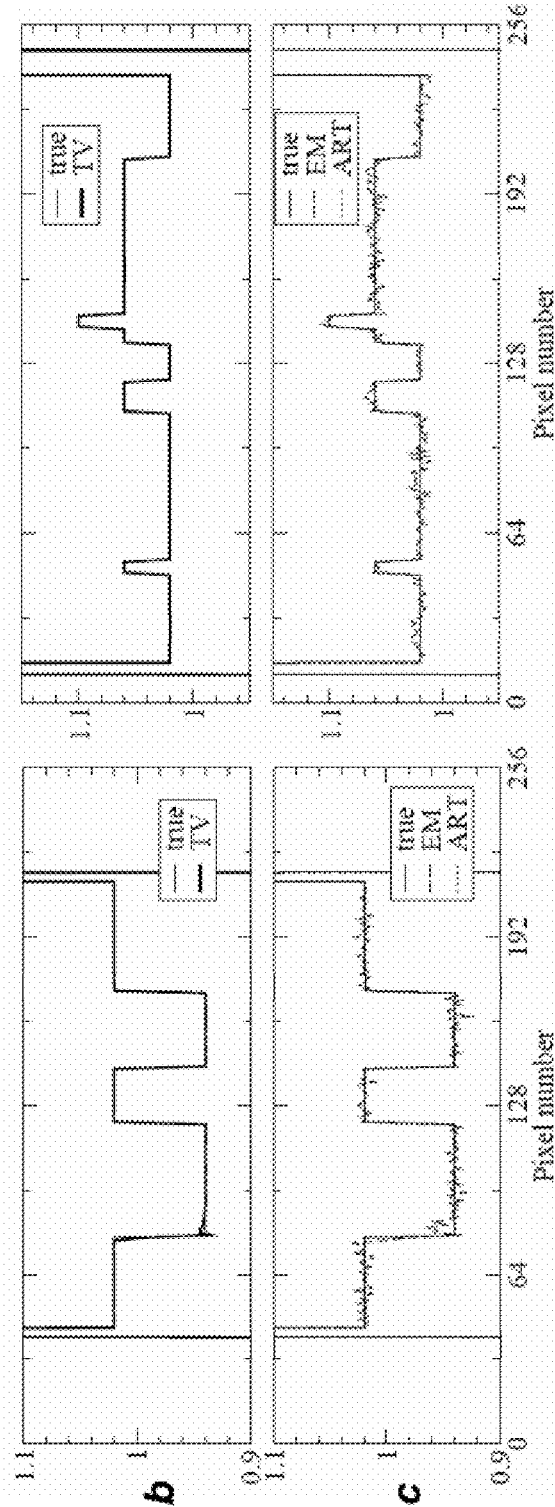
Fig. 11b
Fig. 11c

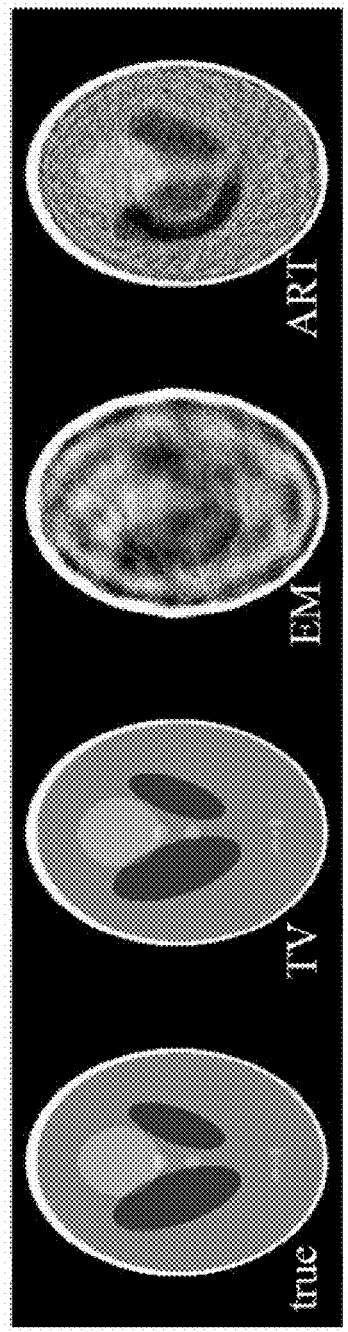
*Fig. 12a*
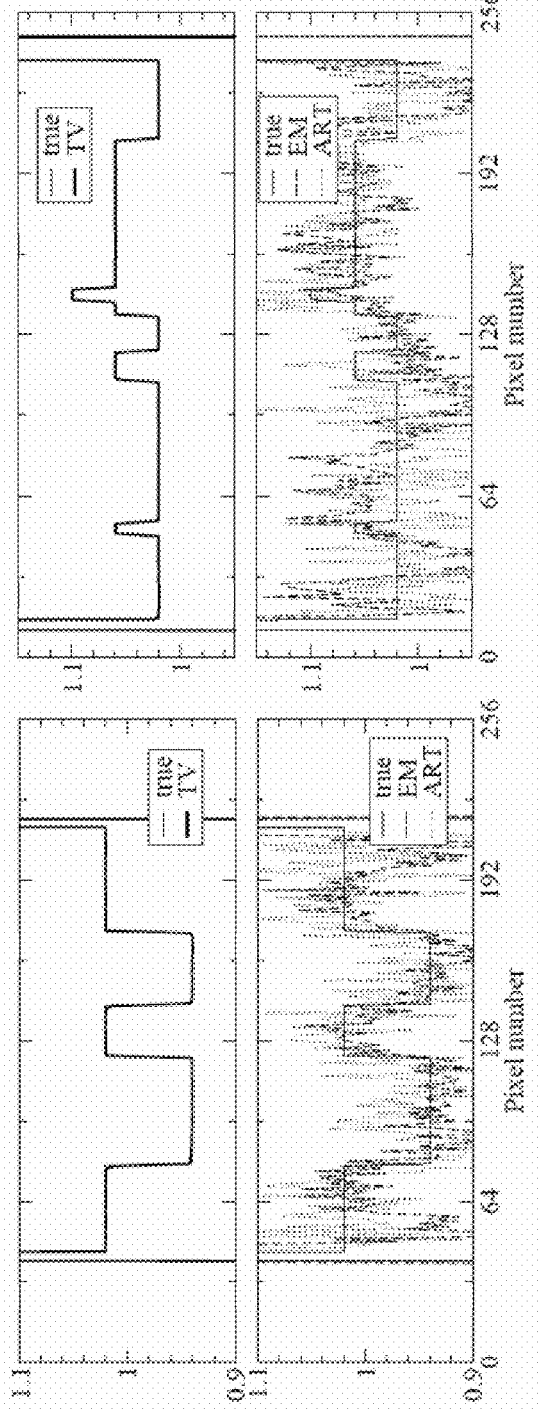
*Fig. 12b*
*Fig. 12c*

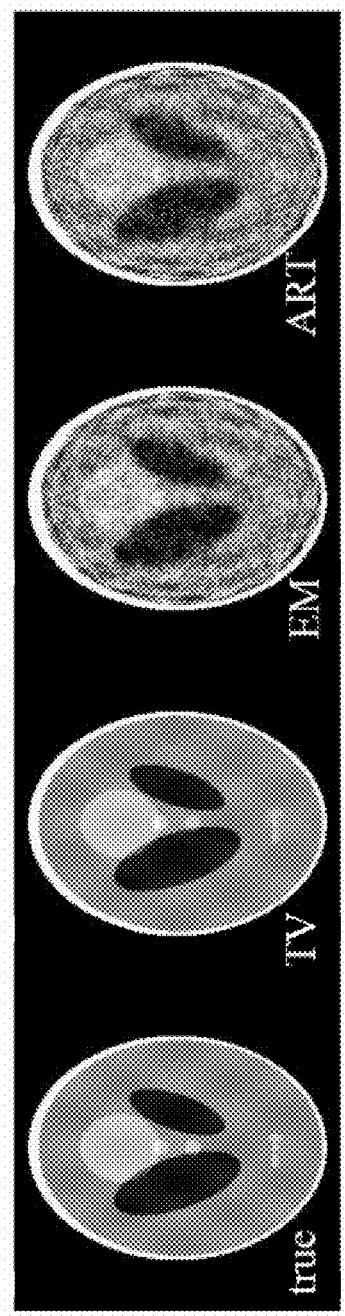
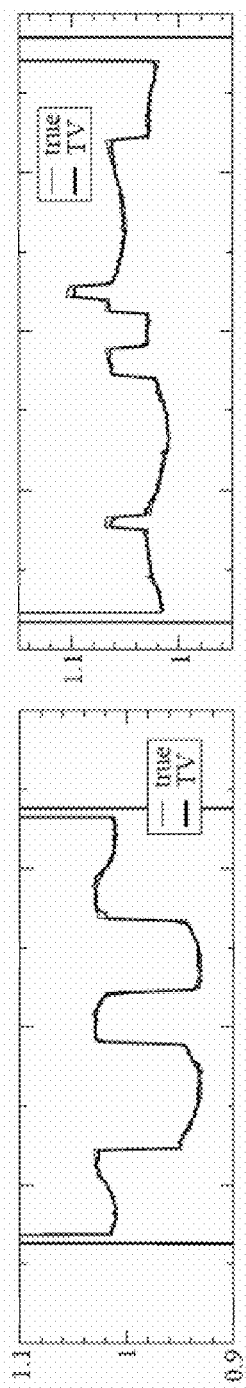
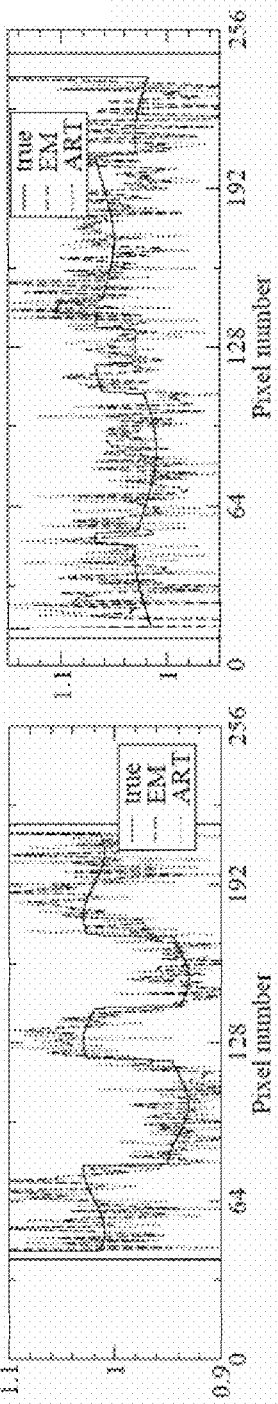
*Fig. 13a*
*Fig. 13b*
*Fig. 13c*

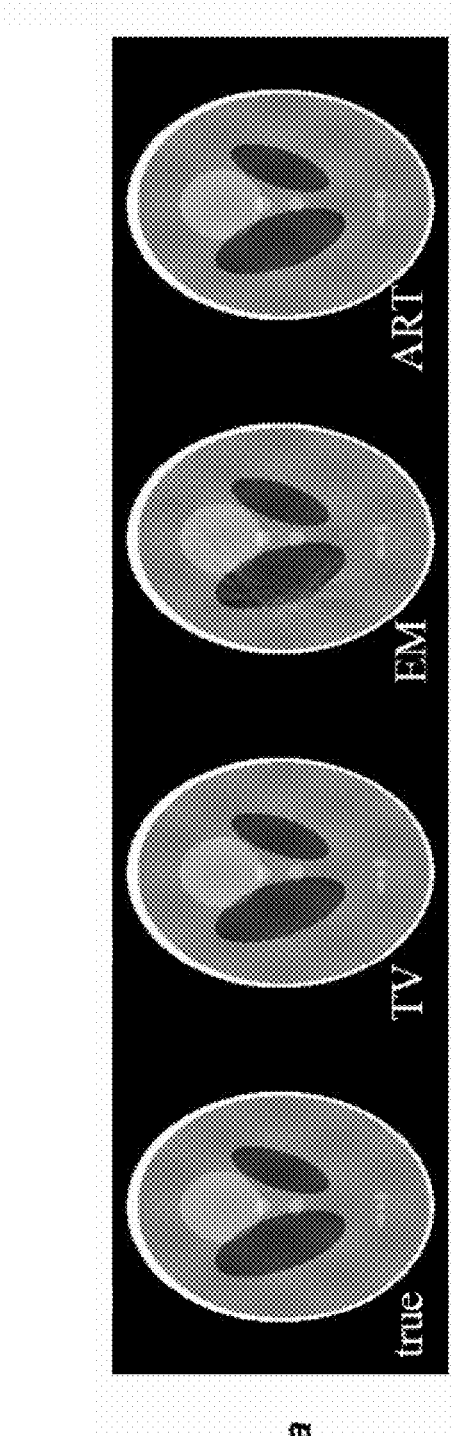
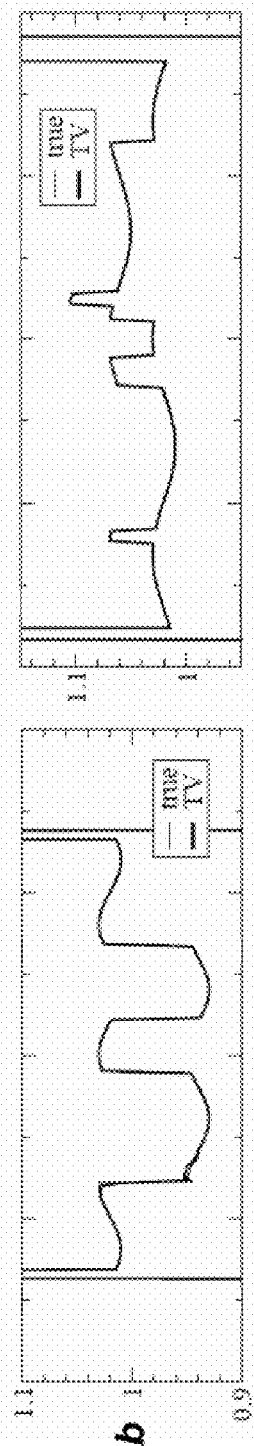
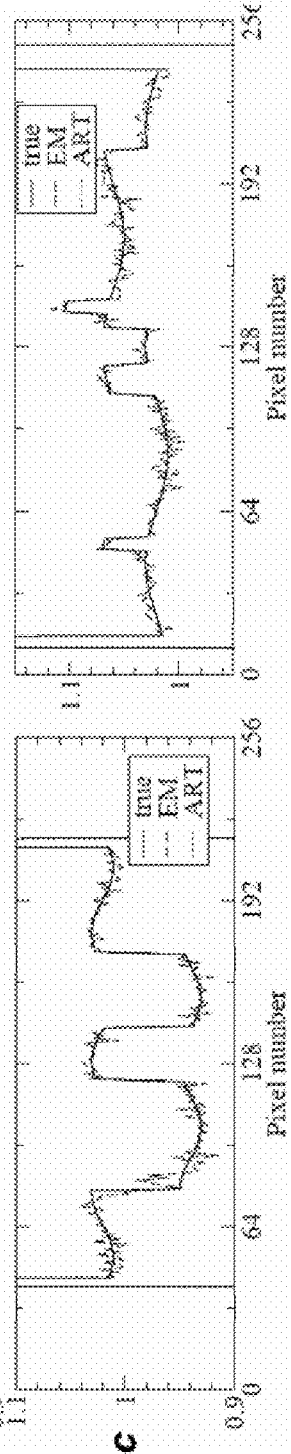
Fig. 14a
Fig. 14b
Fig. 14c

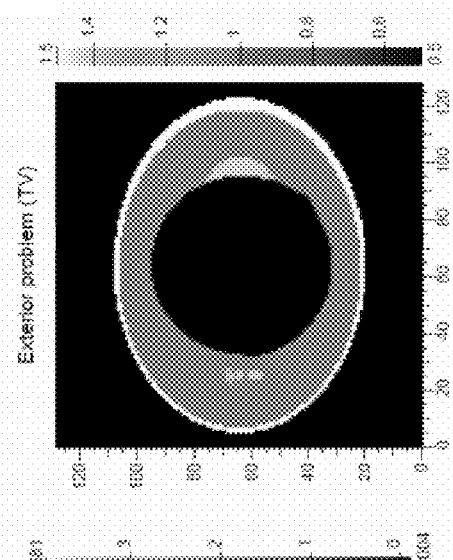
*Fig. 17d*
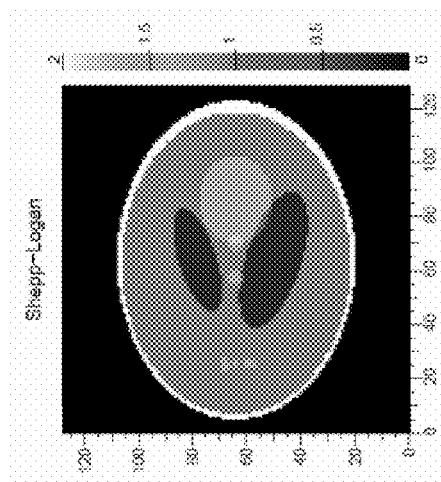
*Fig. 17a*
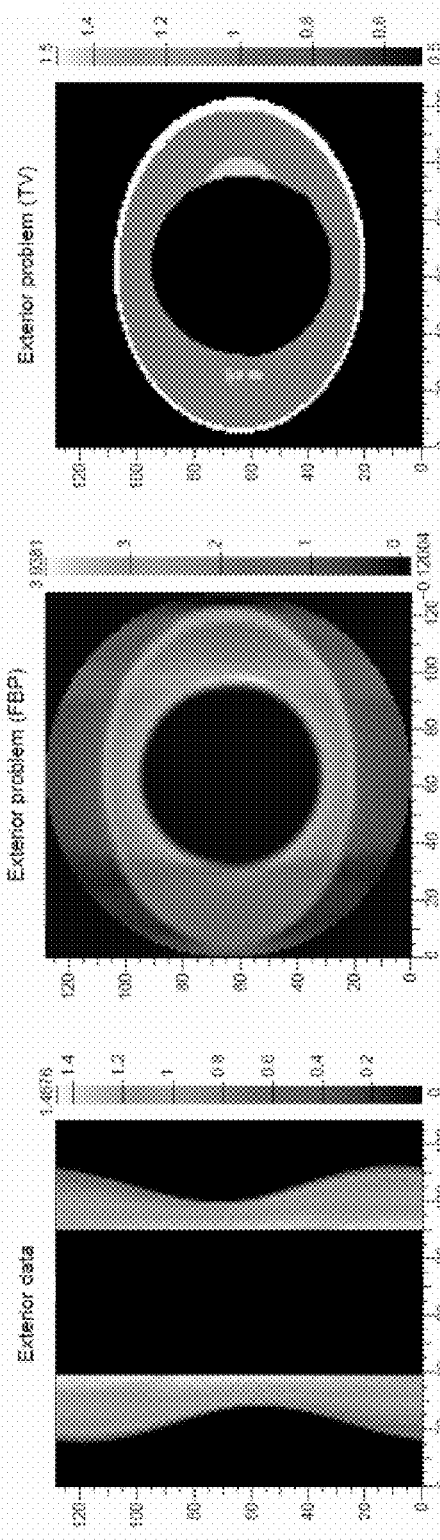
*Fig. 17c*
*Fig. 17b*

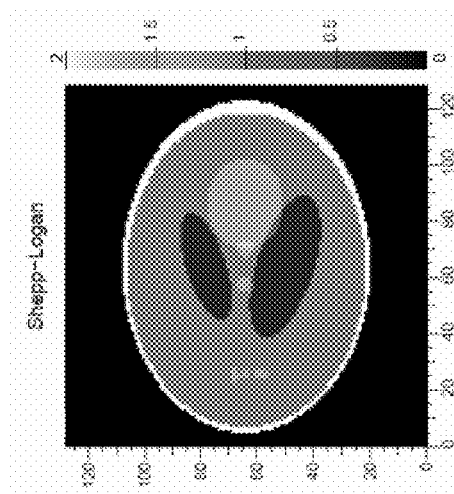
*Fig. 18a*
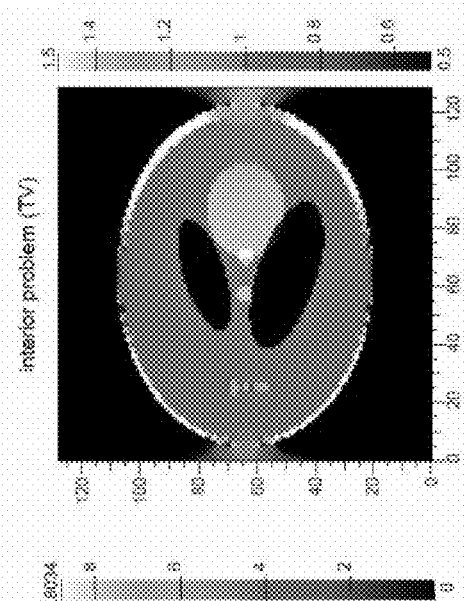
*Fig. 18d*
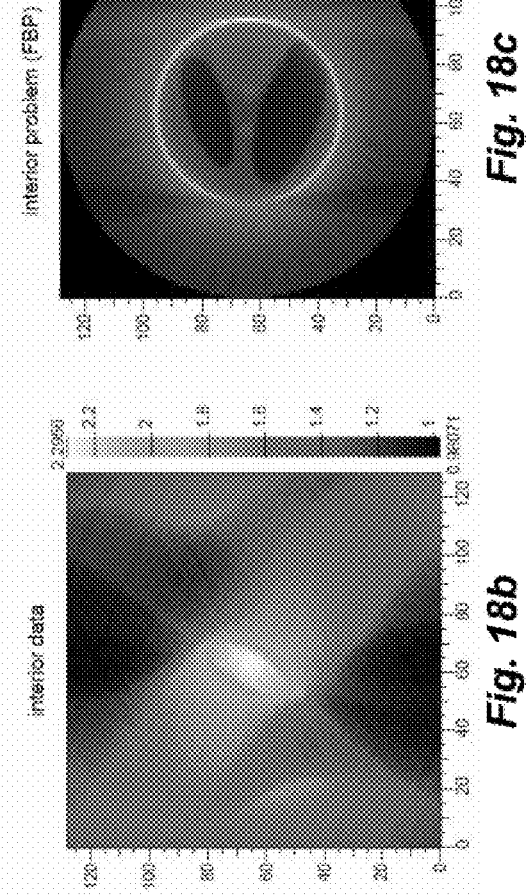
*Fig. 18c*
*Fig. 18b*

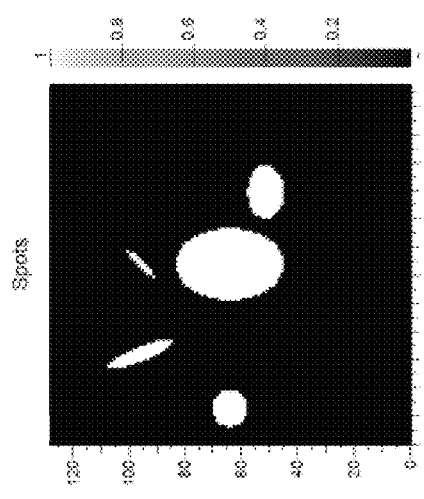
*Fig. 19a*
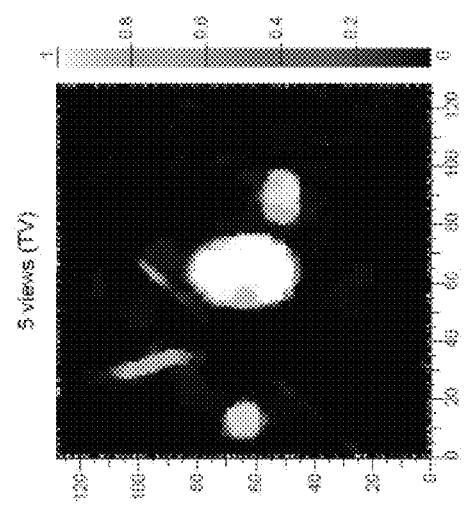
*Fig. 19d*
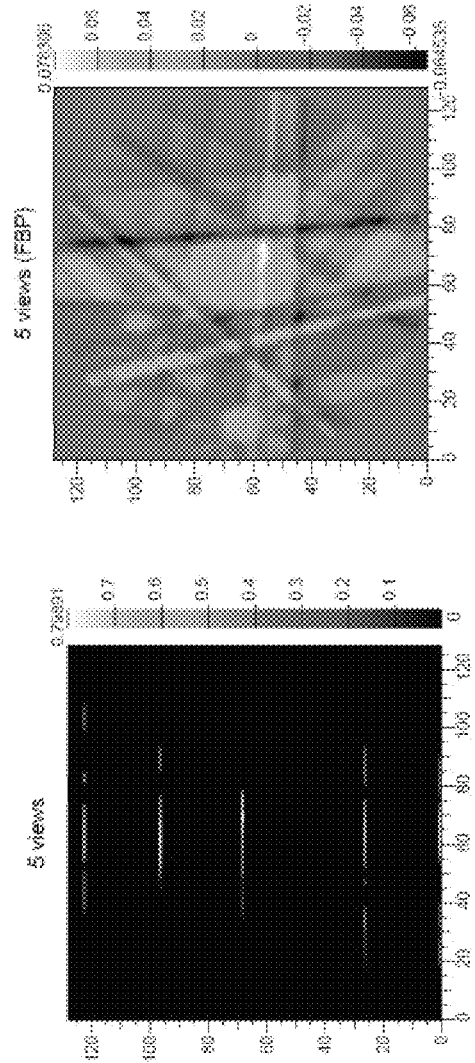
*Fig. 19c*
*Fig. 19b*

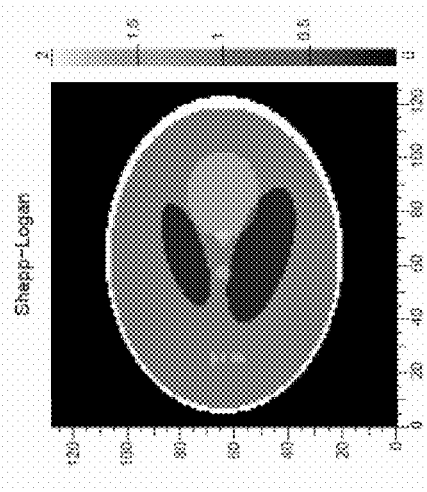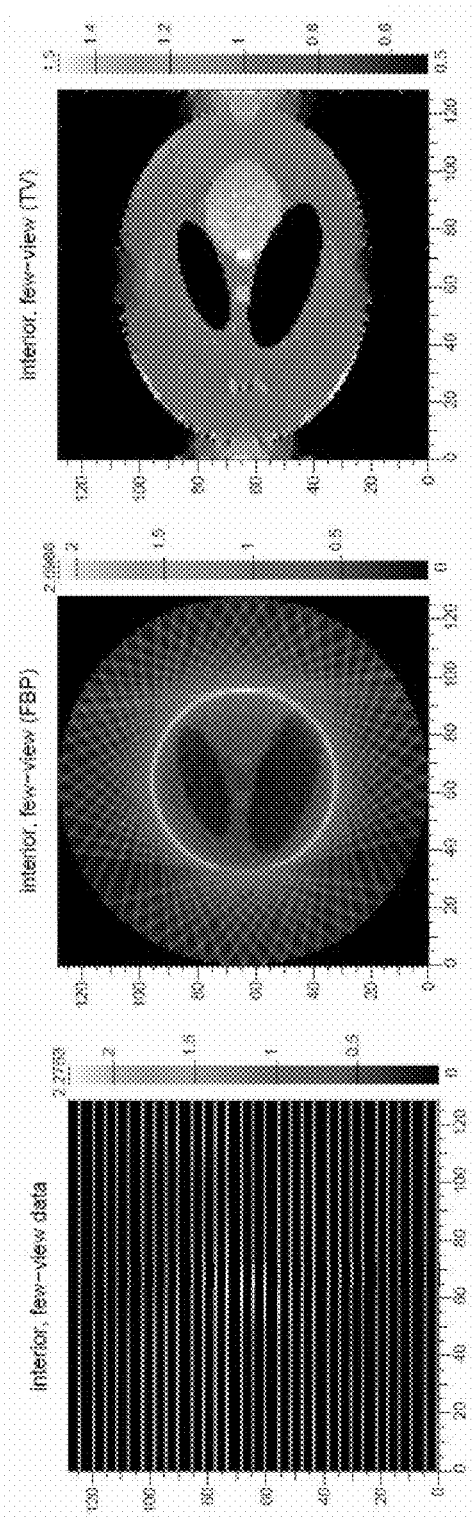
Fig. 20a
Fig. 20b
Fig. 20c
Fig. 20d

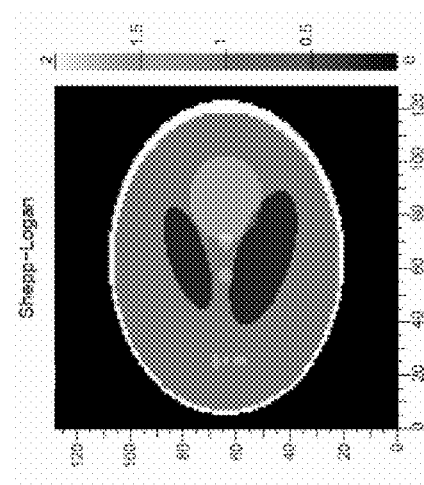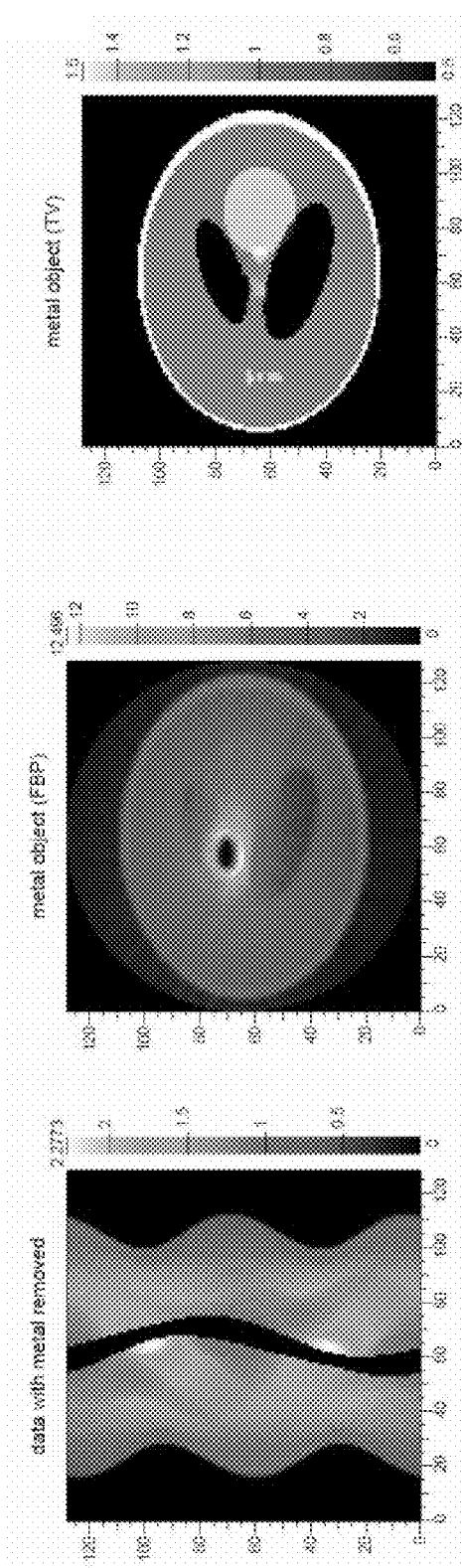
Fig. 21a
Fig. 21b
Fig. 21c
Fig. 21d

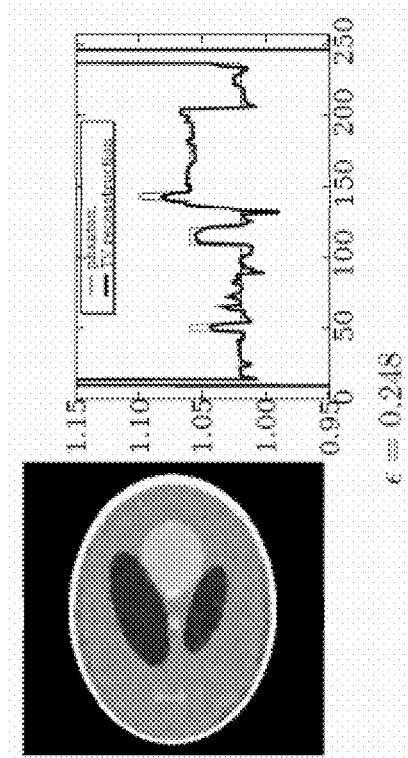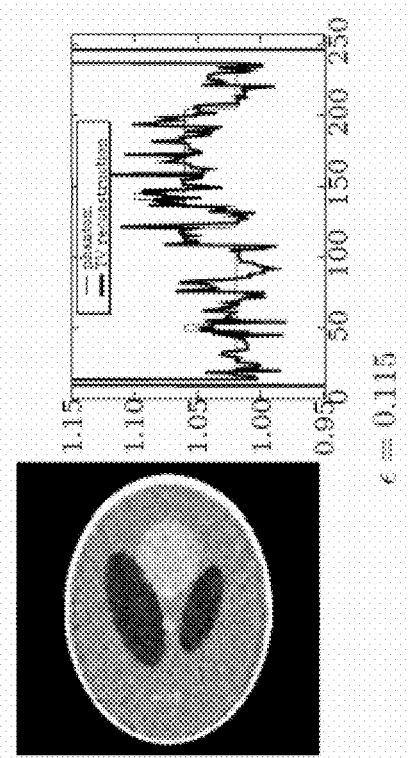
Fig. 22d
Fig. 22e

*Fig. 24b* phantom

*Fig. 24c* projection

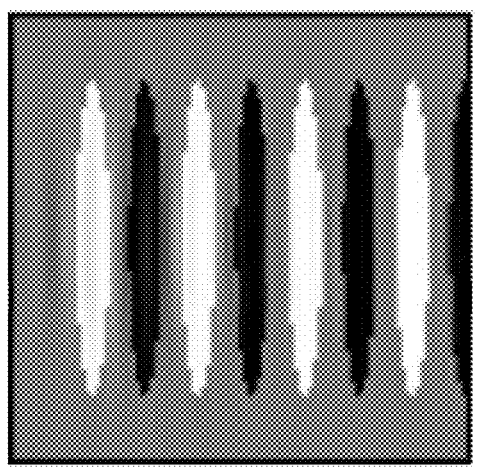
*Fig. 25a*
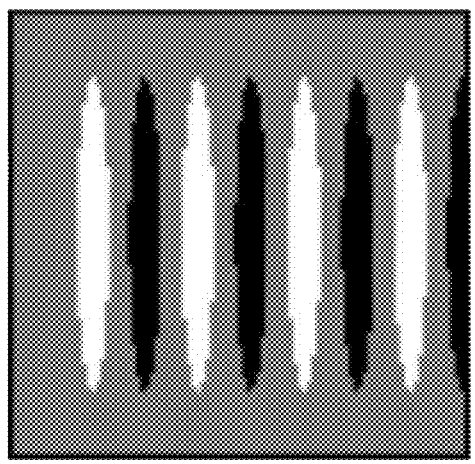
*Fig. 25b*
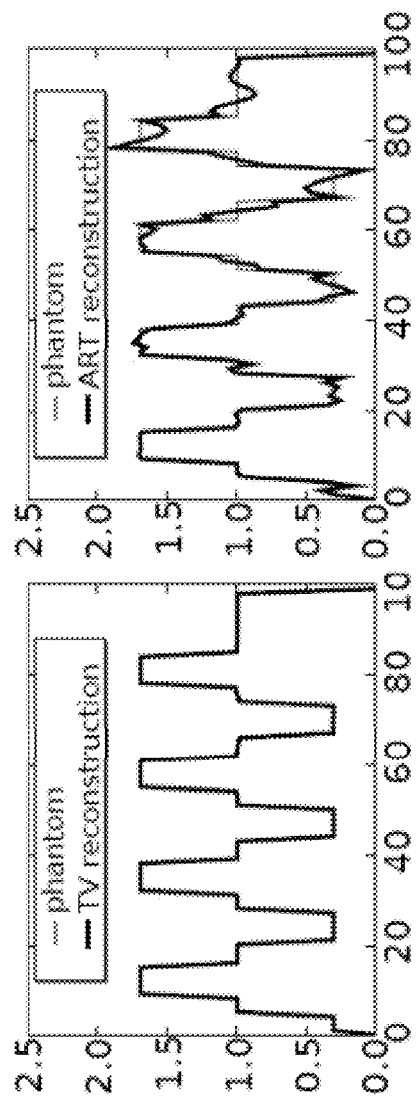
*Fig. 25c*
*Fig. 25d*

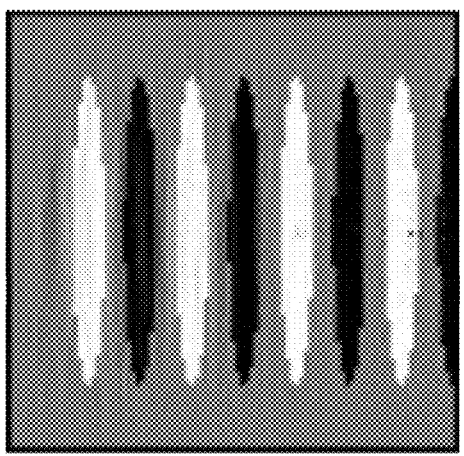
Fig. 26b
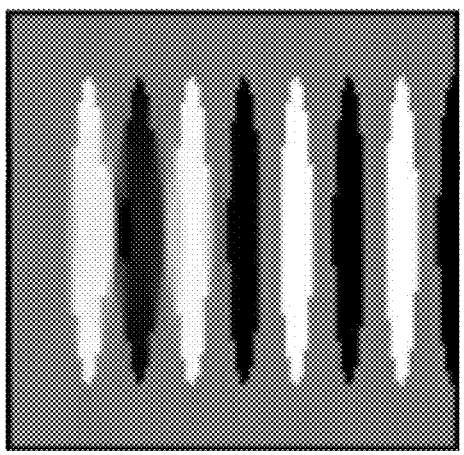
Fig. 26a
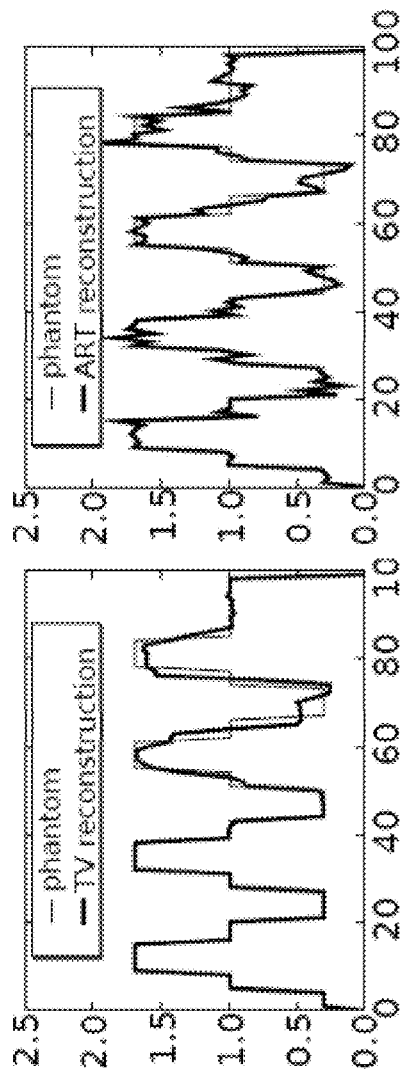
Fig. 26d
Fig. 26c

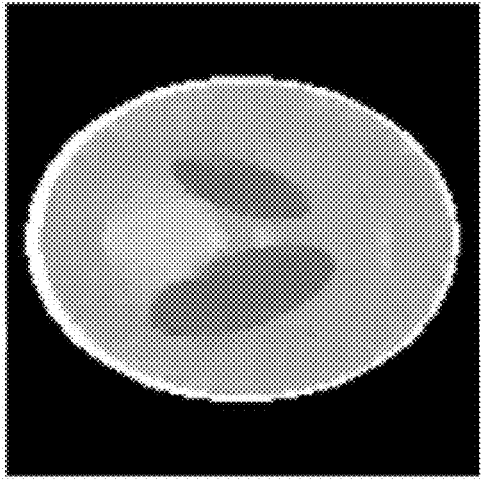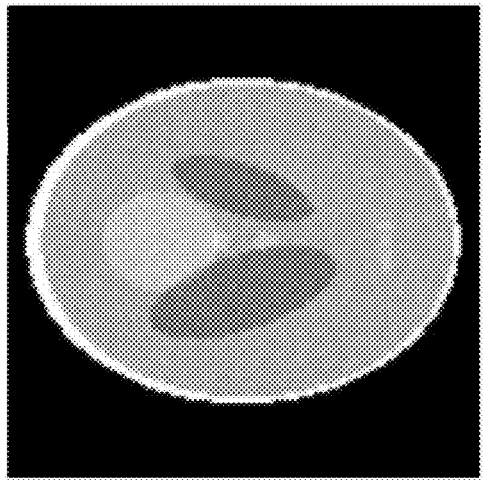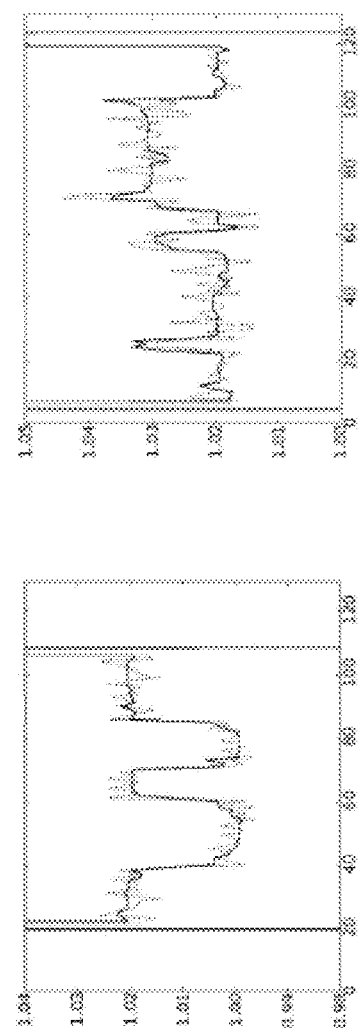
Fig. 30a  Fig. 30b  Fig. 30c  Fig. 30d

IMAGE RECONSTRUCTION FROM LIMITED OR INCOMPLETE DATA

REFERENCE TO RELATED APPLICATIONS

This application a continuation of U.S. application Ser. No. 14/584,250 (now U.S. Pat. No. 9,189,871), which is a continuation of U.S. application Ser. No. 14/095,562 (now U.S. Pat. No. 8,923,587), which is a continuation of U.S. application Ser. No. 12/223,946 (now U.S. Pat. No. 8,605,975), which is a national stage application under 35 U.S.C. §371 of PCT application No. PCT/US2007/003956 (filed on Feb. 12, 2007 and published as WO 2007/095312 A2), which claims the benefit of priority from U.S. Provisional Application No. 60/773,181, filed Feb. 13, 2006, all of which are incorporated by reference herein in their entirety.

GOVERNMENT LICENSE RIGHTS

The U.S. Government has a paid-up license in this invention and the right in limited circumstances to require the patent owner to license others on reasonable terms as provided for by the terms of grants K01 EB003913, R01 EB00225, and R01 EB02765 awarded by the National Institutes of Health.

FIELD OF THE INVENTION

The present invention relates to a method and apparatus for imaging an object. More particularly, the present invention relates to a method and apparatus for imaging an interior of a part, or all, of a living or non-living object with limited or incomplete data such as few view data or limited angle data or truncated data (including exterior and interior truncation data).

BACKGROUND

Imaging techniques typically comprise detecting a signal from an object and constructing an image based on the detected signal. The detected signal may include any detectable datum from the sample, such as an electromagnetic signal from any frequency range, a magnetic signal, an ionization signal, heat, particles (electron, proton, neutron, etc.), or the like.

The imaged object may comprise any portion of a living organism (e.g., human or animal) or a nonliving object. For example, the portion may comprise an internal or an external portion, or may comprise the entire internal or external portion of the object. There are a wide variety of techniques for imaging of the object. Examples of imaging techniques include, but are not limited to: computed tomography (CT), positron emission tomography (PET), single-photon emission computed tomography (SPECT), magnetic resonance imaging (MRI), electron paramagnetic resonance imaging (EPRI), wave imaging (such as phase contrast imaging, thermacoustic imaging, and thermooptical imaging), and particle imaging. Further, various imaging techniques may be combined. For example, CT imaging and PET imaging may be combined to generate an image.

CT is an X-ray procedure in which the X-ray beam may move around the object, taking pictures from different angles. These images may be combined by a computer to produce a cross-sectional picture of the inside of the object. PET is a diagnostic imaging procedure that may assess the level of metabolic activity and perfusion in various organ systems of an object, such as a human body. A positron camera (tomograph) may be used to produce cross-sectional tomographic images, which may be obtained from positron emitting radioactive tracer substances (radiopharmaceuticals), such as 2-[F-18] Fluoro-D-Glucose (FDG), that may be administered intravenously to the object. SPECT scans and PET scans are part of the nuclear imaging family. The SPECT scan is capable of revealing information about the object, such as blood flow to tissue. For example, radionuclide may be given intravenously, with the tissues absorbing the radionuclides (diseased tissue absorbs at a different rate), and the rotating camera picking up images of these particles, which may then be transferred to a computer. The images may be translated onto film as cross sections and can be viewed in a 3-D format. Moreover, MRI and EPR1 are imaging techniques that use a magnetic field and radiofrequency radiation to generate information, such as anatomical information.

In certain instances, the images may be generated using the exemplary imaging techniques discussed above from full knowledge of their linear transforms. However, in many practical situations, one may have access only to fractions of such measurements and thus have limited (instead of full) knowledge of the linear transforms. Thus, in various forms of imaging, including tomography, one of the main issues for image reconstruction centers on data sufficiency and on how to estimate an image (such as a tomographic image) when the projection data are not theoretically sufficient for exact image reconstruction. Insufficient data problems occur quite frequently because of practical constraints due to the, imaging hardware, scanning geometry, or ionizing radiation exposure. The insufficient data problem may take many forms. For example, one type of the insufficient data problem derives from sparse samples, such as attempting to reconstruct an image from projection data at few views. Another example of an imperfect scanning data situation comprises limited angular range of the object to be imaged. Still another example comprises gaps in the projection data caused by bad detector bins, metal within the object, etc. In each of these three examples, the projection data are not sufficient for exact reconstruction of tomographic images and application of standard analytic algorithms, such as filtered back-projection (FBP), may lead to conspicuous artifacts in reconstructed images.

Methodologies have been proposed attempting to overcome data insufficiency in tomographic imaging. The methodologies follow one of two approaches. The first approach includes interpolating or extrapolating the missing data regions from the measured data set, followed by analytic reconstruction. Such an approach may be useful for a specific scanning configuration, imaging a particular object. However, this approach is, very limited, and is not applicable generally to the data insufficiency problem. The second approach employs an iterative methodology to solve the data model for images from the available measurements. Iterative methodologies have been used for tomographic image reconstruction. These methodologies differ in the constraints that they impose on the image function, the cost function that they seek to minimize, and the actual implementation of the iterative scheme.

Two iterative methodologies used for tomographic imaging include: (1) the algebraic reconstruction technique (ART); and (2) the expectation-maximization (EM) methodology. For the case where the data are consistent yet are not sufficient to determine a unique solution to the imaging model, the ART methodology finds the image that is consistent with the data and minimizes the sum-of-squares of the image pixel values. The EM methodology applies to positive integral equations, which is appropriate for the CT-imaging model, and seeks to minimize the Kullback-Liebler distance between the measured data and the projection of the estimated image. The EM methodology has the positivity constraint built into the algorithm, so that it is relatively unaffected by data inconsistencies introduced by signal noise. However, the EM methodology is limited in its ability to solve the data insufficiency problem.

For specific imaging problems, an accurate iterative scheme may be derived for the imperfect sampling problem by making a strong assumption on the image function. For example, in the specific example of reconstruction of blood vessels from few-view projections, one can assume that the 3D blood-vessel structure is sparse. It is possible to design an effective iterative algorithm that seeks a solution from sparse projection data. This can be accomplished by minimizing the $l_1$-norm of the image constrained by the fact that the image yields the measured projection data. The $l_1$-norm of the image is simply the sum of the absolute values of the image pixel values, and its minimization subject to linear constraints leads to sparse solutions. Again, this solution to the sparse data problem only addresses a very specific type of imaging.

Still another methodology uses total variation (TV) for recovering an image from sparse samples of its Fourier transform (FT). TV has been utilized in image processing for denoising of images while preserving edges. In this methodology, the optimization program of minimizing the image TV was investigated under the constraint that the FT of the image matches the known FT samples. This optimization program may satisfy an "exact reconstruction principle" (ERP) for sparse data. Specifically, if the number of FT samples is twice the number of non-zero pixels in the gradient image, then this optimization program can yield a unique solution, which is in fact the true image for almost every image function. The algorithm for FT inversion from sparse samples was applied to image reconstruction from 2D parallel-beam data at few-views. The use of the FT-domain TV algorithm (FT-TV) to address the 2D parallel-beam problem is only possible because of the central slice theorem, which links the problem to FT inversion. However, the FT-TV methodology is limited to imaging using a parallel-beam and cannot be applied to image reconstruction for divergent-beams, such as fan-beam and cone-beam CT. This is because the FT-TV relies on the central slice theorem to bring the projection data into the image's Fourier space. Therefore, there is a need to reconstruct images from few view or limited angle data generated from divergent beams.

SUMMARY

The invention comprises a method and apparatus for reconstructing images from limited or incomplete data, such as few view or limited angle data and data containing exterior and/or interior truncations. The data can be interpreted as a linear transform of the object, such as projections generated from parallel or divergent beams. In one aspect of the invention, the method and apparatus iteratively constrains the variation of an estimated image in order to reconstruct the image. As one example, a divergent beam may be used to generate data ("actual data"). As discussed above, the actual data may be less than sufficient to exactly reconstruct the image by conventional techniques, such as FBP. In order to reconstruct an image, a first estimated image may be generated. Estimated data may be generated from the first estimated image, and compared with the actual data. The comparison of the estimated data with the actual data may include determining a difference between the estimated and actual data. The comparison may then be used to generate a new estimated image. For example, the first estimated image may be combined with an image generated from the difference data to generate a new estimated image.

In order to generate the image for the next iteration, the variation of the new estimated image may be constrained. For example, the variation of the new estimated image may be at least partly constrained in order to lessen or reducing the total variation of the image.

BRIEF DESCRIPTION OF THE DRAWINGS

FIG. 1b depicts a magnitude of the gradient image of the Shepp-Logan phantom shown if FIG. 1a.

FIG. 6a shows the true image and images reconstructed by use of the TV, EM, and ART methodologies, respectively, from 20-view projection data.

FIG. 6b depicts image profiles along the centers of the images in the horizontal and vertical directions obtained with the TV algorithm (thick line) for the TV methodology reconstructed images shown in FIG. 6a.

FIG. 6c depicts image profiles along the centers of the images in the horizontal and vertical directions obtained with the EM (dashed lines) and ART (dotted lines) algorithms for the EM and ART reconstructed images shown in FIG. 6a.

FIG. 8a shows the true image and images reconstructed by use of the TV, EM, and ART methodologies, respectively, from data over 180°.

FIG. 8b depicts image profiles shown in FIG. 8a along the centers of the images in the horizontal and vertical directions obtained with the TV algorithm (thick line) for the TV methodology reconstructed images shown in FIG. 8a.

FIG. 8c depicts image profiles along the centers of the images in the horizontal and vertical directions obtained with the EM (dashed lines) and ART (dotted lines) algorithms for the EM and ART reconstructed images shown in FIG. 8a.

FIG. 9a shows the true image and images reconstructed by use of the TV, EM, and ART algorithms from data over 90°.

FIG. 9b depicts image profiles along the centers of the images in the horizontal and vertical directions obtained with the TV algorithm (thick line) for the TV methodology reconstructed images shown in FIG. 9a.

FIG. 9c depicts image profiles along the centers of the images in the horizontal and vertical directions obtained with the EM (dashed lines) and ART (dotted lines) algorithms for the EM and ART reconstructed images shown in FIG. 9a.

FIG. 11a shows the true image and images reconstructed by use of the TV, EM, and ART methodologies, respectively, from data containing bad detector bins.

FIG. 11b depicts image profiles along the centers of the images in the horizontal and vertical directions obtained with the TV algorithm (thick line) for the TV methodology reconstructed images shown in FIG. 11a.

FIG. 11c depicts image profiles along the centers of the images in the horizontal and vertical directions obtained with the EM (dashed lines) and ART (dotted lines) algorithms for the EM and ART reconstructed images shown in FIG. 11a.

FIG. 12a shows the true image and images reconstructed by use of the TV, EM, and ART methodologies, respectively, from 20-view data containing bad detector bins.

FIG. 12b depicts image profiles along the centers of the images in the horizontal and vertical directions obtained with the TV algorithm (thick line) for the TV methodology reconstructed images in FIG. 12a.

FIG. 12c depicts image profiles along the centers of the images in the horizontal and vertical directions obtained with the EM (dashed lines) and ART (dotted lines) algorithms for the EM and ART reconstructed images in FIG. 12a.

FIG. 13a shows the true image with a wavy background and images reconstructed by use of the TV, EM, and ART methodologies, respectively, from 20-view data.

FIG. 13b depicts image profiles along the centers of the images in the horizontal and vertical directions obtained with the TV algorithm (thick line) for the TV methodology reconstructed images in FIG. 13a.

FIG. 13c depicts image profiles along the centers of the images in the horizontal and vertical directions obtained with the EM (dashed lines) and ART (dotted lines) algorithms for the EM and ART reconstructed images in FIG. 13a.

FIG. 14a shows the true image with a wavy background and images reconstructed by use of the TV, EM, and ART methodologies, respectively, from bad detector bin data.

FIG. 14b. depicts image profiles along the centers of the images in the horizontal and vertical directions obtained with the TV methodology (thick line) for the TV methodology reconstructed images in FIG. 14a.

FIG. 14c depicts image profiles along the centers of the images in the horizontal and vertical directions obtained with the EM (dashed lines) and ART (dotted lines) algorithms for the EM and ART reconstructed images in FIG. 14a.

FIG. 17a shows an example of a Shepp-Logan image.

FIG. 17b shows partial data for the object depicted in FIG. 17a if only exterior data may be obtained.

FIG. 17c shows an image reconstruction using Filtration-backprojection using the data from FIG. 17b.

FIG. 17d shows an image reconstruction using the TV methodology using the data from FIG. 17b.

FIG. 18a shows an example of a Shepp-Logan image.

FIG. 18b shows partial data for the object depicted in FIG. 18a if interior data is obtained but at least some of the exterior data is excluded.

FIG. 18c shows an image reconstruction using Filtration-backprojection using the data from FIG. 18b.

FIG. 18d shows an image reconstruction using the TV methodology using the data from FIG. 18b.

FIG. 19a shows an example of a Shepp-Logan image depicting spots.

FIG. 19b shows partial data for the object depicted in FIG. 19a if few views (e.g., 5 views) are obtained.

FIG. 19c shows an image reconstruction using Filtration-backprojection using the data from FIG. 19b.

FIG. 19d shows an image reconstruction using the TV methodology using the data from FIG. 19b.

FIG. 20a shows an example of a Shepp-Logan image.

FIG. 20b shows partial data for the object depicted in FIG. 20a if few views and interior data (but not exterior data) are obtained.

FIG. 20c shows an image reconstruction using Filtration-backprojection using the data from FIG. 20b.

FIG. 20d shows an image reconstruction using the TV methodology using the data from FIG. 20b.

FIG. 21a shows an example of a Shepp-Logan image.

FIG. 21b shows partial data for the object depicted in FIG. 21a if data with metal is removed.

FIG. 21c shows an image reconstruction using Filtration-backprojection using the data from FIG. 21b.

FIG. 21d shows an image reconstruction using the TV methodology using the data from FIG. 21b.

FIGS. 22a-e show images reconstructed by TV from noisy projection data taken at only 25 views.

FIG. 24b shows a vertical slice, gray scale window [0.3, 1.7], of the disk phantom for the configuration in FIG. 24a, and FIG. 24c shows its projection from a single view.

FIGS. 25a-b show vertical slices of volumes reconstructed by TV-minimization (FIG. 25a) and POCS (FIG. 25b) for the case of ideal, consistent projection data. The gray scale window is [0.3, 1.7].

FIGS. 25c-d show the profiles for the reconstructed images in FIGS. 25a-b and the phantom along the z-axis.

FIGS. 26a-b show vertical slices of volumes reconstructed by TV-minimization (FIG. 26a) and POCS (FIG. 26b) for projection data from the discrete disk phantom with 0.1% Gaussian noise. The gray scale window is [0.3, 1.7].

FIGS. 26c-d show the profiles for the reconstructed images in FIGS. 26a-b and the phantom along the z-axis.

FIG. 30a shows the inverse Fourier transformed image after addition of Gaussian noise in Fourier space. FIG. 30b shows the image reconstructed from these data. FIGS. 30c-d show the reconstructed horizontal and vertical profiles (solid line) overlaid on the original noisy image (dotted line).

FIGS. 31a-d are the same as FIGS. 30a-d, but the Gaussian noise has been tapered in Fourier space to emphasize noise on larger scales as seen in FIG. 31a. FIGS. 31b-c illustrate the results.

DETAILED DESCRIPTION OF THE PRESENTLY PREFERRED EMBODIMENTS

Figure 1B:
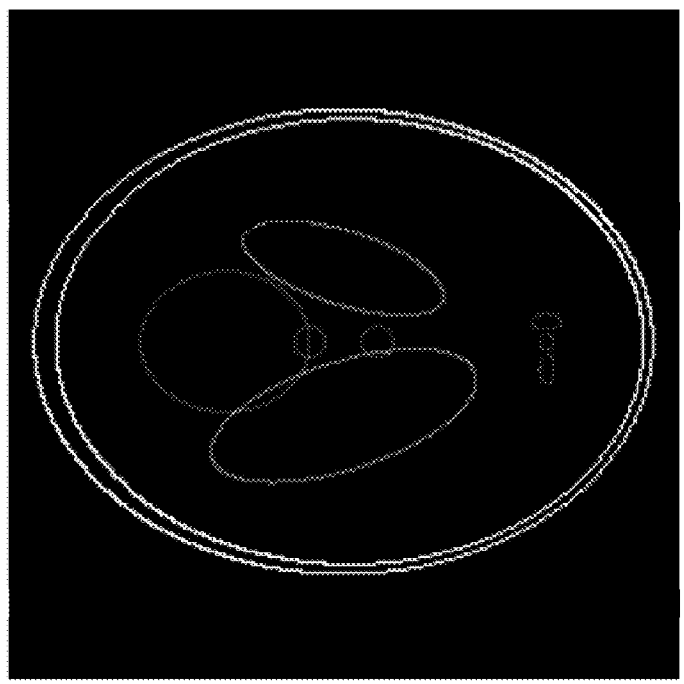

In order to address the deficiencies of the prior art, a method and apparatus is described below for imaging an object using data which is limited or incomplete, such as few-views or limited angle data. The limited data may be due to a variety of reasons, such as few views, limited angle data, or other missing data problems (such as a bad detector). These reasons are provided as merely illustrative. For example, one may wish to reduce the dosage, the radiation exposure (such as in the instance of and X-ray source), the acquisition time, and/or data artifacts. In those instances, an image may still be generated, even though a limited amount of data is collected. As another example, the system and/or the object may result in a missing data problem. Specifically, the system may include a defect in it, such as a bad detector. Or, the object may include some aspect that limits the amount of data. As merely one example of this, the presence of any region of an object that effectively prevents transmission of radiation through a portion of the object may result in missing data problems. Specific examples may include artifacts caused by hip implants in CT imaging, metal dental implants in dental CT imaging, or x-ray absorbing implants used in brachytherapy. These examples are merely for illustrative purposes. The methodology presented herein may still allow generating an image from the data gathered, whether the data comprises partial data of the ROI or complete data of the ROI.

As discussed in the background, if the data was limited, reconstruction of the image from conventional techniques, such as FBP, was unacceptable. The following is an approach to overcoming the deficiencies of the prior art by recovering images accurately from limited (instead of full) knowledge of their transform (such as linear transform). An image with sparse structures may be accurately recovered from limited knowledge of its linear transform through the minimization of the $l_1$-norm of the estimate of the image provided the constraint that the measurements are consistent with the corresponding portion of the linear transform of the estimate of the image. However, this $l_1$-norm-based strategy may not work adequately for images encountered in most practically important applications such as medical imaging, because images in these situations have extended, instead of sparse, structures. One aspect of the invention extends the $l_1$-norm based strategy based on examining a specific characteristic (such as variation) of the estimated image.

Although an image with an extended distribution does not have sparse structures, the distribution of its gradient magnitude, which may also be referred to as the total variation (TV), may have sparse structures. Furthermore, if the structures of the TV of an image are not sparse, its second-order TV, which is the square root of the summation of the squares of its second order partial derivatives, is likely to have sparse structures. Similarly, one can define high-order TVs of the image, and these TVs are likely to have sparse structures.

The present approach may achieve the recovery of the image from limited knowledge of its linear transform through the minimization of the linear combination of the $l_1$-norm and the TVs of the image under the constraint that the linear transform of the estimated image is consistent with the measured data. In essence, the (n+1)th-order TV may be interpreted as the $l_1$-norm of the nth-order partial derivative distribution of the image. Therefore, the linear combination of these generalized TVs can in effect be understood as a $l_1$-norm problem.

The methodology may be modified and implemented as a constraint optimization procedure. It can also be implemented in other ways. Further, the methodology may be applied to a wide variety of imaging problems. Examples of areas of application include, but are not limited to: medicine, animal imaging, industrial non-destructive detection, security scanning, and other applications. The following are some examples of the imaging problems that may be addressed by use of the methodology: (1) Fourier-based MRI and EPRI (sparse Cartesian samples, spiral samples); (2) Projection-based few-view and limited-view EPRI; (3) Metal and other artifacts in fan-beam and cone-beam CT and in MRI; (4) Interior problems in CT, MRI, and other imaging modalities; (5) Exterior problems in CT and other imaging modalities; (6) Few-view CT, SPECT, reflectivity tomography, and other imaging modalities; (7) Limited-view CT, SPECT, reflectivity tomography, and other imaging modalities; (8) Few-view (and limited-view) diffraction tomography; (9) Circular cone-beam CT problem; (10) Few-view and limited-view circular cone-beam CT problem; (11) C-arm imaging problem (i.e., few view and limited view); (12) On-board imager problem in radiation therapy; (13) Few-view and limited view phase contrast CT; (14) Limited view problem in PET with panel detectors; (15) Tomosynthesis (few view and limited view); (16) CT- and C-arm-based angiography; (17) Security scans of luggage, container, and other objects with few views on a trajectory (line or other curve forms) of finite path length; (18) Microscopic scans; and (19) Oil and mine exploration scans. These examples are merely illustrative.

In order to overcome the limited data problem, an $l_1$-based methodology is used. The $l_1$-based methodology ordinarily cannot be used in many imaging applications, including medical and other tomographic imaging applications, since the $l_1$-based methodology requires sparse data and the images are generally extended distributions.

Rather than merely looking at the individual values of the image, one may examine different aspects of the image that have a sparse data quality. For example, one may examine the variation across an image. Often times in medical and other applications, tomographic images are relatively constant over extended volumes, for example within an organ, changing rapidly only at the boundaries of internal structures. Thus, an image itself might not be sparse, but the image formed by taking the magnitude of its gradient could be approximately sparse.

Figure 1A:
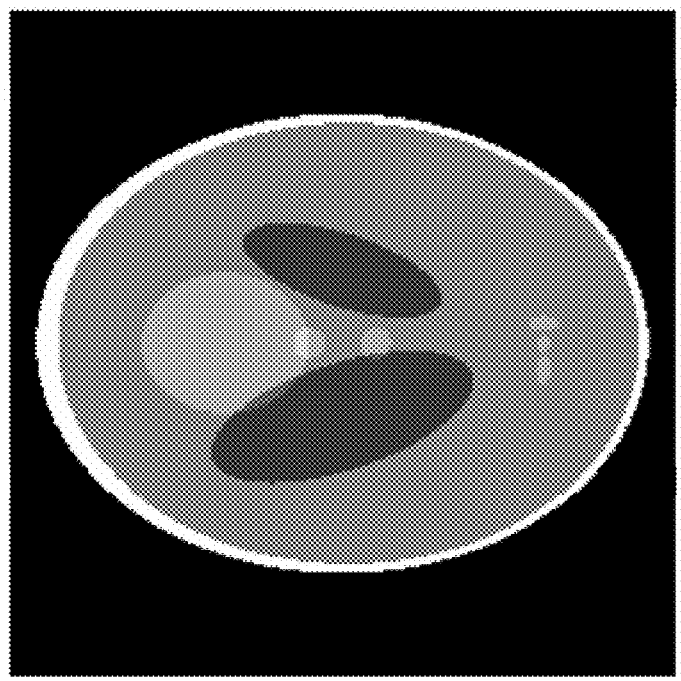
FIG. 1a depicts a Shepp-Logan phantom shown in a gray scale window of [0.87, 1.15].

An example of this is shown in FIGS. 1a-1b. In the drawings where like reference numerals refer to like elements, FIG. 1a depicts a Shepp-Logan phantom shown in a gray scale window of [0.87, 1.15]. Referring to FIG. 1b, there is shown a magnitude of the gradient image of the Shepp-Logan phantom. As shown in FIG. 1b, there is a sparseness of the gradient image. If the pixel values are labeled by $f_{s,t}$, the image gradient magnitude is:

$$|\vec{\nabla} f_{s,t}| = \sqrt{(f_{s,t} - f_{s-1,t})^2 + (f_{s,t} - f_{s,t-1})^2}. \quad (1)$$

This quantity in Eq. (1) may be referred to as the gradient image. As merely one example, the number of non-zero pixels in the 256×256 image depicted in FIG. 1a is 32,668. By contrast, the number of non-zero pixels in its gradient image depicted in FIG. 1b is only 2,183.

To develop an iterative methodology that takes advantage of this sparseness, the objective function to be minimized is the $l_1$-norm of the gradient image, otherwise known as the total variation (TV) of the image:

$$\|f_{s,t}\|_{TV} = \sum_{s,t} |\vec{\nabla} f_{s,t}| = \sum_{s,t} \sqrt{(f_{s,t} - f_{s-1,t})^2 + (f_{s,t} - f_{s,t-1})^2}. \quad (2)$$

The use of the image TV in the present application is different from previous applications in that the methodology is an implementation of an optimization program, which may possibly yield the exact image for sparse data problems under the condition of exact data consistency.

The present TV methodology may be used for image reconstruction from divergent-beam projections, such as image reconstruction for both fan-beam and cone-beam CT imaging. Other types of divergent beams may be used. An iterative TV methodology may be used that can reconstruct accurate images from sparse or insufficient data problems that may occur due to practical issues of CT scanning. In the examples discussed below, the sparse data problem may include reconstruction from few-view projections. Similarly, the iterative TV methodology may be used for any sparse data problem, such as insufficient data problems from data acquired over a limited angular range or with a detector containing gaps due to bad detector bins. Further, the numerical results below relate to fan-beam CT. However, the iterative TV methodology may be applied to different diverging beams (such as cone-beam CT) and different types of imaging.

As discussed above, the iterative TV methodology may be used for image reconstruction with divergent-beams. The image function may be represented in its discrete form as a vector $\vec{f}$ of length $N_{image}$ with individual elements $f_j$, j=1, 2, ..., $N_{image}$. When it is preferable to refer to pixels in the context of a 2D image, the double subscript form $f_{s,t}$ may be used where $$j=(s-1)W+t; s=1,2, \ldots ,H; t=1,2, \ldots ,W; \quad (3)$$

and integers W and H are, respectively, the width and height of the 2D image array, which has a total number of pixels $N_{image}$=W×H. The projection-data vector $\vec{g}$ may have length $N_{data}$ with individual measurements referred to as $g_i$, i=1, 2, ..., $N_{data}$.

The general theoretical setting for the TV algorithm discussed here involves inversion of a discrete-to-discrete linear transform:

$$\vec{g} = M\vec{f}, \quad (4)$$

where the system matrix M may be composed of $N_{data}$ row vectors $\vec{M}_i$ that yield each data point, $g_i = \vec{M}_i \cdot \vec{f}$. The individual elements of the system matrix are $M_{ij}$. The image may be represented by the finite vector $\vec{f}$ from knowledge of the data vector $\vec{g}$ and the system matrix M. Mathematically, the problems may involve insufficient data; for example, the number of data samples $N_{data}$ may not be enough to uniquely determine the $N_{image}$ values of the image vector $\vec{f}$ by directly inverting Eq. (4). Some assumptions may be made on the image function $\vec{f}$ to arrive at a solution from knowledge of the data $\vec{g}$.

To solve the linear system represented in Eq. (4), a TV methodology may be used that at least partly constrains the variation. For example, the TV methodology may be used to constrain the variation with the following optimization program: Find $\vec{f}$ that $$\min \|\vec{f}\|_{TV} \text{ such that } M\vec{f} = \vec{g}, f_j \geq 0. \quad (5)$$

In the methodology, the minimization of the image TV may be performed by the gradient descent method, and the constraints imposed by the known projection data may be incorporated by projection on convex sets (POCS). POCS may be used for enforcing the projection data constraint, because, even in the case of sparse sampling, the size of the projection data sets may be large, and POCS may efficiently handle large data sets. In the following, the system matrix used for modeling the divergent-beam projections is defined, and the TV methodology for implementing the program in Eq. (5) is defined. The linear system matrices corresponding to the various scanning configurations discussed below may support an exact reconstruction principle for insufficient data, as demonstrated by the numerical examples discussed below.

Figure 2:
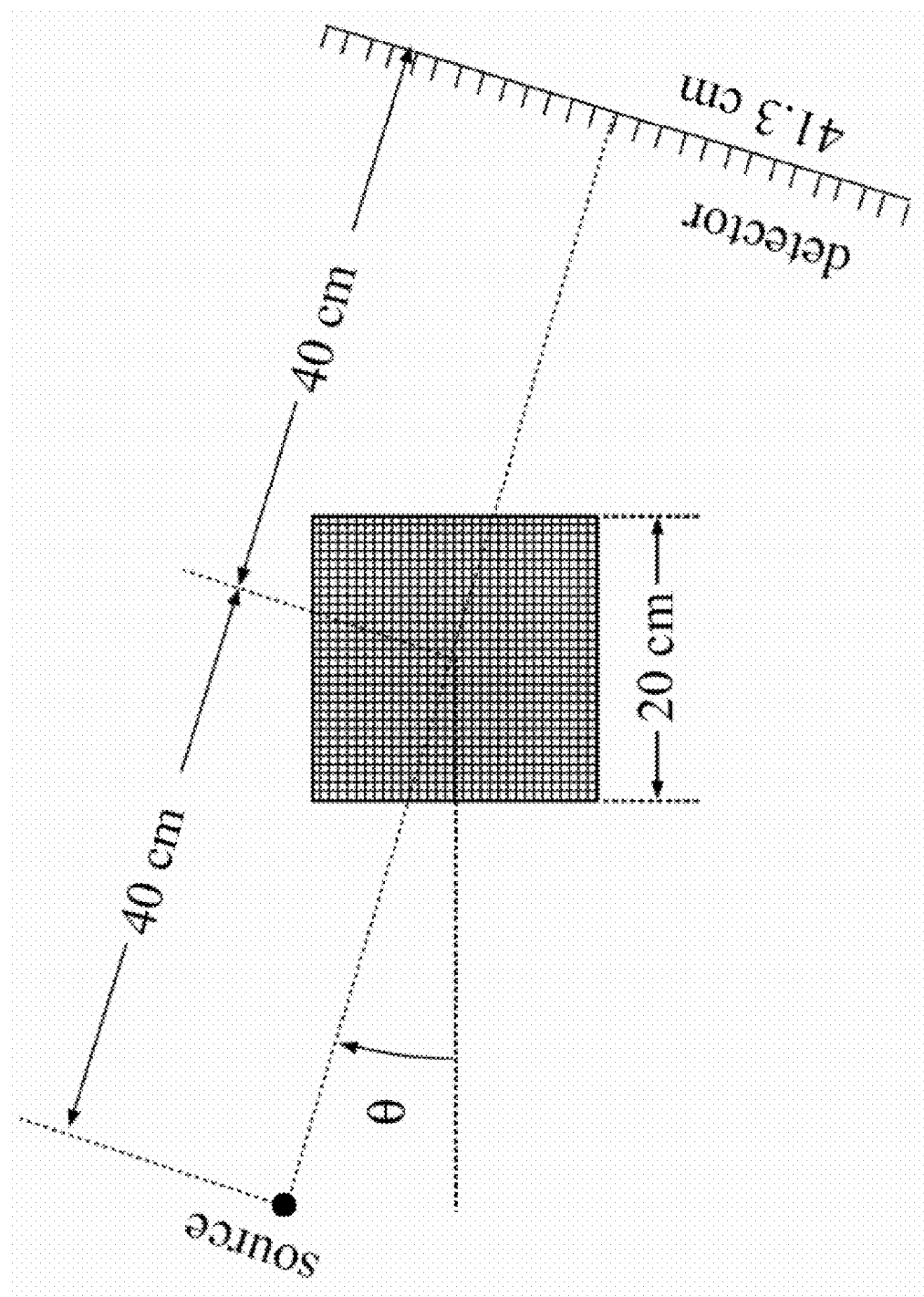
FIG. 2 depicts an example of a fan-beam CT configuration.

One example of a divergent-beam is shown in FIG. 2, which depicts a fan-beam CT configuration. As shown in FIG. 2, the source may be an x-ray source of a single spot for each projection view, with the beams emanating from the single spot. The projection data may be captured on a 1D or 2D detector array for the fan-beam or cone-beam system. The examples discussed below focus on the fan-beam configuration shown in FIG. 2. However, the fan-beam configuration is show for illustrative purposes only. Other types of divergent beams may be used. Further, the beam may be used for imaging of a region of interest (ROI), such as a 2-dimensional, 3-dimensional, or n-dimensional ROI. Further, the source may follow any trajectory, such as a line scan, a circular scan, or a helical scan. Line, circular and helical scans are merely exemplary and other scans may be used.

Figure 3:
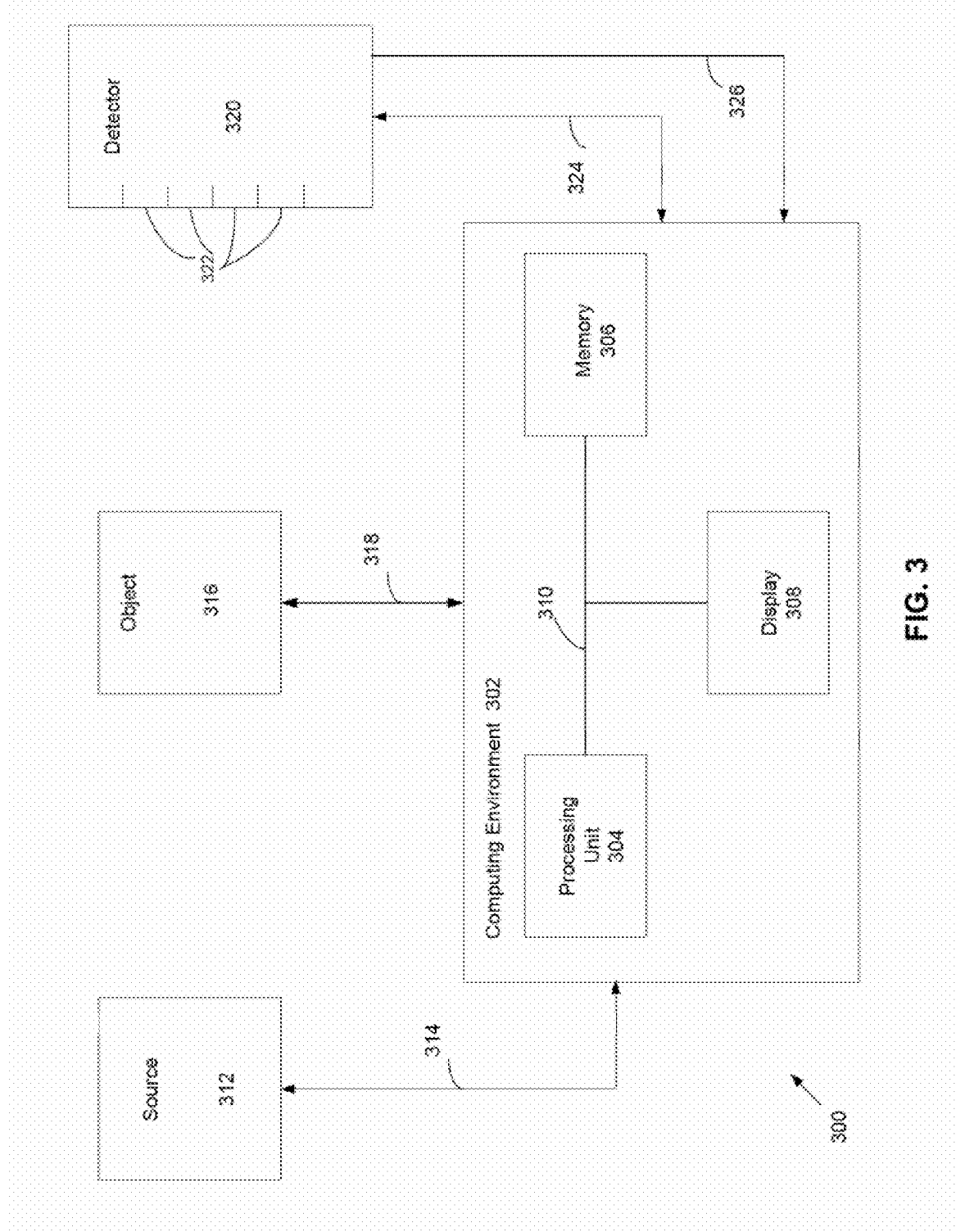
FIG. 3 depicts a block diagram of an exemplary imaging system.

The divergent beam may be part of an imaging system. One example of an imaging system 300 is shown in FIG. 3. The system 300 may include any type of imaging system. Examples of types of imaging systems include, but are not limited to: computed tomography (CT), positron emission tomography (PET), single-photon emission computed tomography (SPECT), magnetic resonance imaging (MRI), electron paramagnetic resonance imaging (EPRI), tomosynthesis (such as if a trajectory is used which creates chords which pass through the portion to be imaged, as discussed below), and wave imaging (such as phase contrast imaging, thermacoutic imaging, and thermooptical imaging). Moreover, the imaging system may include a single type of imaging, or multiple types of imaging. For example, the imaging system may comprise CT imaging. Alternatively, the imaging system may comprise multiple modality imaging, such as CT and PET imaging in combination. Further, the imaging system may be used in combination with another system. For example, the imaging system may be integrated with a therapeutic system, such as a radiation therapy delivery system. The two systems may work in combination with the imaging system providing imaging for guidance (such as CT imaging) and radiation therapy for treatment.

With reference to FIG. 3, an exemplary imaging system 300 for implementing the invention includes a general purpose computing device in the form of a computing environment 302, including a processing unit 304, a system memory 306, and display 308. A system bus, 310, may couple various system components of the computing environment 302, including the processing unit, 304, the system memory 306, and the display 308. The processing unit 304 may perform arithmetic, logic and/or control operations by accessing system memory 306. For example, the processing unit 304 may control the various system components to acquire data for imaging and may process the acquired data to generate an image. Alternatively, different system processors, or different devices may control the various system components to acquire data for imaging and may process the acquired data to generate an image.

The system memory 306 may store information and/or instructions for use in combination with processing unit 304. For example, the system memory 306 may store computer readable instructions, data structures, program modules or the like for operation of the imaging system 300, including, for example, control of movement of any of the source, object, and detector and control of the functionality of the source and the detector, as discussed below. Further, the system memory 306 may store data obtained from detector 320 and may process the data for display on the display 308, as discussed in more detail below. The system memory 306 may include volatile and non-volatile memory, such as random access memory (RAM) and read only memory (ROM). It should be appreciated by those skilled in the art that other types of computer readable media which can store data that is accessible by a computer, such as magnetic cassettes, flash memory cards, random access memories, read only memories, and the like, may also be used in the exemplary computer environment. A user may enter commands and/or information, as discussed below, into the computing environment 302 through input devices such as a mouse and keyboard, not shown. The commands and/or information may be used to control operation of the imaging system, including acquisition of data and processing of data.

FIG. 3 further shows source 312 communicating with computing environment 302 via line 314. Source 312 may be stationary or may move relative to any one, or both, of object 316 and detector 320. Line 314 may also control movement of source 312, such as by sending commands to a motor (not shown) to move all or a part of source 312. For example, if the source 312 is an X-ray tube, the motor may move the entire X-ray tube relative to one, or both of, object 316 and detector 320. Alternatively, the X-ray tube may remain stationary with a reflector revolving using the motor. In this manner, the beam emanating from the X-ray tube may be moved by bouncing the beam off the revolving reflector.

The source 312 may comprise any device which generates any signal that may be received from detector 320. The source 312 selected for imaging system 300 may depend on the type of imaging performed by imaging system 300. For example, source 312 may generate electromagnetic radiation in any frequency range, such as gamma rays, x-rays, visible light, microwaves, and radio/tv waves. Specifically, source 312 may comprise an X-ray source and generate X-rays or may comprise a radio frequency (RF) source and generate radio waves. Source 312 may also generate other types of signals such as magnetic fields, mechanical waves (e.g., sound waves), heat, particle (e.g., electron, proton, neutron), or the like. Though depicted in imaging system 300, certain types of imaging systems do not require a source (such as source 312). For example, PET scanning does not require an external source.

FIG. 3 also shows object 316. Object 316 may comprise anything that is capable of being scanned, such as a living organism (e.g., human or animal) or a non-living object (e.g., a piece of luggage, a cargo container, food, an ocean, underground the earth, etc.). The position of the object may be stationary or may move relative to any one, or both, of source 312 and detector 320. Line 318 may control movement of object 316, such as by sending commands to a motor (not shown) to move object 316. Any part, or all, of object 316 may be imaged using imaging system 300. Further, the object may ingest or be injected with a substance, such as a contrast agent, which may assist in imaging a part or all of object 316. As shown in FIG. 3, source 312 is external to object 316. Alternatively, source 312 may be internal to object 316.

FIG. 3 further shows detector 320 communicating with computing environment 302 via lines 324 and 326. Line 324 may comprise a control line whereby the processing unit may control at least one characteristic of detector 320. Line 326 may comprise a data line whereby data sensed from the detectors may be sent to computing environment 302 for processing by processing unit 304, as discussed below. Detector 320 may comprise any type of detector which senses any datum, such as electromagnetic radiation from any frequency range (such as X-rays), magnetic fields, sound waves, heat, or the like. For example, for a 2-dimensional detector (flat-panel imager), detector 320 may comprise one row of detectors for fan beam geometry, four rows of detectors for quasi-fan-beam geometry, or more than four rows of detectors for cone-beam geometry. Detector 320 may be stationary or may move relative to any one, or both, of source 312 and object 316. Line 324 may control movement of detector 320, such as by sending commands to a motor (not shown) to move all or a part of detector 320. As shown in FIG. 3, detector 320 is external to object 316. Alternatively, detector 320 may be internal to object 316. Thus, both source 312 and detector 320 may be internal or external to the object. Moreover, source 312 may be internal and detector 320 may be external to object 316, or source 312 may be external and detector 320 may be internal to object 316. For example a dental image of a patient may be acquired with an external source and a detector held in the mouth of a patient.

In an additional embodiment of the invention, the system may comprises a first component for reconstructing an image of an object from acquired data using data that are sufficient to reconstruct a substantially exact image of the object; a second component for reconstructing an image of an object from acquired data using data that are less than that sufficient to reconstruct an exact image of the object; a third component for determining whether the acquired data are sufficient to reconstruct a substantially exact image of the object; and a fourth component for selecting which of the first and second components are used, based on the output of the third component. The first component may implement any one of a number of image reconstruction algorithms that are known in the art. The second component may use the algorithms described herein. The third component of determining whether the acquired data are sufficient to reconstruct a substantially exact image of the object may be performed in a variety of ways. For example, the determining may be implemented by assessing image quality, such as those described in U.S. Pat. Nos. 6,535,636, 5,739,924 or "Image Quality Assessment: From Error Measurement to Structural Similarity", Wang, et al., IEEE Transactions on Image Processing, Vol, 13, No. 1, 2004, each of which are incorporated by reference herein in their entirety. Alternatively, the third component may examine the acquired data directly, for example to detect had detector cells, such as is described in U.S. Patent Application 20050063513A1, incorporated by herein in its entirety. Or, the third component may analyze the configuration of the system (such as the amount of views scheduled to be obtained or have been obtained).

Alternatively, the system may comprise a first component for reconstructing an image of an object from acquired data using data that are sufficient to reconstruct a substantially exact image of the object; a second component for reconstructing an image of an object from acquired data using data that are less than that sufficient to reconstruct an exact image of the object; and a third input component providing a means for a user to select which of the first and second components are used. The user may make this selection before image acquisition based on factors such as the size, shape or location of the region to be imaged, or knowledge of a metal implant in a patient. Alternatively, the user may make this selection after image acquisition, based on an assessment of the image quality made using one of the first and second components. Thus, the determining may be based on an analysis prior to acquisition of the data, during acquisition of the data, or after acquisition of the data.

In one example, the detector may be modeled as a straight-line array of 512 detector bins, which may be large enough so that the field-of-view is the circle inscribed in the 256×256 imaging array. The CT measurements may be related to the path integral of the x-ray attenuation coefficient along the rays defined by the source spot and individual detector bins. In the discrete setting, these ray integrals may be written as weighted sums over the pixels traversed by the source-bin ray as $$d_i = \sum_{j=1}^{N_{image}} M_{ij} f_j, \text{ where } i = 1, 2, \ldots, N_{data} \qquad (6)$$

Figure 4:
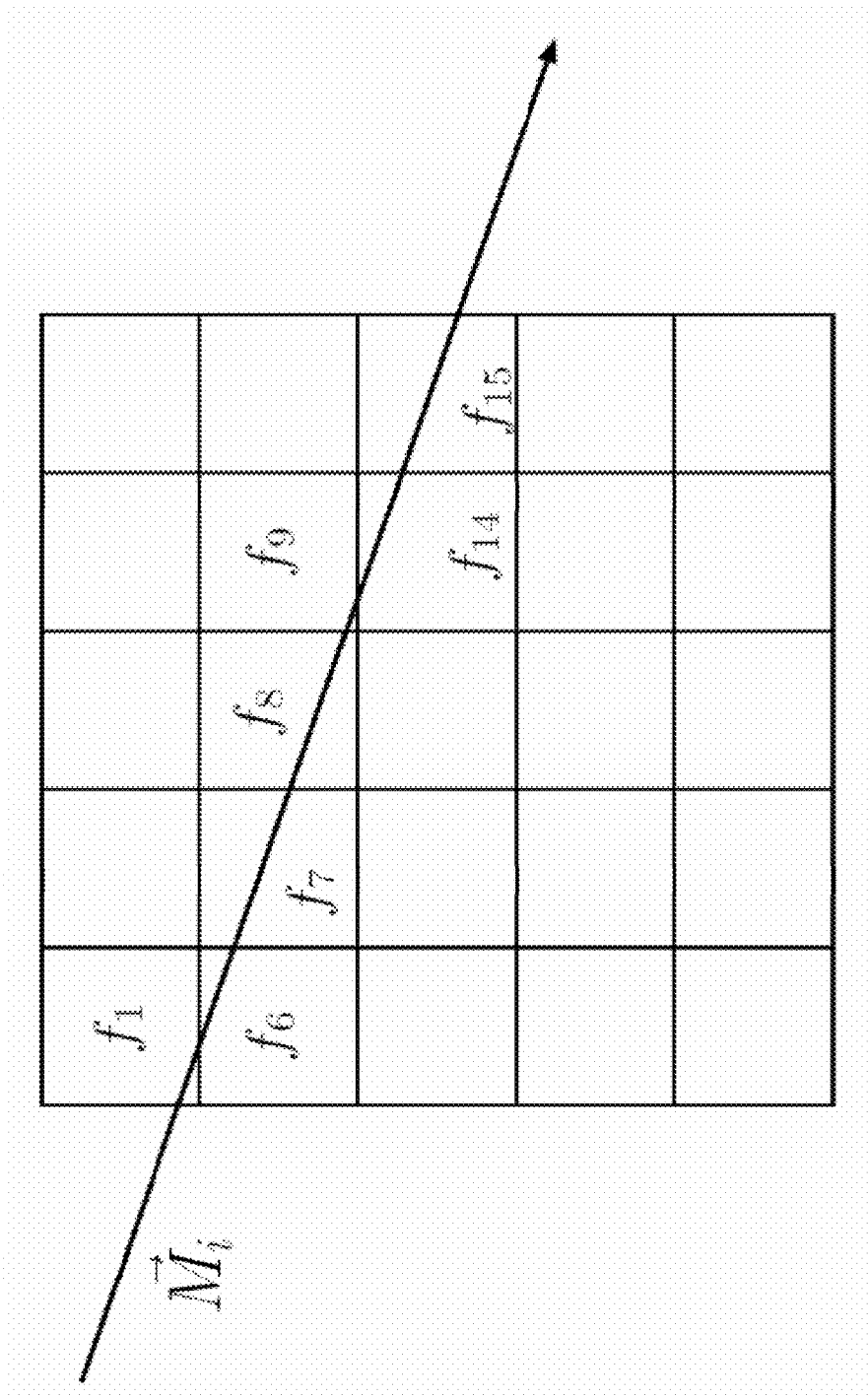
FIG. 4 illustrates an individual row vector of the system matrix.

To model the fan-beam projection of the discrete image array, one may use the ray-driven projection model where the system matrix weights $M_{ij}$ are computed by calculating the intersection length of the i th ray through the j th pixel. An example of the ray-driven system matrix is illustrated for a 5×5 image array in FIG. 4. Specifically, FIG. 4 illustrates an individual row vector of the system matrix $\vec{M}_i$. In this case, the data point $d_i$ is calculated as $d_i = \sum_{j=1}^{25} M_{ij} f_j$, where $M_{ij}$ is the length of the i th ray traversing the j th pixel. The system matrix illustrated in FIG. 4 has non-zero entries only on image pixels $f_1$, $f_6$, $f_7$, $f_8$, $f_9$, $f_{14}$, and $f_{15}$.

The ray-driven projection model is merely for illustrative purposes. There are other ways to model the discrete projection, such as pixel-driven and distance-driven models, which provide alternative definitions of pixel weights. Moreover, even though the system matrix discussed herein is for the fan-beam configuration, the model may also be applied to other divergent beams. For example, the model may be applied to cone-beam 3D imaging.

The TV methodology discussed herein is different from the FT-TV methodology discussed in the background. As merely one example, the system matrix used is different. The 2D parallel-beam data are processed in the FT-TV methodology by taking a 1D FT along the detector coordinate, and the system matrix is the discrete 2D FT. In contrast, the system matrix described herein may represent directly the discrete ray integration of the image, and there is no transformation of the projection data. Thus, even in the limit that the focal length of the fan-beam tends to infinity, the TV methodology discussed herein does not yield the FT-TV algorithm discussed in the background.

The TV methodology may constrain, such as minimize, the TV of the image estimate. This may be accomplished by using a gradient descent method and/or other optimization methods. Performing the gradient descent may include the expression for the gradient of the image TV. This gradient may also be thought of as an image, where each pixel value is the partial derivative of the image TV with respect to that pixel. Taking the derivative of $\|\vec{f}\|_{TV}$ with respect to each pixel value results is a singular expression. The following is an approximate derivative:

$$v_{s,t} = \frac{\partial \|\vec{f}\|_{TV}}{\partial f_{s,t}} \approx \frac{2(f_{s,t} - f_{s-1,t}) + 2(f_{s,t} - f_{s,t-1})}{\sqrt{\varepsilon + (f_{s,t} - f_{s-1,t})^2 + (f_{s,t} - f_{s,t-1})^2}} - \frac{2(f_{s+1,t} - f_{s,t})}{\sqrt{\varepsilon + (f_{s+1,t} - f_{s,t})^2 + (f_{s+1,t} - f_{s+1,t-1})^2}} - \frac{2(f_{s,t+1} - f_{s,t})}{\sqrt{\varepsilon + (f_{s,t+1} - f_{s,t})^2 + (f_{s,t+1} - f_{s-1,t+1})^2}}, \qquad (7)$$

where $\varepsilon$ is a small positive number; for the results below $\varepsilon = 10^{-8}$ is used. This expression may be valid for non-border pixels. The resulting gradient vector may be referred to as $\vec{v}$, and similar to the image vector, its individual elements may be denoted by either a single $v_j$ index or pixel indexes $v_{s,t}$. Further, the normalized TV gradient $\hat{v}$; may be used.

As shown in Eq. (7), the minimization for the total variation may be a first order derivative. Alternatively, the minimization for the total variation may be a higher order derivative. For example, the minimization of the total variation may comprise a second order derivative. Further, the minimization may comprise single and higher orders. Thus, any order of the total variation (such as first order, second order, etc.) of the estimated image or combinations of orders of total variation (such as first and second order, etc.) may be examined.

The POCS method may be used to realize the linear system constraints in Eq. (5). Each measured point $g_i$ of the data vector may specify a hyperplane in the $N_{image}$-dimensional space of all possible solutions $\vec{f}$. The basic POCS method may project the current estimate of $\vec{f}$ onto the hyperplanes, which are convex sets, corresponding to each data point in sequential order. By repeating this process the image estimate may move toward the intersection of all of these hyperplanes, which is the sub-space of valid solutions to the linear system. In the present POCS implementation, the positivity constraint may also be included.

Having specified the system matrix, TV gradient, and data constraints, the iterative steps of the TV algorithm may be described. The iterative steps may implement the optimization program described in Eq. (5) for image reconstruction from divergent-beam data. Each iteration within the reconstruction procedure may comprise three steps: the DATA-step, which enforces consistency with the projection data; the POS-step, which ensures a non-negative image; and the GRAD-step, which reduces the TV of the image estimate. The iteration performed in the algorithm may have two levels: the overall iteration number is labeled by n, and the sub-iterations in the DATA- and GRAD-steps are labeled by m. The image vector during the iterations of the DATA-step is $\vec{f}^{(TV\text{-}DATA)}[n,m]$, indicating the m th DATA-step sub-iteration within the n th iteration, $\vec{f}^{(TV\text{-}POS)}[n]$ may be used to denote the image estimate after projection onto the non-negative half-plane. Finally, $\vec{f}^{(TV\text{-}GRAD)}[n,m]$ may represent the mth gradient descent step within the nth iteration.

Figure 5:
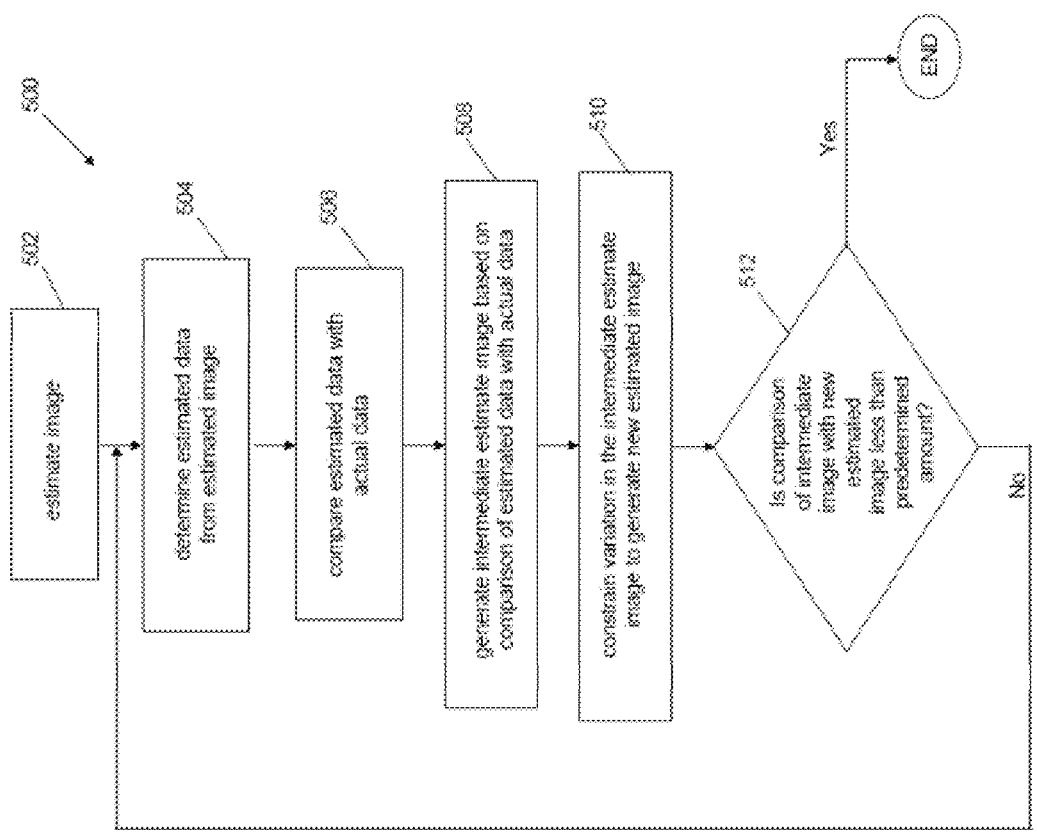
FIG. 5 depicts a flow chart 500 of one example of the TV methodology.

Referring to FIG. 5, there is show a flow chart 500 of one example of the methodology. As shown at block 502, an initial estimate of the image to be recovered may be selected or generated. The initial estimate may be part of an initialization procedure. For example, the initial estimate may comprise:

$$n=1 \text{ and } \vec{f}^{(TV\text{-}DATA)}[n,1]=0; \qquad (8)$$

As shown at block 504, using the initial estimate, estimated measurements may be determined. One example of determining the estimated measurements may include using the linear transform operator to determine the linear transform of the initial estimate image. For example, for data projection iteration, for m=2, ..., $N_{data}$:

$$\vec{f}^{(TV\text{-}DATA)}[n,m] = \vec{f}^{(TV\text{-}DATA)}[n,m-1] - \vec{M}_i \frac{g_i - \vec{M}_i \cdot \vec{f}^{(TV\text{-}DATA)}[n,m-1]}{\vec{M}_i \cdot \vec{M}_i}; \qquad (9)$$

An intermediate image may be determined based on the estimated measurements. For example, the intermediate image may be determined based on a comparison of the estimated data with the actual data. As shown at blocks 506 and 508, the intermediate image is determined As shown at block 506, the estimated data is compared with the actual data. One example of comparing the estimated data with the actual data comprises determining the difference. As shown at block 508, the intermediate estimate may be generated based on the comparison of the estimated data with the actual data. For example, the intermediate estimate may be generated using the adjoint, the approximate adjoint, the exact inverse, and/or the approximate inverse of the linear transform operator. Further, the intermediate estimate may be derived from the image or by reducing (in one step or iteratively) the differences between the estimated and actual measurements.

A new estimated image may be determined by analyzing at least one aspect (such as variation) of the intermediate estimate image. Specifically, the variation in the intermediate estimate image may be constrained to generate the new estimated image, as shown at block 510. For example, the generalized TVs of the intermediate estimated image may be minimized to generate the new estimated image. The new estimated image may be used as the initial estimate for block 504 and blocks 504 through 512 may be repeated until the intermediate estimated image and new estimated image converge (such as be less than a predetermined amount, as shown at block 512) or until the estimated data is less than a predetermined amount than the actual data. One example of a predetermined amount may comprise $\epsilon$, which is discussed in more detail below. See Table 1. One may use either intermediate estimated image or the new estimated image as the final estimate of the image. The intermediate image may generally be less smooth than the new estimated image.

The new estimated image may be determined by the following positivity constraint:

$$(f_j)^{(TV\text{-}POS)}[n] = \begin{cases} (f_j)^{(TV\text{-}DATA)}[n, N_{data}] & (f_j)^{(TV\text{-}DATA)}[n, N_{data}] \geq 0 \\ 0 & (f_j)^{(TV\text{-}DATA)}[n, N_{data}] < 0 \end{cases}$$

Further, TV gradient descent initialization may be as follows:

$$\vec{f}^{(TV\text{-}GRAD)}[n,1] = \vec{f}^{(TV\text{-}POS)}[n]$$

$$d_A(n) = \|\vec{f}^{(TV\text{-}DATA)}[n,1] - \vec{f}^{(TV\text{-}POS)}[n]\|_2 \qquad (11)$$

TV gradient descent, for: m=2, ..., $N_{grad}$ $$\vec{v}_{s,t}[n, m-1] = \frac{\partial \|\vec{f}\|_{TV}}{\partial f_{s,t}}\bigg|_{f_{s,t} = f_{s,t}^{(TV\text{-}GRAD)}[n,m-1]};$$

$$\hat{v}[n, m-1] = \frac{\vec{v}[n, m-1]}{|\vec{v}[n, m-1]|};$$

$$\vec{f}^{(TV\text{-}GRAD)}[n,m] = \vec{f}^{(TV\text{-}GRAD)}[n,m-1] - a d_A(n) \hat{v}[n,m-1]; \qquad (12)$$

And, the following may be the initialization for the next iteration:

$$\vec{f}^{(TV\text{-}DATA)}[n1,1] = \vec{f}^{(TV\text{-}GRAD)}[n, N_{grad}] \qquad (13)$$

In the present description, when referring to the iteration number of the TV algorithm, it is meant the iteration number of the outer loop indicated by the index n. As discussed above, the iteration may be stopped when there is no appreciable change in the intermediate images after the POCS steps; namely the difference between $\vec{f}^{(TV\text{-}POS)}[n]$ and $\vec{f}^{(TV\text{-}POS)}[n-1]$ is "small" or a predetermined amount.

The distance $d_A(n)$ may provide a measure for the difference between the image estimate before the DATA-step and the estimate after the enforcement of positivity. The gradient descent procedure may be controlled by specifying the parameter a, the fraction of the distance $d_A(n)$ along which the image is incremented, and $N_{grad}$ the total number of gradient descent steps that are performed. The methodology may rely on the balance between the POCS steps (DATA- and POS-steps) and the gradient descent. By scaling the size of the gradient descent step with $d_A(n)$ the relative importance of the POCS and gradient descent stages of the methodology remains balanced. As long as the total change in the image due to the gradient descent does not exceed the change in the image due to POCS, the overall iteration steps may steer the image estimates closer to the solution space of the imaging linear system.

If the step size of the gradient descent is too strong the image may become uniform and inconsistent with the projection data. On the other hand, if the step size of the gradient descent is too small, the methodology may reduce to standard ART with a positivity constraint included. For the results shown below, a=0.2, and $N_{grad}$=20 were selected. These values appear to strike a good balance between the POCS steps and the TV-gradient descent, and seem to work well for the wide range of reconstruction problems, including those addressed below. The methodology appears to be robust in that changes to the parameters only appear to alter the convergence rate and not the final image. Further, other methodology parameters may be used to improve the convergence speed.

The following are results using the TV methodology under "ideal" conditions. The results are merely for illustrative purposes. The true image solution may be taken to be the Shepp-Logan image shown in FIG. 1a discretized on a 256×256 pixel grid. This phantom is often used in evaluating tomographic reconstruction algorithms. As also shown in FIG. 1b, its gradient image is sparse with only 2,183 non-zero pixels. This number is roughly only 6.7% of the 32,668 non-zero pixels of the Shepp-Logan image itself. Taking the result for Fourier inversion as a rule of thumb for the current problem, one might expect that a minimum of twice as many non-zero, independent projection measurements are needed for obtaining the image. Thus a minimum of 4,366 measurements appears to be required for the ERP methodology. Shown below is the image recovery from sparse data with the "few-view" example. Subsequently shown below are the utility of the TV algorithm for other insufficient data problems where there are plenty of projection ray measurements, but the angular or projection\coverage is less than the minimum for analytic reconstruction in the corresponding continuous image function case. The insufficient data problems demonstrated below are merely for illustrative purposes. The insufficient data problems are the limited scanning angle problem and the "bad bins" problem where there is a gap on the detector for all available projection views.

For the numerical experiments described, the simulated fan-beam configuration are variations on the configuration shown in FIG. 2. In the first set of experiments, the data used are ideal in the sense that they are the exact line integrals, up to round-off error in the computer, of the discrete 256×256 Shepp-Logan image. They are, however, severely underdetermined so that there would be no chance of directly solving the linear equation in Eq. (4). The detector modeled has 512 bins, and the total number of measured rays is 512 multiplied by the number of view angles. The significant number is actually the total number of non-zero measurements, and this is stated with each example discussed below.

In order to illustrate the degree of ill-posedness for each numerical example, the present TV methodology is compared with standard EM and ART methodologies, which have been widely applied in an attempt to solve the underdetermined or unstable linear systems in tomographic imaging. In EM, the positivity constraint is built into the methodology, and for CT imaging applications the object function is positive. The EM implementation used here is basic, specified by the following update equation:

$$f_j^{(EM)}[n] = f_j^{(EM)}[n-1] \frac{\sum_i (M^T)_{ji} \frac{g_i}{\sum_j M_{ij} f_j^{(EM)}[n-1]}}{\sum_i (M^T)_{ji}} \quad (14)$$

No regularization during the iterations.

The ART methodology fails to include the minimization of the image TV discussed above. The steps for the ART methodology include:

Initialization:

$$n=1; \vec{f}^{(ART-DATA)}[n,1]=0; \quad (15)$$

Data-projection iteration, m=2, ..., $N_{data}$:

$$\vec{f}^{(ART-DATA)}[n,m] = \quad (16)$$
$$\vec{f}^{(ART-DATA)}[n,m-1] - \vec{M}_i \frac{g_i - \vec{M}_i \cdot \vec{f}^{(ART-DATA)}[n,m-1]}{\vec{M}_i \cdot \vec{M}_i};$$

Positivity constraint:

$$(f_j)^{(ART-POS)}[n] = \begin{cases} (f_j)^{(ART-DATA)}[n, N_{data}] & (f_j)^{(ART-DATA)}[n, N_{data}] \geq 0 \\ 0 & (f_j)^{(ART-DATA)}[n, N_{data}] < 0 \end{cases}$$

Initialization next loop:

$$\vec{f}^{(ART-DATA)}[n+1,1] = \vec{f}^{(ART-POS)}[n] \quad (18)$$

n is incremented and the methodology returns to the Data Projection iteration. Again, no explicit regularization is performed during the ART iterations. For both the EM and ART methodologies, the iteration is stopped when there was no appreciable change in the image.

No explicit regularization for the EM and ART algorithms was used for two reasons. First, only the degree of ill-posedness of the linear systems corresponding to the various scanning configurations is investigated below. And, this is effectively demonstrated by using the known methodologies of EM and ART. Second, the TV methodology is compared with the EM and ART methodologies on how well they solve the linear system corresponding to sparse sampling or insufficient projection data. The data used for the bulk of the examples are ideal (up to machine precision), and any explicit regularization during the EM or ART iterations may introduce inconsistency between the reconstructed image and the projection data.

The first case is a reconstruction problem from few-view projections in fan-beam CT. Referring to FIG. 6a, there is shown the true image and images reconstructed by use of the TV, EM, and ART methodologies, respectively, from 20-view projection data. The display gray scale is [0.85, 1.15]. FIG. 6b depicts image profiles along the centers of the images in the horizontal and vertical directions obtained with the TV algorithm (thick line). FIG. 6c depicts image profiles along the centers of the images in the horizontal and vertical directions obtained with the EM (dashed lines) and ART (dotted lines) algorithms. The corresponding true profiles are plotted in FIGS. 6b-c as the thin lines.

Using the Shepp-Logan phantom shown in FIG. 6a, projection data is generated at the 20 view angles specified by:

$$\theta_i \begin{cases} 18° * (i-1) & 1 \le i \le 10 \\ 18° * (i-0.5) & 10 < i \le 20 \end{cases} \quad (19)$$

From the projection data generated at the 20 views, the images were reconstructed, as shown in FIG. 6a, by use of the TV, EM, and ART algorithms. The number of iterations for each algorithm was 200. More or fewer iterations may be used. For a quantitative comparison, the image profiles were also compared along the central lines of the images in the horizontal and vertical directions. The results depicted in FIG. 6b indicate that the TV reconstruction is visually indistinguishable from the true image, suggesting that the system matrix corresponding to sparse fan-beam data may have the ERP even though the column vectors of the system matrix do not form an ortho-normal basis. The EM and ART results show considerable artifacts, as shown in FIG. 6c.

Figures 7A, 7B, 7C:
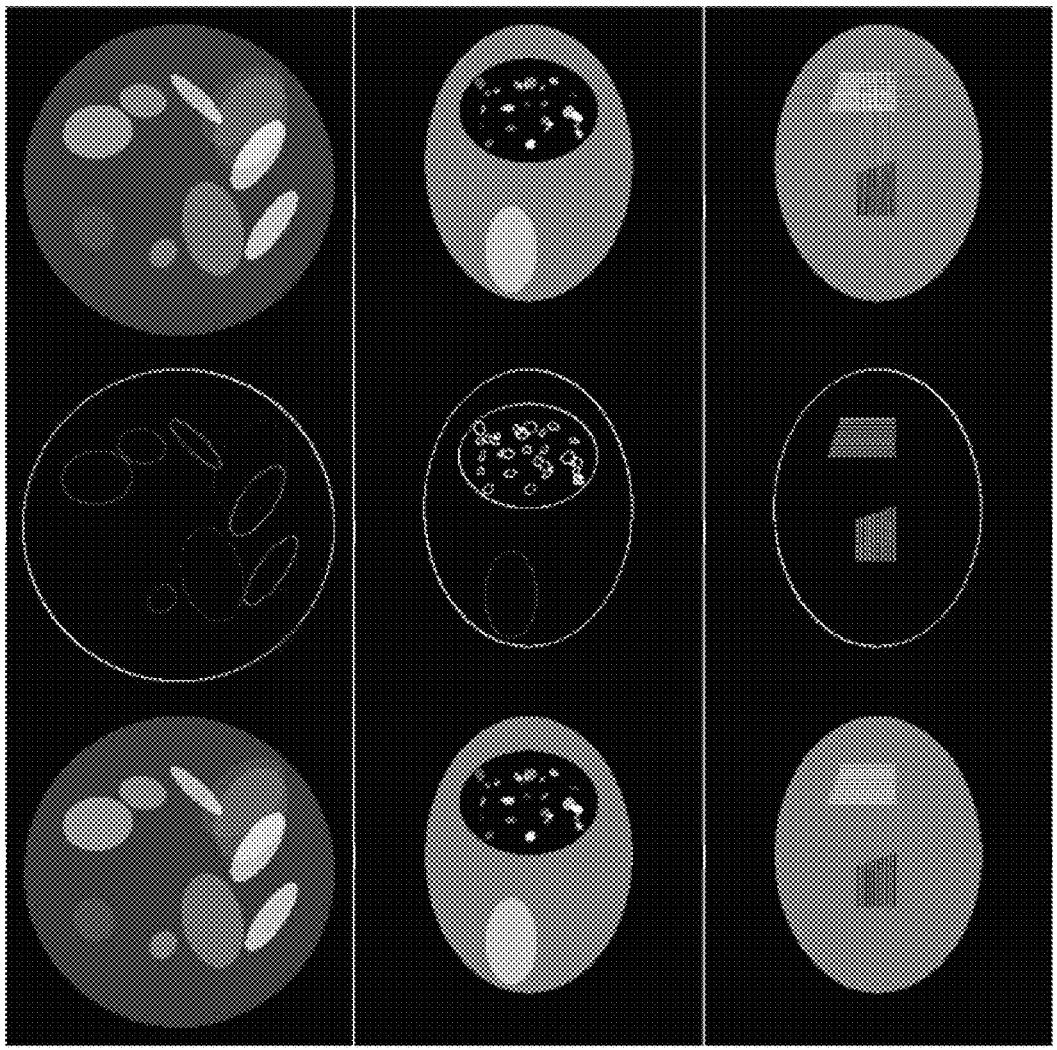
FIG. 7a depicts images for random ellipses, the gradients of the random ellipses and the reconstruction of the image using TV.
FIG. 7b depicts images for random spots, the gradients of the random spots and the reconstruction of the image using TV.
FIG. 7c depicts images for lines phantoms, the gradients of the lines phantoms and the reconstruction of the image using TV.

FIGS. 7a-c demonstrate the wide applicability of the TV algorithm. FIG. 7a depicts images for random ellipses, FIG. 7b depicts images for random spots, and FIG. 7c depicts images for lines phantoms. The true and gradient images of these phantoms are displayed in left and middle columns, respectively, for FIGS. 7a-c. Images reconstructed from 20-view projections by use of the TV algorithm are displayed in the right column in FIGS. 7a-c. The gray scales for the images are [0.95, 1.15] for FIG. 7a and [0.9, 1.1] for FIGS. 7b-c.

The methodology is therefore applied, without changing any parameters in the methodology, to the three additional phantoms shown in the left images of FIGS. 7a-c. These phantoms have sparse gradient images, as shown in the middle images of FIGS. 7a-c. The properties of these phantoms are as follows. The "random ellipse" phantom consists of 10 randomly selected ellipses on a uniform circular background with a value of 1.0. The values of each of the ellipses was randomly selected in the range of [1.01, 1.10]. The "random spots" phantom depicted in FIG. 7b is similar in that 30 randomly selected small ellipses within the value range of [0.9, 1.1] are placed in an air cavity. The background ellipse has a value of 1.0 and additional ellipse with a value of 1.05 is placed on the left of the phantom. The spots and the air gap are meant to resemble, roughly, the lung. The "lines" phantom depicted in FIG. 7c consists of 2 groups of 10 lines at values of 0.9 and 1.1 on a background ellipse of value 1.0. As with the other phantoms, the gradient image of the lines phantom has sparse structures. But, the lines phantom is designed in such a way as to provide a challenge for the TV algorithm. It is known for the FT-inversion problem that certain regular structures in the image may be difficult to reconstruct by use of the FT-TV algorithm because of the small support of such images in Fourier space. Such images may also pose a challenge for the present TV methodology.

Using these phantoms, we generated fan-beam projection data at 20 views (uniformly distributed over $2\pi$, specified by Eq. (18)). The right column of FIGS. 7a-c shows that the TV reconstructions for the random ellipses (upper row), the random spots (middle row), and lines (lower row) phantoms. The gray scales are [0.95, 1.15] for row FIG. 7a and [0.9, 1.1] for FIGS. 7b-c. It can be observed that the reconstructions for the random ellipses and random spots phantoms are visually indistinguishable from their corresponding truth. As expected the lines phantom proves to be challenging. Although the reconstruction for the lines phantom does show some artifacts, it reconstructs the image well. A glance at EM and ART results in FIGS. 6a-c shows how unstable image reconstruction is for this few-view scanning configuration.

Another application of the TV algorithm may be for reconstruction problems where there are insufficient data in the corresponding continuous case. For example, the scanning angle may be less than 180° plus the fan angle in fan-beam CT, or there may be gaps on the detector for each projection when the data are known to be bad for certain detector bins. For continuous functions of compact support, data in a scanning range of 180° plus the fan-angle may be sufficient for stable image reconstruction in fan-beam CT. For the fan-beam configuration described above, 180° plus the fan angle is 209°. For scanning angular ranges less than 209°, the corresponding discrete linear system should also generally be ill-posed.

Referring to FIG. 8a, there is shown the true image and images reconstructed by use of the TV, EM, and ART methodologies, respectively, from data over 180°. The display gray scale is [0.85, 1.15]. FIG. 8b depicts image profiles along the centers of the images in the horizontal and vertical directions obtained with the TV algorithm (thick line). FIG. 8c depicts image profiles along the centers of the images in the horizontal and vertical directions obtained with the EM (dashed lines) and ART (dotted lines) algorithms. The corresponding true profiles are plotted in FIGS. 8b-c as the thin lines.

In the limited-angle problem depicted in FIGS. 8a-c, the scanning angular range is reduced from 209° to 180° and projection data is generated at 128 views uniformly distributed over 209° from the Shepp-Logan phantom. Again, the detector at each view has 512 bins. For this scan, the number of non-zero data points is 52,730, which is more than the number of non-zero pixels in the Shepp-Logan phantom itself.

FIG. 8a depicts images reconstructed from this set of data by use of the TV, EM, and ART algorithms. The profiles of these images along the central horizontal and vertical rows are displayed in the FIGS. 8b-c. The number of iterations for each of the TV, EM, and ART reconstructions is 1000. Fewer or greater number of iterations may be performed. The images in FIG. 8a show the TV reconstruction is virtually indistinguishable from the true phantom and that the images obtained by use of the EM and ART methodologies are also reasonably accurate with only small distortion near the bottom of the images. This distortion of the EM and ART images is understandable because the 180° scan covered the top half of the phantom. The high iteration numbers were used for achieving convergence in the bottom half of the image. Additionally, the EM image shows a high frequency artifact not seen in the TV or ART images, because the back-projector in each case is ray-driven, which is known to yield such Moire patterns in the EM images. However, as explained above, the reconstruction methodologies are compared on their ability to solve the linear system corresponding to the imaging model; therefore, the ray-driven back-projection is used because it represents exactly the system-matrix adjoint.

Further reductions in the scanning angle are shown by taking 64 angular samples uniformly distributed over an angular range of only 90°, as shown in FIGS. 9a-c. FIG. 9a depicts the true image and images reconstructed by use of the TV, EM, and ART algorithms from data over 90°. The display gray scale is [0.85, 1.15]. FIG. 9b depicts image profiles along the centers of the images in the horizontal and vertical directions obtained with the TV algorithm (thick line). FIG. 9c depicts image profiles along the centers of the images in the horizontal and vertical directions obtained with the EM (dashed lines) and ART (dotted lines) algorithms. The corresponding true profiles are plotted as the thin lines in FIGS. 9b-c.

FIG. 9a depicts images reconstructed by use of the TV, EM, and ART methodologies, respectively. The number of iterations for the TV, EM, and ART reconstructions is 10,000. Fewer or greater numbers of iterations may be performed. In this case, there were 26,420 non-zero projection measurements, which would seem to be sufficient for the TV algorithm considering the sparseness of the phantom's image gradient. However, the instability of the corresponding linear system appears to be too strong for accurate image reconstruction as can be seen in the reconstructions shown in FIG. 9a. In FIG. 9b, the profiles along central lines are shown in the horizontal and vertical directions of the TV image. The corresponding true profiles are also displayed as the thin lines. The TV image contains a deviation from the true phantom on the left-hand edge, which is evident in the shown horizontal profile. On the other hand, the EM and ART reconstructions are highly distorted. We have studied in FIG. 9c the profiles along central lines in the horizontal and vertical directions of the EM and ART images. Distortions in these images are clearly shown in these profile plots. The image error is also plotted as a function of iteration number, in an effort to determine whether or not the TV algorithm will converge to the true image. For the previous cases, the image error was tending to zero, but for this 90° scan, the image error appears to converge to a small but finite positive number. The system matrix corresponding to the 90° scan appears to violate somewhat the ERP.

Still another reconstruction problem of practical interest is how to handle the situation where data from a set of bins on the detector are corrupted. Such a problem may occur if there is a partial hardware failure or if the photon count is very low so that signal noise dominates. For example, for fan-beam CT, if a full scan is performed over 360°, one may fill the gaps in the detector bins by using redundant data at conjugate views. For a short-scan, however, this approach may not be possible. Specifically, consider projection data displayed in FIG. 10, which depicts an intensity plot of the "bad bins" projection data function. The angular range covers 209°, which is the short-scan angle for the current fan-beam configuration. However, data at 30 of the 512 detector bins are missing. The amount of missing data may be greater or less than that depicted in FIG. 10.

The angular range scanned is the minimum for exact reconstruction, namely, 180° plus the fan angle, which in this case is a total of 209°. The projection data at each view, however, has a gap. Because the scanning angle is over the minimum range, there may not be redundant information to fill in the gap left by the "bad" detector bins. Direct application of analytic algorithms such as fan-beam FBP may yield conspicuous artifacts, as the implicit assumption is that the missing values are zero, which is highly inconsistent with the rest of the data function.

Figure 10:
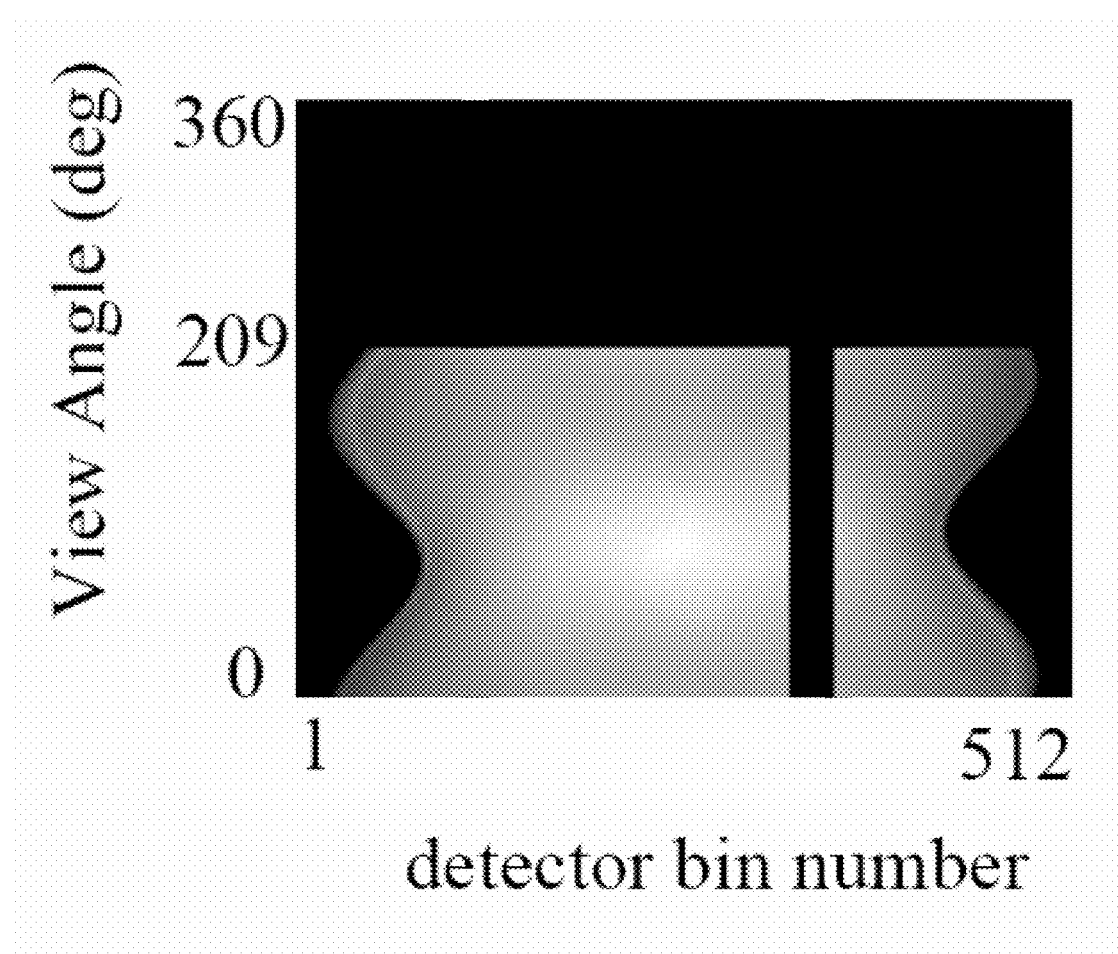
FIG. 10 depicts an intensity plot of the "bad bins" projection data function.

The TV methodology is applied to reconstructing images from data shown in FIG. 10, which are generated at 150 views uniformly distributed over 209° from the true Shepp-Logan image shown in FIG. 11a. The detector at each view contains 512 bins, of which the data of 30 bins have been discarded as shown in FIG. 10. Again, in this instance, there may be enough data to determine the image, because the number of non-zero projection measurements is 58,430. The question is whether or not the linear system may be stable enough that the unique solution can be found.

Referring to FIG. 11a, there is depicted the true image and images reconstructed by use of the TV, EM, and ART methodologies, respectively, from data containing bad detector bins. The display gray scale is [0.85, 1.15]. FIG. 11b depicts image profiles along the centers of the images in the horizontal and vertical directions obtained with the TV algorithm (thick line). FIG. 11c depicts image profiles along the centers of the images in the horizontal and vertical directions obtained with the EM (dashed lines) and ART (dotted lines) algorithms. The corresponding true profiles are plotted as the thin lines in FIGS. 11b-c.

As shown in FIG. 11a, the TV image is visually indistinguishable from the true image, and both EM and ART algorithms yield in this case quite accurate images. In this analysis, the TV algorithm appears to be more robust than the EM and ART algorithms, because the TV image is obtained with only 100 iterations while both the EM and ART algorithms required 10000 iterations to achieve the image accuracy shown in FIG. 11a. The FT-TV algorithm discussed in the background cannot address the bad bins problem directly even in the parallel-beam case, because it is not possible to perform the FT of the detector data at each view when there is a gap.

The previously discussed insufficient data problems (limited angle and bad detector) may be combined. For example, the few-view problem may be analyzed with projection views containing bad bins. For this analysis, projections are taken at 20 views uniformly covering the short-scan angular range with the same detector gap as shown in FIG. 10. Fewer or greater numbers of view may be taken. The difference between this analysis and the previous analysis is that the angular spacing between projections here is roughly 10° instead of the 1.4° spacing previously. The few-view-projection data are sparse, and only 7735 measured data points are nonzero.

Referring to FIG. 12a, there is depicted the true image and images reconstructed by use of the TV, EM, and ART methodologies, respectively, from 20-view data containing bad detector bins. The display gray scale is [0.85, 1.15]. FIG. 12b depicts image profiles along the centers of the images in the horizontal and vertical directions obtained with the TV algorithm (thick line). FIG. 12c depicts image profiles along the centers of the images in the horizontal and vertical directions obtained with the EM (dashed lines) and ART (dotted lines) algorithms. The corresponding true profiles are plotted as the thin lines in FIGS. 12b-c.

As shown in FIG. 12a, the TV image is once again visually indistinguishable from the true phantom. Thus, it appears that the system matrix corresponding to this scanning configuration suggests the ERP. The EM and ART reconstructions show similar artifacts as were seen in the few-view results shown in FIG. 6a. In addition, there appears to be additional artifacts from the missing detector bins.

The TV methodology may address a variety of other sparse data problems. Applicability of the TV methodology, under the ideal conditions described above, may be based on support of the data function being at least twice the support of the gradient of the true image and that the corresponding linear system is not too ill-conditioned as was seen for the 90°-scan case.

The results described above assume the ideal situation of perfect consistency among the measured projection rays and a sufficiently sparse gradient image. The following discussion shows how the TV, EM, and ART methodologies compare when these conditions are not strictly held by adding a varying background, to violate gradient sparseness, or by adding signal noise, to violate data consistency.

In many applications, the gradient images may be sparse only in an approximate sense. Even though it is a good approximation to assume that images will be constant over many regions, there may also be situations in which the images will have some level of variation within the regions. One inquiry is whether or not a low amplitude violation of gradient sparseness leads to only small deviations in images reconstructed by use of the TV algorithm. This is addressed by repeating the few-view and bad-bin experiments described with respect to FIGS. 6a-c and 11a-c, but adding a wavy background to the Shepp-Logan phantom.

Referring to FIG. 13a, there is shown the true image with a wavy background and images reconstructed by use of the TV, EM, and ART methodologies, respectively, from 20-view data. The display gray scale is [0.85, 1.15]. FIG. 13b depicts image profiles along the centers of the images in the horizontal and vertical directions obtained with the TV algorithm (thick line). FIG. 13c depicts image profiles along the centers of the images in the horizontal and vertical directions obtained with the EM (dashed lines) and ART (dotted lines) algorithms. The corresponding true profiles are plotted as the thin lines in FIGS. 13b-c.

Using the Shepp-Logan phantom with a wavy background in FIG. 13a, the projection data is generated at 20 views specified by Eq. (18). The amplitude of the wavy background is 1% of the gray matter attenuation coefficient. Any negative values in the phantom are thresholded to zero, so as to allow the applicability of the EM algorithm. With the wavy background the number of non-zero pixels in the gradient image jumps to 51,958, but the majority of these non-zero values are small compared to the gradients at the boundaries of the different tissues. As was the case with the previous few-view analysis, the number of measurements is 10,240, which is less than twice the number of non-zero pixels in the gradient image, violating the gradient-sparse condition. The iteration numbers for obtaining the results in FIG. 13a were 200, 1000, and 500 for the TV, EM, and ART algorithms, respectively. The images in FIG. 13a indicate that the TV reconstruction is visually almost indistinguishable from the true image and that the EM and ART algorithms have difficulty with this data set. Upon further inspection of the image profiles, it can be seen that the TV algorithm does not yield an exact reconstruction. The small violation, however, of the gradient image sparseness does not appear to lead to large errors in the reconstructed image. This example does not constitute a mathematical proof, but is suggestive that small violations in the gradient sparseness yields only small errors in the reconstructed image.

Image reconstruction was also examined from data containing bad-bins (see FIGS. 11a-c) with the 1% low amplitude wavy background added to the original image. In this example, the number of projection data is 58,430, which is not twice the number of non-zero pixels in the image but it is a comparable number. Referring to FIG. 14a, there is shown the true image with a wavy background and images reconstructed by use of the TV, EM, and ART methodologies, respectively, from bad detector bin data. The display gray scale is [0.85, 1.15]. FIG. 14b depicts image profiles along the centers of the images in the horizontal and vertical directions obtained with the TV algorithm (thick line). FIG. 14c depicts image profiles along the centers of the images in the horizontal and vertical directions obtained with the EM (dashed lines) and ART (dotted lines) algorithms. The corresponding true profiles are plotted as the thin lines in FIGS. 14b-c.

It may be observed that the TV image is visually indistinguishable from the true image. As shown before, the ART and EM reconstructions are close to the original image in this case. The number of iterations for the TV algorithm is 100, which is much less than the 10,000 iterations used for both EM and ART algorithms.

Still another physical factor that contributes to data inconsistency is signal noise in the projection measurements. It is of practical significance to evaluate the performance of the TV methodology in the presence of data noise. The TV algorithm may appear to be effective on sparse data problems even when the data contain inconsistencies due to signal noise. For the noise studies, the few-view and bad-bin cases discussed above are examined. In each case, Gaussian noise may be introduced in the projection data at the level of 0.1% of the ideal measurement values.

Figure 15:
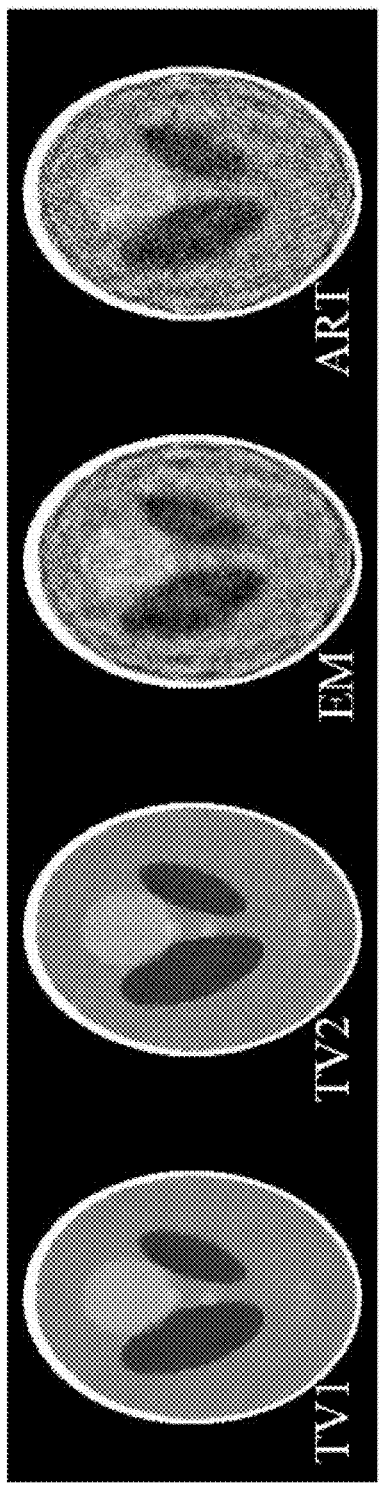
FIG. 15 shows images reconstructed from 20-view noisy data by use of the TV algorithm after the gradient descent phase (TV1) and after the projection phase (TV2) and by use of the EM and ART algorithms.

Referring to FIG. 15, there are shown images reconstructed from 20-view noisy data by use of the TV algorithm after the gradient descent phase (TV1) and after the projection phase (TV2) and by use of the EM and ART algorithms. The iteration numbers for the TV, EM and ART images depicted in FIG. 15 are 200, 200, and 100, respectively. In particular, for the TV algorithm, two "final" images are displayed in FIG. 15, (TV1) corresponding to $f^{(TV\text{-}GRAD)}[n, N_{grad}]$ the image after the completion of the gradient descent phase (i.e., given by Eq. (3)), and (TV2) corresponding to $f^{(TV\text{-}POS)}[n]$, the image one after the completion of the data projection phase (i.e., given by Eq. (10)). In the examples with consistent data above, the differences between the two images were numerically negligible. With inconsistencies resulting from data noise, however, there may be a marked difference. The image $f^{(TV\text{-}GRAD)}[n, N_{grad}]$ after the gradient descent phase is clearly a regularized version of the image $f^{(TV\text{-}POS)}[n]$ obtained after the data projection and positivity constraint. Depending on the tasks, either image may prove useful for a particular imaging application. For the few-view study, both images $f^{(TV\text{-}GRAD)}[n, N_{grad}]$ and $f^{(TV\text{-}POS)}[n]$, obtained with the TV algorithm appear to have less artifacts than the EM and ART reconstructions in FIG. 15. No explicit regularization is performed with the EM or ART in the present examples aside from truncation of the iteration numbers at 200 and 100 in the EM and ART algorithms, respectively.

Figure 16:
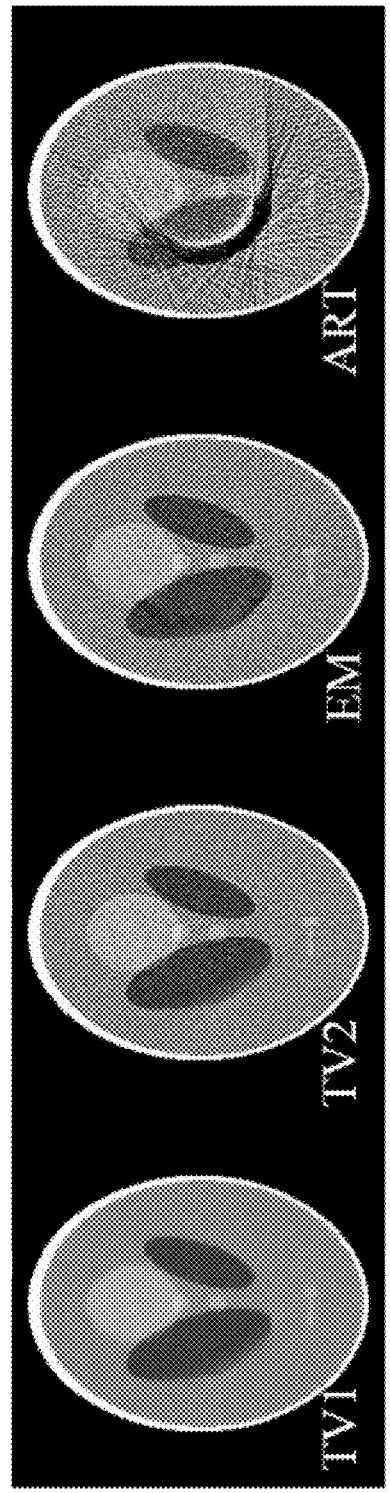
FIG. 16 shows images reconstructed from bad-bin noisy data by use of the TV algorithm after the gradient descent phase (TV1) and after the projection phase (TV2) and by use of the EM and ART algorithms.
Figure 22A:
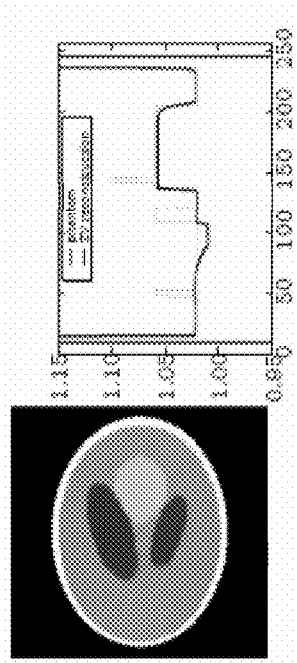
Figure 22B:
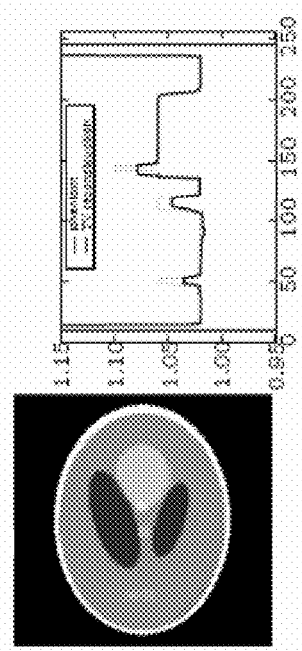
Figure 22C:
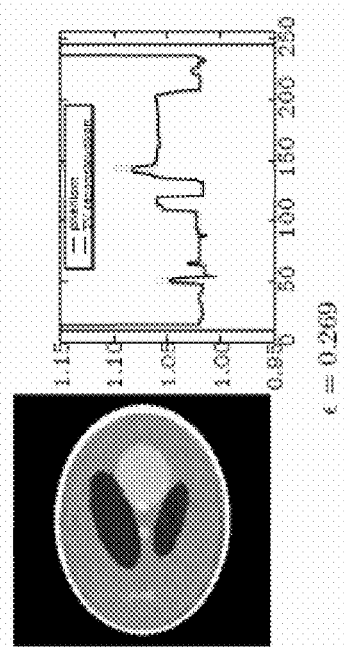

For the bad bin case, noisy data may be generated by adding Gaussian noise, for example at the level of 0.1% of the individual true data values, to the noiseless data described in FIGS. 11a-c. Referring to FIG. 16, there is shown images reconstructed from bad-bin noisy data by use of the TV algorithm after the gradient descent phase (TV1) and after the projection phase (TV2) and by use of the EM and ART algorithms. The iteration numbers for the TV, EM, and ART images depicted in FIG. 16 are 200, 200, and 100, respectively. Again, two TV images are shown in FIG. 16: (TV1) corresponding to $f^{(TV\text{-}GRAD)}[n, N_{grad}]$ grad the image after the completion of the gradient descent phase, and (TV2) corresponding to $f^{(TV\text{-}POS)}[n]$ the image after the completion the data projection phase. The results suggests that the TV and EM algorithms may still effectively correct for the effect of the missing detector bins. The ART algorithm, which showed very mild streaking in FIG. 11a under the ideal condition, displays significant streaking due to the combination of signal noise and bad detector bins.

Referring to FIGS. 17a-d, there is shown, respectively, an example of a Shepp-Logan image, partial data for the object depicted in FIG. 17a if only exterior data may be obtained, an image reconstruction using Filtration-backprojection using the data from FIG. 17b, and an image reconstruction using the TV methodology using the data from FIG. 17b. As shown in FIG. 17b, an interior section of the data is missing. This results using an image reconstruction of the prior art are shown in FIG. 17c, and may not be acceptable. However, the image in 17d may be acceptable if the region of interest (ROI) may comprise the exterior ring of the object. As shown, the exterior portion of the image is comparable to the Shepp-Logan image.

Referring to FIGS. 18a-d, there is shown, respectively, an example of a Shepp-Logan image, partial data for object depicted in FIG. 18a if interior data is obtained but at least some of the exterior data is excluded, an image reconstruction using Filtration-backprojection using the data from FIG. 18b, and an image reconstruction using the TV methodology using the data from FIG. 18b. This results using an image reconstruction of the prior art is shown in FIG. 18c, and may not be acceptable. However, the image in 18d may be acceptable if the region of interest (ROI) may comprise an interior portion the object. As shown, the interior portion of the image is comparable to the Shepp-Logan image.

Referring to FIGS. 19a-d, there is shown, respectively, another example of a Shepp-Logan image depicting spots, partial data for object depicted in FIG. 19a if few views (e.g., 5 views) are obtained, an image reconstruction using Filtration-backprojection using the data from FIG. 19b, and an image reconstruction using the TV methodology using the data from FIG. 19b. FIG. 19c may be an unacceptable image. However, the image reconstruction shown in FIG. 19d is comparable to FIG. 19a and may be acceptable.

Referring to FIGS. 20a-d, there is shown, respectively, an example of a Shepp-Logan image, partial data for an object depicted in FIG. 20a if few views and interior data (but not exterior data) are obtained, an image reconstruction using Filtration-backprojection using the data from FIG. 20b, and an image reconstruction using the TV methodology using the data from FIG. 20b. Comparing FIGS. 20c and 20d, it is shown that the total variation methodology may generate a superior image for an interior even with few views.

Referring to FIGS. 21a-d, there is shown, respectively, shows still another example of a Shepp-Logan image, partial data for the object depicted in FIG. 21a if data with metal is removed, an image reconstruction using Filtration-backprojection using the data from FIG. 21b, and an image reconstruction using the TV methodology using the data from FIG. 21b. Comparing FIGS. 21c and 21d, it is shown that the total variation methodology may generate a superior image even with a missing data problem, such as if data from metal is removed.

Based on the foregoing, a TV methodology may be used for accurate image reconstruction. One example of image reconstruction may be for divergent-beam CT under a number of imperfect sampling situations. The TV methodology may addressing a number of challenging reconstruction problems, including the few-view, limited-angle, and bad-bin problems. As the results in the numerical studies indicate, the TV methodology may yield accurate reconstructions in these difficult cases, which are of practical significance. The effectiveness of the TV methodology may rely on the fact that the object being imaged may have a relatively sparse gradient image. Based on the numerical examples, it appears that the ERP conjecture may apply to many insufficient data problems, such as in divergent-beam CT. The TV algorithm described above applies equally to many other situations, such as cone-beam CT, even though the examples were directed to fan-beam CT. The TV methodology may also prove useful for many other tomographic imaging modalities.

There are numerous aspects of the TV methodology that may make it relevant and useful for many imaging applications, such as medical and industrial CT imaging. The assumption of a sparse gradient image may be reasonable for many object functions in medical and industrial applications, because often sought-after quantities such as x-ray attenuation coefficient are relatively constant over extended areas or volumes. Example reconstructions were shown from data containing one imperfection and two imperfections. Reconstructions with the TV methodology may be for more than two imperfections. Further, with regard to the imperfections addressed, one may expect that the sparseness of the image gradient will hold only approximately, and that there may be some level of inconsistency among the projection data due to signal noise. The numerical studies with respect to these complicating factors may show that the TV methodology may effectively reconstruct quantitatively accurate images from imperfectly sampled data. The TV methodology may also be applied to other applications, such as to 3D cone-beam CT where there are a host of imperfect sampling situations that have practical significance. Moreover, refinements may be made to the TV algorithm that may optimize its performance.

The above examples of few-view fan-beam CT primarily focus on the ideal situation where there is no noise on the data. In order to accommodate data inconsistency, where there may be no solution to $M\vec{f}=\vec{g}$, one may solve a modified optimization problem:

$$\vec{f}\,^{*}=\operatorname{argmin}\|\vec{f}\,\|_{TV}\text{ such that}|M\vec{f}-\vec{g}|\le\epsilon \qquad (20)$$

The data constraint on the image may be an ellipsoidal whose scale is $\epsilon$. For inconsistent data, $\epsilon_{min}$ may have a minimum value $\epsilon_{min}$ that is in general greater than zero. In practice, $\epsilon_{min}$ may be found approximately by running POCS without TV gradient descent. The following discusses how varying $\epsilon$ may affect image reconstruction when the data are corrupted by noise, such as uncorrelated Gaussian noise.

The TV minimization algorithm discussed above may apply to inversion of discrete-to-discrete linear systems, so the actual phantom used here may be the pixellated Shepp-Logan phantom. For the few-view reconstruction, the image array is, for example, 256×256 covering 20×20 cm². The simulated data are for fan-beam CT configuration with source to rotation center distance of 40 cm and a source to detector distance of 80 cm. Only 25 views were taken covering a full 360° scan. The simulated detector may have 512 bins. The linear system matrix for this configuration models ray-driven projection through the image matrix. With only 25 views, the available data undersamples the image array by a factor of 5.12.

In this study, inconsistency is introduced into the projection data set using uncorrelated Gaussian distributed noise. The standard deviation of the probability density function is set to 0.2% of each of the data values. Image reconstruction is performed on a single realization of this data model. The TV-minimization algorithm follows from Eq. (20) with the aim of obtaining a qualitative understanding of the effect of $\epsilon$. The TV-minimization reconstruction is shown for $\epsilon$=1.026, 0.382, 0.269, 0.248, and 0.115 (these $\epsilon$'s are provided for illustrative purposes only and are not round numbers because they were determined by the data residual at fixed iteration numbers. Other $\epsilon$'s may be chosen). Along with the image reconstructions, root-mean-square-error (RMSE) are shown in Table 1 below to quantify the accuracy of the various reconstructions.

TABLE 1

DATA RESIDUAL PER DETECTOR BIN AND
IMAGE RMSE AS A FUNCTION OF $\epsilon$.

| $\epsilon$ | data RMSE ($\times 10^{-5}$) | image RMSE ($\times 10^{-4}$) |
|---|---|---|
| 1.026 | 8.0 | 3.4 |
| 0.382 | 3.0 | 1.2 |
| 0.269 | 2.1 | 0.85 |
| 0.248 | 1.9 | 0.86 |
| 0.115 | 0.9 | 0.75 |

For TV-minimization, the impact of noise may have a large effect because the noiseless case may give a highly accurate image. For the various values of $\epsilon$, each of the resulting reconstructed images appear to be more accurate than the POCS images, visually and also in terms of RMSE values. The gain in accuracy reflects the applicability of the assumption on the underlying image function of minimal TV gradient. The data RMSE tends to increase as $\epsilon$ increases, while the image TV decreases. As $\epsilon$ increases the space of possible images satisfying $\|M\vec{f} - \tilde{g}\| \leq \epsilon$ grows and it is likely that an image within this constraint may be found with lower TV. The relation of $\epsilon$ and image RMSE is less apparent. The trend of increasing RMSE in the image with increasing s is reasonable, but the details of this dependence may be strongly image function dependent.

Visually, the variation in the reconstructed images may be large as a function of $\epsilon$. The larger values of $\epsilon$ tend to yield a highly smoothed image; intermediate values may show low frequency "splotchy" noise; and low values may yield high frequency "salt and pepper" noise. FIGS. 22a-e illustrate examples images reconstructed by TV, using different values of $\epsilon$ in Eq. (20), from noisy projection data taken at only 25 views, gray scale window is [0.9,1.1]. From these results, it may be difficult to identify the "best" value of $\epsilon$. The larger values of $\epsilon$ obviously result in lower resolution, but the features of the reconstructed images may all be present in the phantom. Intermediate values of $\epsilon$ may yield better resolution, but the artifacts from the noise may be near the same spatial frequencies as the phantom features. This situation may be confusing to the observer of the images. Smaller $\epsilon$ may give higher frequency noise, which may be less easily confused with features of underlying image function.

Though the role of the data tolerance parameter $\epsilon$ for few-view fan-beam CT image reconstruction using the TV-minimization methodology has been examined, other types of image reconstruction may be used as well. Further, the introduction of inconsistency into the projection data may reduce the accuracy of the methodology, but the resulting reconstructions may appear to reveal the structures in the underlying image function. The form of the noise in the reconstructed images may vary dramatically as $\epsilon$ varies. The below discussion indicates the possible range of artifacts in the reconstructed images; however, the range is provided for illustration purposes only. Other choices of methodology parameters, such as $\epsilon$, may be determined in a task-based fashion. Because the texture of the noise may change dramatically, the ability to perform a detection or estimation task based on the reconstructed images may depend strongly on the image features pertinent to that task.

As discussed above, the TV minimization image reconstruction methodology for inverting the divergent-beam x-ray transform may be applied to image reconstruction in circular cone-beam computed tomography (CT). In analyzing the TV minimization image reconstruction, reconstructions for the disk phantom may be compared with that of projection onto convex sets (POCS). It appears that the TV minimization image reconstruction may yield accurate image reconstructions that are robust against data inconsistencies due to noise or mismatch in the system matrix.

As discussed above, a methodology may be used for inversion of the Fourier Transform (FT) with sparse FT samples. A sparse representation of the underlying image function may be found, and minimize the $l_1$ norm of this representation while requiring that the image's FT match the known samples. The methodology presents two ideas of note: (1) generalized image representations, and (2) the exact reconstruction principle (ERP). In particular, the representation of an image by path integrals of its image gradient is of interest in medical imaging, because oftentimes images themselves are not sparse but their gradient may be. Medical images may vary rapidly only at the boundaries of internal organs. Such an image representation calls for minimization of the image's total variation (TV), which is the $l_1$ norm of the image gradient magnitude.

The ERP may be useful in that it overrides the Nyquist sampling theorem for particular image functions. For the discrete FT (DFT), if there is no prior knowledge on the underlying image function, it may be necessary to have complete knowledge of the DFT to obtain the true image. If the image function, however, is known to be composed of N pixels of unknown location and amplitude, it may only be necessary to have 2N samples of the image DFT to reconstruct the image exactly. If N is much less than the total number of pixels in the image array then the ERP allows for substantial reduction in the necessary number of DFT samples. Because the inverse FT is related to parallel beam CT through the central slice theorem, the FT TV-minimization algorithm can be directly applied to image reconstruction in the parallel beam case.

For the divergent-beam transform in fan-beam or cone-beam CT, the conversion of the data to Fourier space may not be straightforward, so a TV-minimization methodology is used that applies directly to this case. The methodology finds the approximate solution to the following optimization problem:

$$\vec{f}\text{o} = \operatorname{argmin} \|\vec{f}\|_{TV} \text{ such that } X\vec{f} = \tilde{g}; \quad (21)$$

where $\vec{f}$ generically represents an image vector, whose length is the number of pixels/voxels; $\tilde{g}$ is a data vector, whose components represent the measured ray integrals through the imaging volume; X is the discrete linear operator that performs the x-ray transform of $\vec{f}$ yielding the line integrals at the samples $\tilde{g}$; and $\|\ldots\|_{TV}$ represents the TV norm. As discussed above, the algorithm that finds an approximate solution to this optimization problem combines projection onto convex sets (POCS), which narrows the solution space to images that satisfy $X\vec{f} = \tilde{g}$, with gradient descent, which minimizes the TV norm of $\vec{f}$. This ideal formulation though is only useful for perfectly consistent data. While in the FT inversion problem there is always at least one image that is consistent the available data, in the divergent-beam transform there may be no solutions to $X\vec{f} = \tilde{g}$ if the data contain inconsistencies, say, due to noise. In order to accommodate data inconsistency, it may be necessary to modify Eq. (21) to:

$$\vec{f}\text{o} = \operatorname{argmin} \|\vec{f}\|_{TV} \text{ such that } \|X\vec{f} - \tilde{g}\| \leq \epsilon \quad (22)$$

The difference here is that the data constraint on the image is an ellipsoidal whose scale is $\epsilon$. For inconsistent data, $\epsilon$ may have a minimum value $\epsilon_{min}$ that is in general greater than zero. In practice, $\epsilon_{min}$ can be found approximately by running POCS without TV gradient descent.

The below discussion applies the TV-minimization algorithm to circular cone-beam CT image reconstruction. Both cases of consistent and inconsistent projection data are considered.

The discussion above focused on few-view and limited-angle image reconstruction in fan-beam CT. The present discussion focuses on applying the TV-minimization methodology to 3D cone-beam CT image reconstruction. Furthermore, the form of the imperfect sampling is very different from the above few-view and limited-angle studies. The appropriate frame to understand the sampling of the imaging volume in circular cone-beam CT is in a space that represents the Radon transform of the image function. Each point $\vec{r}$ in the 3D Radon space represents the planar integral of the image function over a plane whose nearest point to the origin is $\vec{r}$ in the 3D image space.

Figure 23:
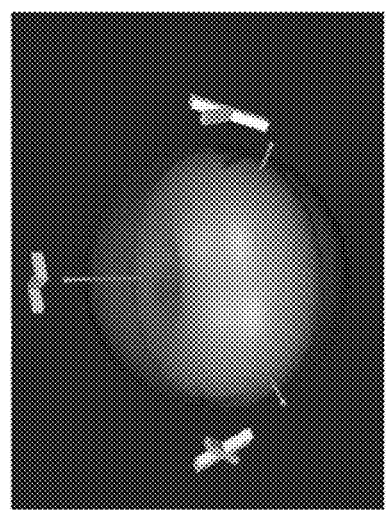
FIG. 23 shows a schematic of the part of Radon space sampled by the circular x-ray source trajectory.

In order to have sufficient data to reconstruct the image, the Radon space within the sphere, indicated in FIG. 23 must be sampled. The transparent sphere shown in FIG. 23 represents the sufficient volume in Radon space needed to reconstruct the 3D image. The circular x-ray source trajectory may sample only the Radon planes that intersect the trajectory. In the Radon space, the indicated torus represents the Radon sampling of this trajectory (a circular source orbit) whose dimensions are the size of the torus's outer diameter. As can be seen, there is a large gap at the polar regions of the Radon sphere. As the TV minimization algorithm has been successful in performing data interpolation for both 2D few-view and limited-angle fan-beam CT, TV minimization may be able to interpolate the polar regions of the Radon sphere.

Figure 24A:
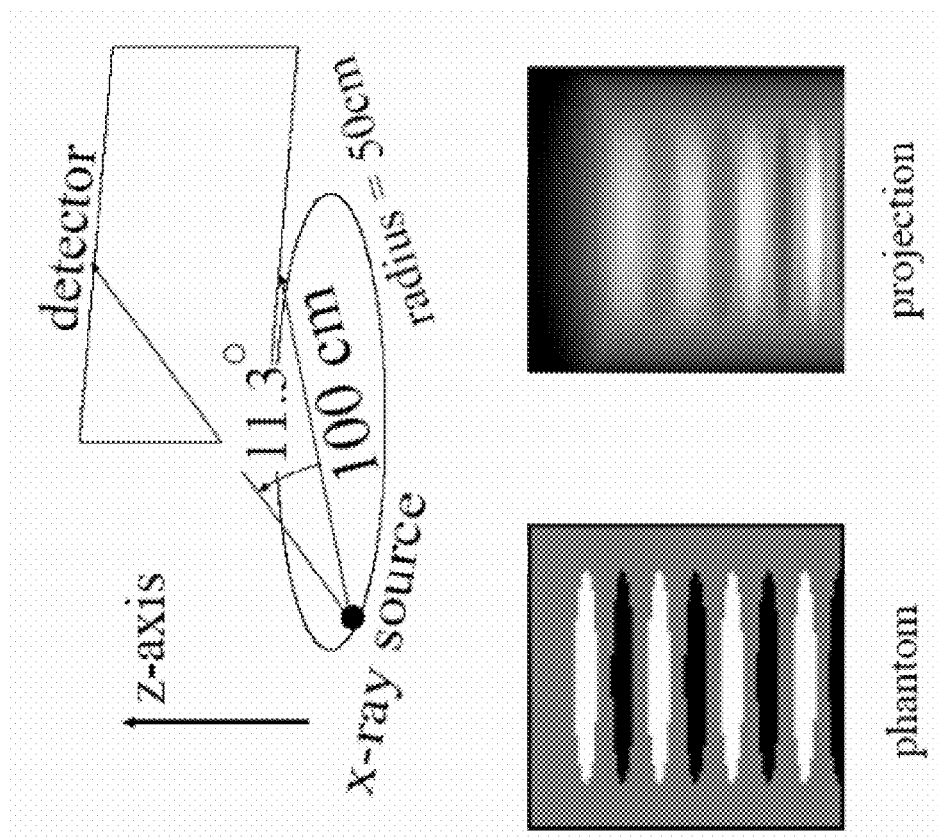
FIG. 24a shows a schematic of the simulated circular cone-beam CT configuration.

In order to analyze the TV minimization methodology, one may use the disk phantom because on the one hand it has a sparse image gradient, so TV minimization should be effective, but on the other hand it is a challenging phantom due to the strong variations in z, which gives rise to a lot of structure in the polar regions in Radon space. In order to speed up the calculations, reconstruction is only considered in the z≥0 half-space. The disk phantom and detector are chopped in half. The geometric parameters of the simulation are shown in FIGS. 24a-c.

Below are three simulations. The first simulation considers perfectly consistent data. Because the TV-minimization algorithm inverts discrete-to-discrete linear systems, the simulated data are generated from a voxellated disk phantom. This way the operator X that generates the data is the same as the operator used in the POCS part of the TV minimization algorithm. The second simulation perturbs the data by introducing a small amount of Gaussian-distributed noise. The third simulation generates the simulated data from the analytic line integrals of the disk phantom; such data may no longer be completely consistent with the discrete x-ray transform used in the TV-minimization algorithm.

For the consistent and noisy data studies, the image array is relatively small at $100^3$ voxels. The projection data may comprise 128 views covering 360° with the detector dimension of 200 bins across and 100 bins high. FIGS. 25a-b shows the resulting reconstruction from the TV algorithm compared with image reconstruction by POCS alone. The image reconstructed by TV-minimization is nearly identical to the original phantom (as shown in FIG. 25a). The POCS result is also close to the true discretized disk phantom, but it is clearly less accurate than that of the TV algorithm (as shown in FIG. 25b). In previous analyses, the difference between POCS and TV image reconstruction was larger when considering the few-view and limited-angle problems. The reason for this is that the latter problems were testing the limits of the ERP; namely, the amount of available data was near twice the number of non-zero pixels in the gradient image. Here, the ERP is not being tested at all. Because the number of projection views is higher in this study than either of the previous two fan-beam studies, the number of measured line integrals is much larger than twice the number of non-zero voxels in the image gradient. For the circular cone-beam CT scan, it is the ill-conditionedness of the discrete x-ray transform under the assumption of positivity, for POCS, or positivity and minimal image TV norm, for TV minimization, that is being tested. It appears that the TV-minimization algorithm is effective at circular cone-beam CT image reconstruction for this disk phantom.

One may extend the above results by investigating the stability of image reconstruction from circular cone-beam CT data. As a preliminary test of stability, one realization may be generated of Gaussian distributed noise with a standard deviation of 0.1% of the true detector bin value. The resulting reconstructions for TV-minimization and POCS are shown in FIGS. 26a-d. As can be seen, the quality of the reconstructions is degraded. In the profiles shown in FIGS. 26c-d, the deviations from the true image increases with z. This indicates that the image reconstruction may be less stable for points further away from the plane of the circular orbit. Of note, the assumption of minimal TV norm appears to help reduce the level of artifacts in the reconstructed images.

Figure 27A:
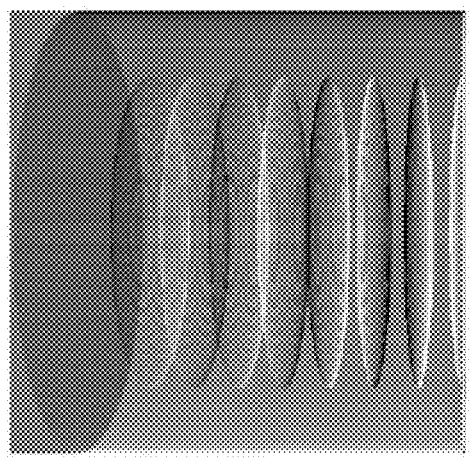
FIG. 27a shows the difference between projection of the discrete and continuous disk phantom from a single view, with the maximum value of the difference being 2.0% of the projection data itself.
Figure 27C:
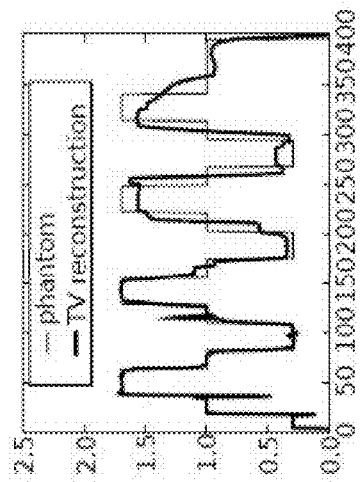
FIG. 27c shows the profiles are shown for the reconstructed images and the phantom from FIG. 27b along the z-axis.
Figure 27B:
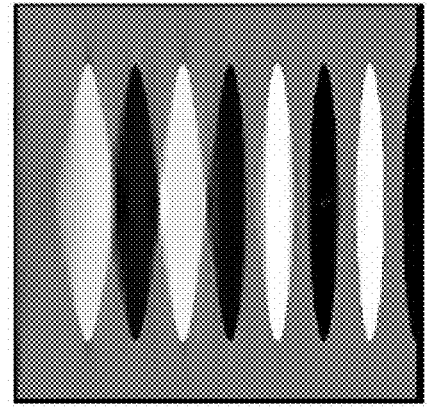
FIG. 27b shows vertical slices of the volume reconstructed by TV-minimization for projection data from the continuous disk phantom. The gray scale window is [0.3, 1.7].

For the third simulation, the impact of data inconsistency introduced by modeling the data with continuous line integrals of the actual disk phantom is investigated. For the first and second simulations, the imaging volume is only $100^3$, and the data derived from the discretized disk phantom deviates substantially from the continuous disk phantom. In order to reduce this difference, the number of voxels is increased to $400^3$, and the number of detector bins is also increased proportionally. So that the calculation time does not grow too much, the number of projection views is reduced to 32. For this study, only results of the TV-minimization algorithm are shown, because the reduction to few-views does not affect the TV algorithm while for POCS this reduction may introduce significant artifacts. Even though the voxelization is much finer, there are still relatively large differences between projection of the discrete and continuous disk phantoms as seen in FIG. 27a. Particularly, at the edges of the disks and background cylinder the projection difference can be quite large. This difference, however, may not represent inconsistency in the data alone, because the discretized disk phantom used here may not be the one that generates projection data closest to the continuous case. It is apparent, however, that there is some level of inconsistency introduced, because the reconstructed images are forced to be constant within the individual voxels. The resulting reconstruction is shown in FIG. 27b. The results show increasing levels of artifacts as the voxels go away from the source trajectory plane. Artifacts due to this type of inconsistency may be controlled much better by using previous methods for representing image functions such as blobs or splines.

The above discussion analyzes circular cone-beam CT image reconstruction by the TV-minimization algorithm.

This type of problem may represent a different type of imperfect sampling than what has previously been investigated by TV-minimization. Image reconstruction algorithms necessarily perform interpolation over a wide gap in the polar regions of the image's 3D Radon sphere. TV-minimization may perform well for this scan, as shown here with the challenging disk phantom. For the case of consistent data, the TV algorithm appears to provide very accurate image reconstruction for this phantom. And TV-minimization appears to be relatively robust against signal noise. The image reconstruction from the continuous data model appears to be affected more by the resulting data inconsistency, but this is primarily due to the choice of representing the image by cubic voxels. Additional analysis for circular cone-beam CT image reconstruction by TV-minimization may be performed with other expansion functions that are known to more closely match continuous line integrals.

An important component of the TV algorithm is the ability to take many small total variation gradient descent (TVGD) steps, which computationally can be extremely time-consuming The TVGD step may, however, be very well suited to a new field of computing—general purpose computing on a graphics processing unit (GPGPU). The TV of the 3D image may depend on the variation of the image over neighboring voxels, and to formulate the image TV a three index notation for the image voxels is required. The value of the image $\vec{f}$ at voxel i, j, k is denoted as $\vec{f}(i, j, k)$ where $i \in [1, n_x]$, $j \in [1, n_y]$, and $k \in [1, n_z]$, where $n_x$, $n_y$, and $n_z$ are the numbers of voxels along each of the image axes. The image TV is:

$$\|\vec{f}\|_{TV} = \sum_{i=2}^{n_x-1} \sum_{j=2}^{n_j-1} \sum_{k=2}^{n_z-1} \sqrt{(\Delta_x f)^2 + (\Delta_y f)^2 + (\Delta_z f)^2}, \quad (23)$$

$$\Delta_x f = f(i, j, k) - f(i-1, j, k),$$

$$\Delta_y f = f(i, j, k) - f(i, j-1, k),$$

$$\Delta_z f = f(i, j, k) - f(i, j, k-1).$$

One way of reducing the TV of an image is to subtract from $\vec{f}$ a small constant times the TV gradient image $\vec{T}$ which is defined as:

$$\vec{T} = \{\partial\|\vec{f}\|_{TV}/\partial f(i,j,k) : i \in [1,n_x], j \in [1,n_y], k \in [1,n_z]\} \quad (24)$$

The exact form of $\vec{T}$ is straightforward to derive, but due to the length of this formula it will not be written here. Of note about computing $\vec{T}$ are that structurally the computation is a non-linear filtering operation involving each voxel and 12 neighboring voxels. Calculating the TV gradient $\vec{T}$ once is not as time consuming as a POCS iteration, but our TV methodology may require multiple TVGD steps per POCS iteration. Therefore, acceleration of the computation of $\vec{T}$ may have a large impact on the execution time of the whole algorithm. Due to the non-linearity in calculating $\vec{T}$, the Fourier Transform cannot be exploited as with linear filters. The non-linear filtering operation, however, is very well suited to implementation on a graphics processing unit (GPU).

The GPU may implement a number of graphics primitive operations in a way that makes running them much faster than drawing directly to the screen with the host CPU. The GPU may exploit massive parallelism to perform mathematical operations needed for 3D rendering. Objects in a 3D graphics scene are represented as a set of 3D vertices, and to give 3D objects a realistic appearance, the faces formed by neighboring vertices can have a 2D image, or texture, affixed. In the rendering process, geometric transforms are perform on the vertices in a first pass, and pixel-by-pixel image processing operations are performed in a second pass called fragment shading. Oversimplifying, the first pass is generally used to orient the 3D scene to a particular camera view angle, and the fragment shader is used to incorporate the visual properties of each face including any textures used. In modern graphics hardware, both of these rendering stages are now programmable, and in particular the fragment processing operates in a highly parallel fashion with up to 24 channels operating together to process a scene. Due to the flexibility of the new graphics hardware, the GPU can be coerced into performing and significantly accelerating numerical computations previously performed on standard CPUs. In fact, sophisticated GPU algorithms have been developed for performing forward- and back-projection in iterative tomographic image reconstruction yielding impressive acceleration by a factor of 10 or more. The present application, exploiting the GPU for TVGD, is particularly effective.

The TVG-GPU methodology may be derived from two on-line tutorials on GPGPU: the helloGPGPU tutorial shows how to program a fragment shader to perform a Laplacian filter on a real-time dynamic scene, and the "basic math tutorial" illustrates how to perform numerical computation on the GPU with a recursive vector addition problem. The former tutorial is a good guide on generating the fragment shader needed for our non-linear filter, and the latter tutorial provides an orientation on how to map numerical computation onto the GPU. In the basic math tutorial, the data for the calculation is converted to a 2D texture and attached to a simple rectangle. The fragment shader, containing the data processing steps, is loaded into the GPU, and the computation is performed by issuing a command to render the rectangle orthogonally to a parallel plane. The texture flows through the fragment shader and the rendered quadrilateral contains the processed array.

For the present application, a 3D array is needed for processing; however, GPGPU may be best suited for 2D arrays. Accordingly, the 3D image array may be reformatted by stacking consecutive z-slices side-by-side in the x-direction of the texture, and stacking these rows in the y-direction so as to fit as much of the 3D array as possible into the 4096×4096 size limit for textures on our NVIDIA 7800 GTX graphics board. When the 3D array does not fit into a single texture, the calculation may be broken up into smaller parts that do fit. The offset for obtaining neighboring values in the x- and y-direction is straightforward, just as in the 3D array, and to reference the neighboring z-slice an offset of $n_x$ is added or subtracted to the current pixel position. The computation may be performed in 32-bit floating point, provided by the GL_FLOAT_R32_NV texture data format. The application of the non-linear filter is uniform across the array, and as a result the values at the edges may be spurious. To take care of these edge values, the TV gradient array is zeroed at the edges two voxels deep after the data is restored to the 3D format. The TVG-GPU program achieves roughly a factor of ten acceleration over the CPU version of this subroutine. Acceleration of the TVGD step on commodity graphics hardware may thus prove important to the practicability of the TV-algorithm, as the accelerated algorithm may take many more gradient descent steps with a smaller step-size, thereby improving the accuracy and the speed of the TV gradient descent.

Still another type of imaging is echo-planar imaging (EPI). During the past 15 years, EPI has emerged as one of the fastest of the common magnetic resonance imaging (MRI) methods. Reducing scan times by factors of up to $10^4$ in some circumstances, EPI is becoming an increasingly important part of cardiac imaging, functional MRI, and other applications that require rapid imaging. EPI takes advantage of large gradient magnitudes and rapid switching of the read-out (frequency encoding) gradient. Each application of the read-out gradient advances the scan trajectory rapidly along the $k_x$ direction in the Fourier plane. A brief phase-encode gradient is applied following the read-out gradient, advancing the trajectory a short distance along the $k_y$ direction. The read-out gradient is then again applied with opposite sign, moving the trajectory back along $k_x$. This repeated switching of the read-out gradient coupled with phase encoding gradient pulses leads to mapping of Fourier space along horizontal lines in a Cartesian grid, and for sufficient gradient strengths EPI acquires multiple lines of data in Fourier space using a single radio frequency excitation. This allows an entire image to be constructed from one free induction decay using either spin-echo or gradient-echo acquisition methods, resulting in a dramatic improvement in imaging time relative to other methods.

However, there remains a need to further reduce scan times in EPI. For efficient imaging, the total path through Fourier space may be covered within the spin-spin relaxation time $T_2^*$. Typically, this corresponds to covering all of Fourier space in 100 ms or less, which can be a challenge for standard MRI systems. The reduction of EPI scan time may be achieved through reduction of the number of horizontal data lines required for accurate image reconstruction. While methods have been investigated for obtaining accurate MRI images from a reduced number of lines, they have not allowed sufficient reduction in line number to significantly reduce EPI scan time.

The discussion below includes a methodology for obtaining accurate images from highly sparse horizontal data lines in EPI. This may allow a substantial shortening of imaging time, and may also improve image resolution and signal-to-noise ratio for scans of a given duration. The methodology may iteratively minimize the total variation (TV) of the estimated image using gradient descent, subject to the condition that the estimated data remain consistent with the sample data. This approach may be effective for images that are nearly constant over most regions and vary rapidly only in confined regions, a condition applicable to many medical images. Using this method, images are reconstructed from samples in Fourier space obtained along as few as 20% of the horizontal lines used in a typical full EPI scan. The present discussion focuses on the method and results in the context of two-dimensional (2D) MRI. However, they are directly applicable and generalizable to higher dimensional MRI, as well as other scan configurations such as radial or spiral scanning.

Figures 28A, 28B:
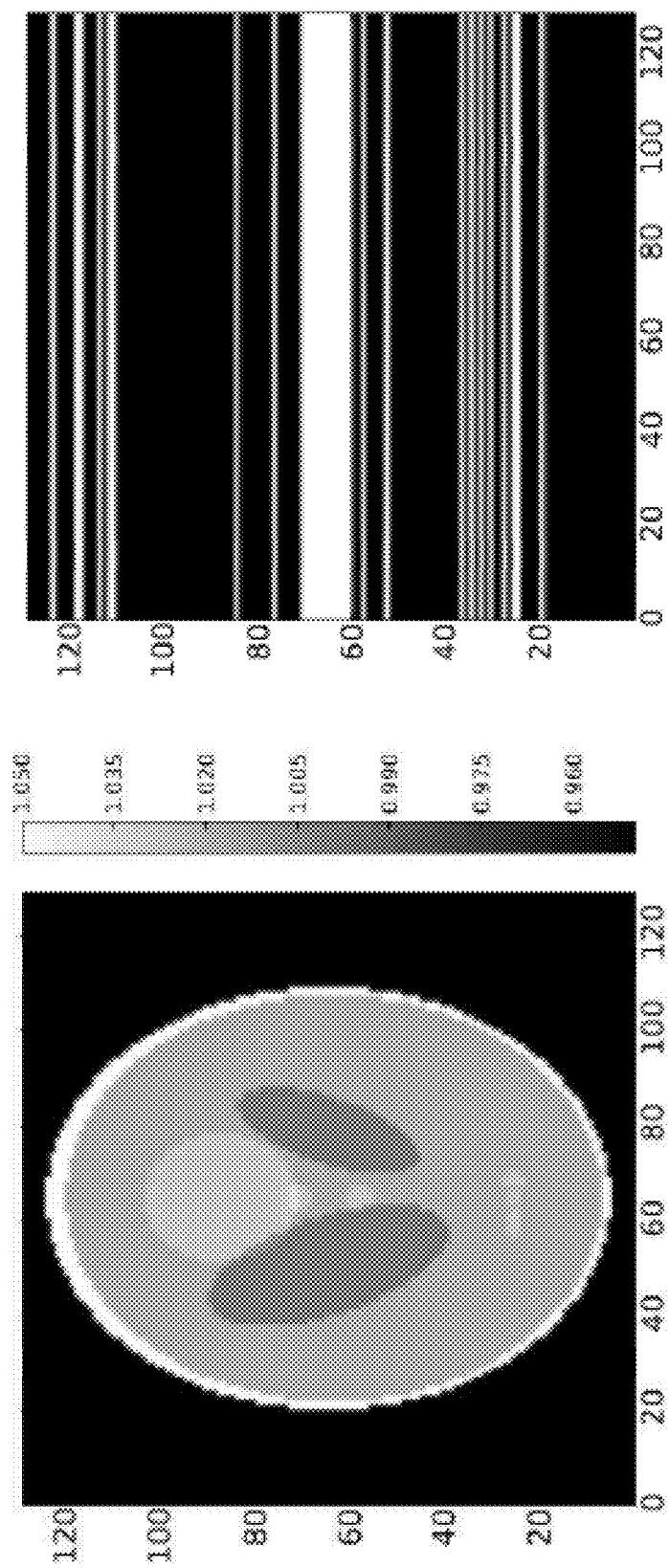
FIG. 28a shows an example of a Shepp-Logan phantom.
FIG. 28b shows the Cartesian grid, with the strips demonstrating which regions of the Cartesian grid used in the image reconstruction process.

The measured signal in EPI is simply related to the Fourier transform of the object function $f(x, y)$:

$$S(k_x,k_y) \propto \iint f(x,y) \exp\{-2\pi j(k_x x+k_y y)\} dx dy \qquad (25)$$

where $k_x$ and $k_y$ are proportional to the x and y gradients of the magnetic field, as well as the read-out time and phase encoding pulse duration, respectively. Our data model comprises measurements of $S(k_x, k_y)$ from computer generated data along horizontal lines in a 128×128 square grid, for example. Specifically, the Fourier transform of the Shepp-Logan phantom is taken, shown in FIG. 28a. Only data along the horizontal lines shown in the indicator function in FIG. 28b are used in the image reconstruction. This indicator function consists of a central band comprising 10% of the total amount of data. This ensures that information about the DC and low frequency, components of the object function are retained. Horizontal lines comprising an additional 10% of the total dataset are randomly selected from a normal distribution with standard deviation equal to the vertical image dimension. This standard deviation is found to give a sufficient sampling of both low and high frequency components, resulting in the best reconstruction performance for this phantom. Although the same indicator function is used throughout for consistency, other indicator functions satisfying these conditions are found to give similar results.

The TV of an image is the $l_1$-norm of its gradient image, and may be expressed as:

$$\|f_{s,t}\|_{TV} = \sum_{s,t} \sqrt{(f_{s,t} - f_{s-1,t})^2 + (f_{s,t} - f_{s,t-1})^2} \qquad (26)$$

where s and t denote row and column indices Minimizing the image TV provides the foundation of an iterative method for image reconstruction from sparse samples. As discussed above, this method may be effective for images with sparse gradients, and may be applied successfully in CT. The image of object function $f(x, y)$ is constructed such that $\|f_{s,t}\|_{TV}$ is minimized while the $S(k_x, k_y)$ from the reconstructed image match the measured object data.

Implementation of the methodology may comprise three main steps: initialization, projection, and TV gradient descent. For the first iteration of the algorithm, initialization may comprise setting the estimated image to zero. The initialization step for subsequent iterations is discussed below.

Projection comprises the following substeps: the estimated image is first transformed to Fourier space, which is the data domain, using an FFT. The methodology is particularly conducive to EPI data, since these data are acquired on a Cartesian grid. Therefore no interpolation is required to perform the FFT. After FFT, the known data measured along the trajectories in the indicator function (FIG. 28b) may be copied into their appropriate positions in the Fourier domain. This enforces consistency with the data. An inverse FFT is performed on the Fourier image to return to the image domain. Finally, the positivity in the image is enforced by setting pixels with negative values to zero. The scalar distance is also measured between the pre-projection and post-projection images, the so-called projection distance, for use in the next step.

To perform the TV gradient descent step, the gradient of the image TV expressed in Eq. (26) is determined This should not be confused with the gradient of the image itself, from which the image TV was determined The gradient in question is also an image which is denoted $\vec{v}$, with each pixel equal to the partial derivative of the image TV with respect to that pixel, $$v_{s,t} = \frac{\partial \|\vec{f}\|_{TV}}{\partial f_{s,t}}.$$

The gradient image $\vec{v}$ is normalized, then a small fraction of $\vec{v}$ is iteratively subtracted from the post-projection image. This is the gradient descent, which may act to reduce the TV of the post-projection image. The fraction of $\vec{v}$ subtracted is proportional to the projection distance so that the gradient descent step may not overwhelm the projection step. This allows that the estimated image moves in the net direction of data consistency. After the gradient descent step, the resulting image becomes the initial image, and the process may be repeated beginning with projection.

Figure 29B:
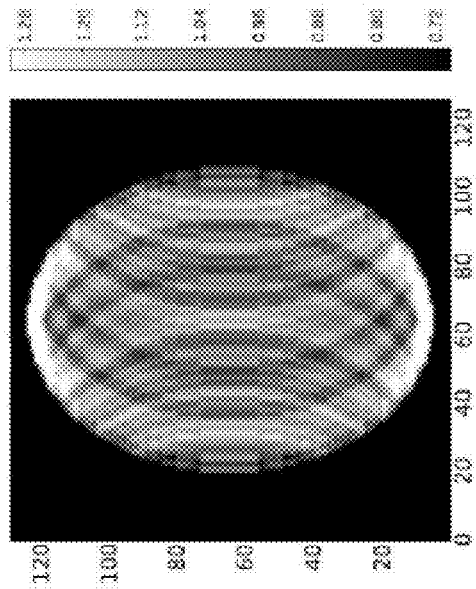
FIG. 29b shows the image obtained from a single inverse Fourier transform, before applying the TV algorithm.
Figure 29A:
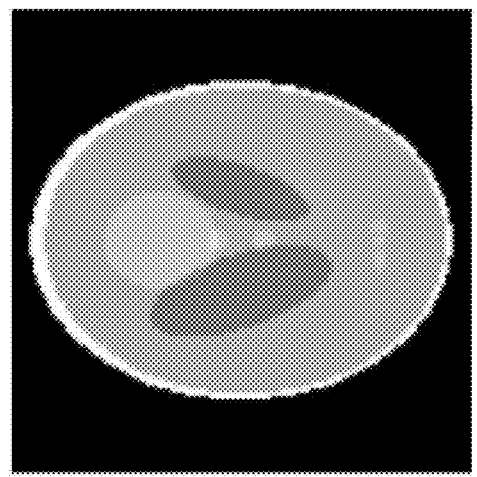
FIG. 29a shows the reconstructed image from consistent (noiseless) data.
Figure 29D:
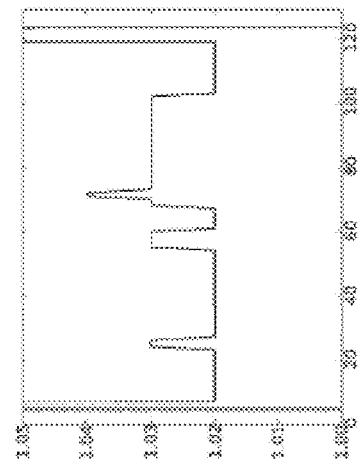
FIGS. 29c-d show the reconstructed horizontal and vertical profiles, respectively, overlaid on the original profiles.
Figure 29C:
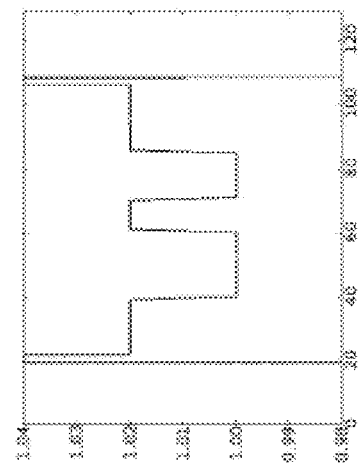

Numerical studies were performed to validate and demonstrate the methodology's performance in reconstructing accurate images from highly sparse Fourier data. Results for consistent data, in which no noise is added to the computer-generated $S(k_x, k_y)$, are shown in FIGS. 29a, c-d. FIG. 29a shows the image reconstructed with the TV minimization algorithm using only data along the horizontal lines in the indicator function, comprising just 20% of the total dataset. This corresponds to a scan roughly 5 times faster than one which explores the entire Fourier space. The reconstructed image is indistinguishable from the Shepp-Logan phantom in FIG. 28a. For reference, FIG. 29b shows the image resulting from a single inverse Fourier transform of the data, prior to iteratively applying the TV minimization algorithm. This illustrates the algorithm's ability to recover the image from a dataset that is too limited to permit recovery through simple inverse Fourier transform. FIGS. 29c-d are in fact an overlay of the original and reconstructed horizontal and vertical image profiles, respectively. However, because the image reconstruction is exact, the profiles are indistinguishable from one another.

Real world applications rarely deal with consistent data; therefore, the performance of the algorithm is analyzed in the presence of noise. FIGS. 30a-d show one example. Here, independent Gaussian noise is added to the Fourier data on a pixel by pixel basis, with σ equal to 0.1% of the amplitude of the zero frequency component. FIG. 30a shows the model image after inverse Fourier transform. FIG. 30b shows the reconstructed image, again created using only data along the horizontal lines in the indicator function. Major features of the object are recovered, as are most smaller scale features. This is further illustrated by the profiles in FIGS. 30c-d. As these profiles demonstrate, the TV algorithm has the added benefit of regularizing the image, as the recovered image is less noisy than the original.

Figure 31B:
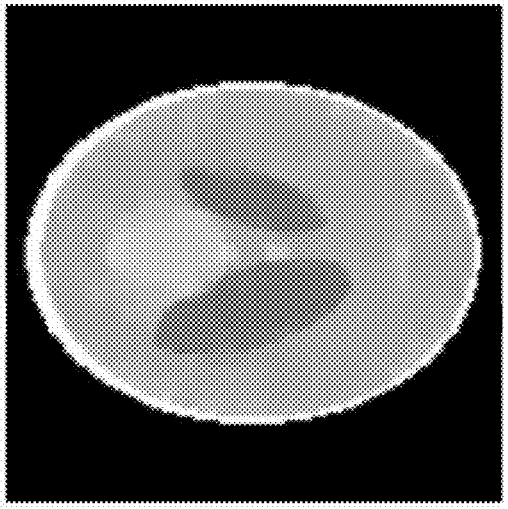
Figure 31D:
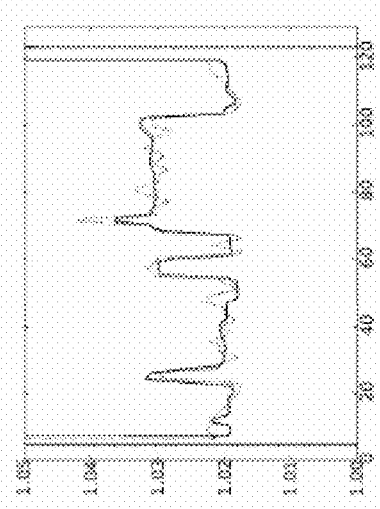
Figure 31A:
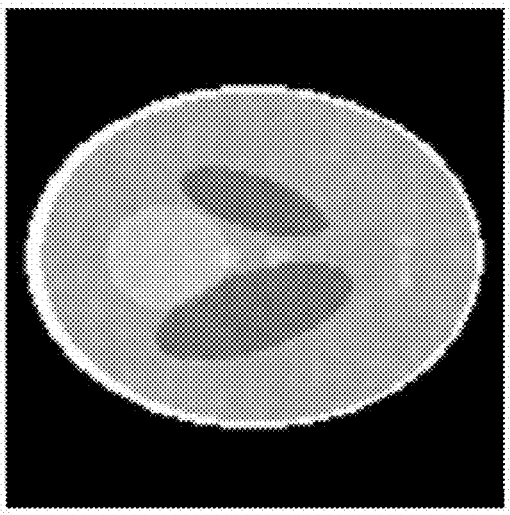
Figure 31C:
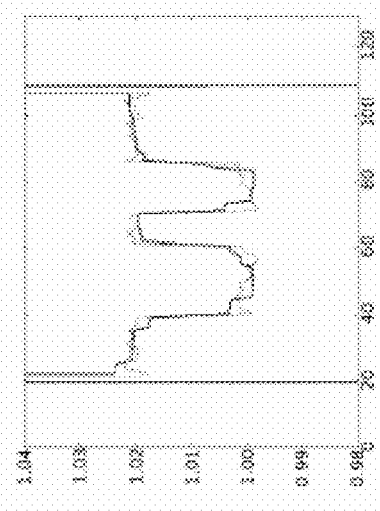

The methodology is also tested with a modified noise model. Here, a Gaussian taper is imposed on the noise added in Fourier space. The noise model described above is applied pixel by pixel to the data as before, but the Fourier image is then multiplied by a Gaussian with unit peak and full width at half maximum equal to 25% of the image diameter. This process tapers the noise in the high-frequency components to emphasize noise features on larger scales. FIGS. 31a-d illustrate this method and the results. FIG. 31a shows the model image after inverse Fourier transform. The noise primarily affects larger scales, and may be more difficult to smooth out. FIG. 31b shows the image reconstructed using the TV algorithm. As with the previous noise model, all major features are recovered, as are most small scale features. The profiles in FIGS. 31c-d further demonstrate this. The TV algorithm is capable of reconstructing an accurate likeness of the original image using just 20% of the available data, and is shown to be very robust to image noise.

Figure 32A:
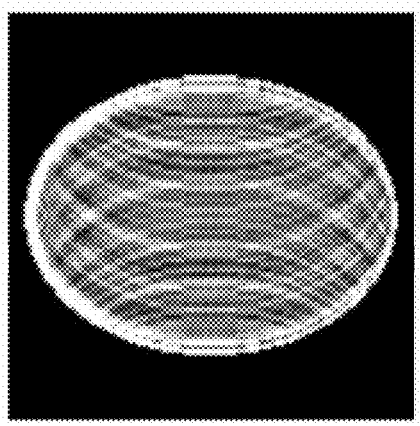
FIGS. 32a-b show a comparison of reconstruction performance with (FIG. 32a) and without (FIG. 32b) including TV minimization in the reconstruction algorithm.
Figure 32B:
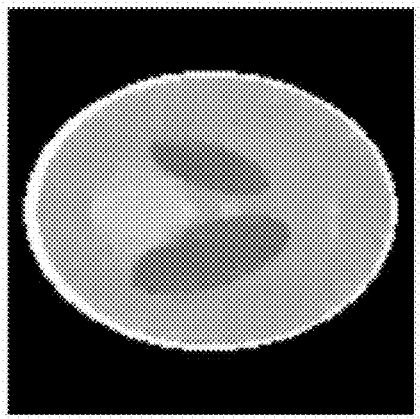
Figure 33A:
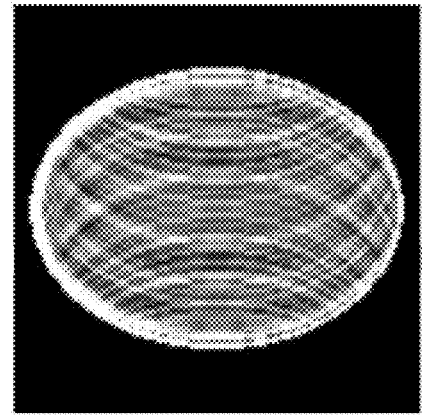
FIGS. 33a-b are the same as FIGS. 32a-b, but for the tapered Gaussian noise model.
Figure 33B:
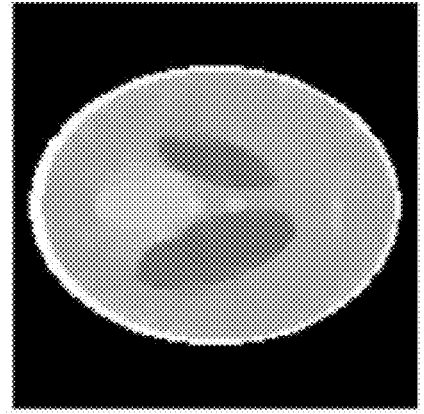

TV minimization is an important part of the methodology, not simply a tool to regularize the image. To demonstrate the importance of performing the TV minimization via gradient descent, a comparison is presented of image reconstructions from inconsistent data, both with and without the TV minimization step. The results are shown in FIGS. 32a-b and 33a-b. FIG. 32a shows the image reconstructed using the TV minimization algorithm as detailed above. Independent Gaussian noise with σ equal to 0.1% of the amplitude of the zero frequency component was added to the Fourier data. FIG. 32b shows the reconstructed image after the same number of iterations when TV minimization via gradient descent is not performed. In this case the reconstruction algorithm consists solely of initialization and projection (including positivity). Little useful information can be obtained from this image, and in fact the method offers little improvement over the single inverse IFFT shown in FIG. 29b for this particular phantom and scan configuration. In the absence of TV minimization, little useful information is obtained.

Thus, an iterative reconstruction algorithm may be applied based on minimization of the image TV to perform accurate image reconstruction with less data, such as little as 20% of the data, used in a typical EPI scan. When applied to consistent data, the methodology may provide a virtually exact reconstruction of the original image. When applied to inconsistent data, with independent Gaussian noise added in the Fourier domain, the algorithm may recover some or most features of the Shepp-Logan phantom used here. The TV minimization methodology has the added advantage of regularizing the reconstructed image, making it highly effective for noisy data. However, the TV minimization step may be important to accurate image recovery, and not just a tool to regularize noisy images. When the TV minimization step is not included in the algorithm, the image reconstruction may be of lesser quality.

In practice, this methodology may be able to both reduce EPI scan time or increase scan efficiency by allowing for greatly improved image resolution and signal to noise ratio in scans of a given time. The TV algorithm may be readily applied to reconstructing images from sparse samples on other non-uniform grids in Fourier space and can also be generalized to higher dimensional Fourier space and MRI scan configurations. The methodology may be applied to more complex phantoms.

EPI may commonly be used to measure volumes instead of individual slices. In multi-slice EPI, a three-dimensional volume may be reconstructed by stacking together multiple 2D slices, each of which may be obtained independently. A drawback to this method arises when sparse sampling is desired, for instance to reduce scan time. The 2D stacking method may not accommodate sparse sampling along the slice direction, as this creates gaps in the reconstructed image volume. An alternative may be achieved by performing a standard 2D EPI sequence while spatially encoding the third dimension of the excited slab with a predetermined number of phase-encoding steps, corresponding to the number of slices desired. An image of the entire 3D volume may then be constructed by means of a 3D Fourier transform. A new image reconstruction methodology may be applied where sparse sampling in Fourier space along the slice direction does not cause gaps in the reconstructed image. This methodology takes advantage of the fact that the Fourier transform is a non-local mapping into image space. As shown below, this means that accurate 3D image reconstruction may be achieved from EPI data with highly sparse sampling in two of the three spatial dimensions. By contrast, the 2D slice approach only allows sparse sampling in one dimension. The full 3D approach presented here may also allow greater signal-to-noise ratio in the reconstructed images relative to 2D slice stacking because a greater number of independent measurements are used to reconstruct each image pixel. This can also be used to measure thinner slices or smaller pixels without sacrificing signal-to-noise.

While EPI may be fast relative to other MRI methods, 3D image acquisition can still be very time-consuming, depending on how many slices are needed. The image reconstruction methodology presented in this study may reduce 3D EPI scan times by a factor of six or more. Repeated switching of the frequency encoding gradient coupled with phase encoding gradient pulses may lead to mapping of Fourier space along horizontal lines in a Cartesian grid which, for historical reasons associated with our choice of phantom, we take to be the x-z plane. Reduced scan time may be achieved through reduction of the number of these horizontal data lines. In 3D EPI, a phase encoding gradient may also be applied along the slice direction, which is taken to be the y-axis. EPI scan time may be further reduced by sampling fewer slices within the full 3D volume.

Here, the two-dimensional treatment of image reconstruction is extended from sparse EPI data to three spatial dimensions. The method allows a substantial shortening of imaging time, and may also improve image resolution and signal-to-noise ratio for scans of a given duration. This method iteratively minimizes the total variation (TV) of the estimated image using gradient descent, subject to the condition that the estimated data remain consistent with the sample data. This approach may be effective for images that are nearly constant over most regions and vary rapidly only in confined regions, a condition applicable to many medical images. Using this method, images from sparse samples are reconstructed in Fourier space, using as little as 15% of the data used in a typical full 3D EPI scan.

The measured signal in EPI is simply related to the Fourier transform of the object function $f(x, y, z)$:

$$S(k_x, k_y, k_z) \propto \iiint f(x,y,z)$$

$$\exp\{-2\pi j(k_x x + k_y y + k_z z)\} dx dy dz \quad (27)$$

where $k_x$, $k_y$, and $k_z$ are proportional to the x, y, and z gradients of the magnetic field, as well as the read-out time along x and the phase encoding pulse durations along y and z. The data model comprises measurements of $S(k_x, k_y, k_z)$ from computer generated data in a Cartesian volume.

The image reconstruction methodology may be thought of as an optimization problem where the data constraint to be minimized is the total variation. Such a problem may be written as:

$$f^* = \operatorname{argmin} \|\vec{f}\|_{TV} \text{ such that } |M\vec{f} - \vec{g}| \leq \epsilon \quad (28)$$

where $\vec{f}$ represents a discrete image, $\vec{g}$ is the available Fourier data, M is the Fourier transform operation, and $f^*$ is the solution to the optimization problem. The inequality is used to account for noisy data, and the value of $\epsilon$ depends on both the amount of available data and the level of noise within the data.

A solution to Eq. (28) may be found by alternating two processes: data projection followed by TV minimization via gradient descent. The projection step is straightforward for MRI; since the data are measured in the Fourier domain, this step may comprise fast Fourier transforming the trial image volume (which initially consists of all zeros), copying in the known Fourier data samples, taking a fast inverse Fourier transform, and enforcing positivity by setting negative pixels to zero. This process is referred to as the Fourier transform step. Since EPI measures Fourier data in a Cartesian grid, no interpolation is needed to perform the fast Fourier transforms in this step.

The Fourier transform step may enforce data consistency, and the gradient descent step may follow to minimize the image TV. The image TV is the $l_1$-norm of the gradient image. It may be reduced by subtracting a small fraction of the gradient of the image TV from the image itself The best results may be obtained if this process is performed in a series of small steps. In extending the algorithm from two dimensions to three the Fourier transform scales only as $n^2$ due to the weakness of the log n term, while the gradient descent step scales fully as $n^3$, where n represents the side of a cube in which the algorithm is performed. The gradient descent step is therefore time consuming, requiring roughly an order of magnitude more CPU time than the Fourier transform step under the conditions studied here. To improve the computational efficiency of the algorithm, the gradient descent step may be performed on a GPU, as discussed above. The GPU ordinarily uses parallel processing for rapid rendering of 3D graphics, and is therefore well-suited to rapid calculation of the TV gradient in a 3D environment. Performing gradient descent on the GPU is an order of magnitude faster than doing so on the CPU, making it roughly equal to the time required for the Fourier transform step under existing conditions.

The methodology may be iterative, alternating the Fourier transform step with gradient descent to move toward a solution of Eq. (28). Iteration may be terminated when the data residual first dropped below $\epsilon$. However, under some circumstances, the resulting $f^*$ may still be far from the solution of Eq. (28). The methodology may therefore be accordingly to adaptively change the Fourier transform and gradient descent step sizes even after the $\epsilon$ threshold is crossed, thereby continuing to move the solution toward lower TV.

Numerical studies were performed to validate and demonstrate the algorithm's performance in reconstructing accurate images from highly sparse Fourier data. The studies were performed using a 3D Shepp-Logan phantom. In the case of noiseless data, the reconstructed images are indistinguishable from the original slices. In the presence of noise, the TV algorithm may adequately reconstruct images from noisy data similar to the two dimensional case. These results indicate that use of the TV minimization algorithm for image reconstruction can substantially reduce 3D EPI scan times (e.g., by a factor of six in examples studied), facilitating more rapid imaging as well as greater image resolution and signal-to-noise ratio for a given scan time.

An iterative reconstruction algorithm based on minimization of the image TV may be applied to perform accurate 3D image reconstruction with less data (e.g., as little as 15% of the data) used in a full 3D EPI scan. The TV minimization algorithm may have the added advantage of regularizing the recovered image, making the method very effective for noisy data. This approach may be effective for fully 3D EPI as described here, since the 3D Fourier transform used in our analysis maps the sparse Fourier samples into the entire image space. Such a reduction in scan time with multi-slice 2D EPI may be unlikely, as this approach does not allow for sparse sampling of slices within the volume. In practice, this methodology may be able to both reduce EPI scan time and increase scan efficiency by allowing for greatly improved image resolution and signal-to-noise ratio in a scan of a given time. The TV algorithm may be readily applied to reconstructing images from sparse samples on other non-uniform grids in Fourier space.

It is intended that the foregoing detailed description be regarded as illustrative, rather than limiting, and that it be understood that the following claims, including all equivalents, are intended to define the scope of this invention.

The invention claimed is:

1. An imaging system configured to generate an image of a region of interest (ROI), the imaging system comprising:
    a source configured to generate a beam;
    one or more detectors; and
    a processor in communication with the source and the one or more detectors, the processor configured to:
        control at least one of the source or the one or more detectors in order to generate ROI data corresponding to the ROI, the ROI data comprising erroneous data based on one or more defects in the one or more detectors; and
        generate an estimated image of the ROI based on ROI data.

2. The system of claim 1, wherein the one or more defects comprise one or more bad detector bins in at least one of the one or more detectors.

3. The system of claim 2, wherein the erroneous data comprises one or more gaps in the ROI data due to the one or more bad detector bins.

4. The system of claim 3, wherein the one or more gaps in the ROI data comprise data indicative of zero intensity.

5. The system of claim 1, wherein one or more of the defects comprises an artifact-producing error in at least one of the one or more detectors.

6. The system of claim 1, wherein the erroneous data comprises a gap on the one or more detectors for all available projection views.

7. The system of claim 1, wherein the ROI data is less than that sufficient to reconstruct an exact image of the ROI.

8. The system of claim 1, wherein the processor is configured to generate the estimated image of the ROI by iteratively generating the estimated image using the ROI data and constraining variation of the estimated image.

9. The system of claim 1, wherein location and extent of the one or more defects is known prior to generating an estimated image of the ROI.

10. The system of claim 1, wherein location and extent of the one or more defects is unknown prior to generating an estimated image of the ROI.

11. The system of claim 1, wherein the one or more defects comprise poor quantum efficiency of at least one of the one or more detectors.

12. The system of claim 11, wherein the erroneous data comprises low photon count by one or more detectors such that the signal noise dominates due to the poor quantum efficiency the at least one of the one or more detectors.

13. The system of claim 1, where the one or more detectors are stationary when the ROI data is generated.

14. The system of claim 1, where the processor is configured to control the one or more detectors by moving the one or more detectors relative to any one, or both, of the source and ROI.

15. The system of claim 1, wherein the ROI includes all of or only a part of an object.

16. The system of claim 15, wherein the object is a living object.

17. The system of claim 15, wherein the object is a non-living object.

18. The system of claim 1, wherein the ROI is an entire living organism.

19. The system of claim 1, wherein the ROI is a part of a living organism which is less than the entire living organism.

20. The system of claim 1, wherein the ROI is an entire inanimate object.

21. The system of claim 1, wherein the ROI is a part of an inanimate object which is less than the entire inanimate object.

* * * * *

UNITED STATES PATENT AND TRADEMARK OFFICE
CERTIFICATE OF CORRECTION

PATENT NO. : 9,613,442 B2
APPLICATION NO. : 14/933844
DATED : April 4, 2017
INVENTOR(S) : Xiaochuan Pan et al.

It is certified that error appears in the above-identified patent and that said Letters Patent is hereby corrected as shown below:

In the Specification

Column 1, Lines 20-25, change:
"The U.S. Government has a paid-up license in this invention and the right in limited circumstances to require the patent owner to license others on reasonable terms as provided for by the terms of grants K01 EB003913, R01 EB00225, and R01 EB02765 awarded by the National Institutes of Health."

To:
--This invention was made with government support under K01 EB003913, R01 EB000225, and R01 EB002765 awarded by the National Institutes of Health. The government has certain rights in the invention.--

Signed and Sealed this
Ninth Day of May, 2023

Katherine Kelly Vidal
*Director of the United States Patent and Trademark Office*